United States Patent
Ohnuki

(10) Patent No.: US 9,525,346 B2
(45) Date of Patent: Dec. 20, 2016

(54) POWER DEVICE

(71) Applicant: HONDA MOTOR CO., LTD., Tokyo (JP)

(72) Inventor: Yasumichi Ohnuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

(21) Appl. No.: 14/280,200

(22) Filed: May 16, 2014

(65) Prior Publication Data

US 2014/0361622 A1 Dec. 11, 2014

(30) Foreign Application Priority Data

Jun. 6, 2013 (JP) .................................. 2013-119940

(51) Int. Cl.
*H02M 3/158* (2006.01)

(52) U.S. Cl.
CPC ........... *H02M 3/158* (2013.01); *Y10T 307/549* (2015.04)

(58) Field of Classification Search
CPC .................................. H02M 3/158; H02J 3/46
USPC .......................................................... 307/52
See application file for complete search history.

(56) References Cited

U.S. PATENT DOCUMENTS

| | | | | |
|---|---|---|---|---|
| 9,041,251 B2 * | 5/2015 | Schill | .................... | H02M 3/155 307/37 |
| 2007/0029881 A1 * | 2/2007 | Lai | .......................... | H02J 9/062 307/82 |
| 2009/0278496 A1 * | 11/2009 | Nakao | .................... | H02J 7/0016 320/118 |

(Continued)

FOREIGN PATENT DOCUMENTS

| | | |
|---|---|---|
| DE | 102011011330 A1 | 5/2012 |
| DE | 102011018357 A1 | 10/2012 |

(Continued)

OTHER PUBLICATIONS

German Search Report dated Jan. 19, 2015, issued in corresponding DE Patent Application No. 102014210326.6 with English translation (19 pages).

(Continued)

*Primary Examiner* — Rexford Barnie
*Assistant Examiner* — Joseph Inge
(74) *Attorney, Agent, or Firm* — Westerman, Hattori, Daniels & Adrian, LLP

(57) ABSTRACT

A control device controls first and second direct-current power converter circuits so that a switching operation for at least one of a pair of first and second switching devices included in the first direct-current power converter circuit and a pair of first and third switching devices included in the second direct-current power converter circuit is performed. The control device controls a switching operation of the first switching device and the second switching device included in the first direct-current power converter circuit based on a first duty. In the switching operation, the first switching device and the second switching device are inverted and the alternative close and open (ON/OFF) switching operations of each first and second switching device are performed. The control device controls a switching operation of the first switching device and the third switching device included in the second direct-current power converter circuit based on a second duty.

16 Claims, 38 Drawing Sheets

(56) References Cited

U.S. PATENT DOCUMENTS

| | | | | |
|---|---|---|---|---|
| 2012/0043818 A1* | 2/2012 | Stratakos | ............... | H02J 3/383 |
| | | | | 307/77 |
| 2012/0113694 A1 | 5/2012 | Schill | | |
| 2013/0181519 A1* | 7/2013 | Lee | ........................ | H02J 3/28 |
| | | | | 307/24 |
| 2013/0294126 A1* | 11/2013 | Garrity | .............. | H02M 7/4807 |
| | | | | 363/95 |
| 2014/0361619 A1* | 12/2014 | Ohnuki | ................ | H02M 3/158 |
| | | | | 307/31 |

FOREIGN PATENT DOCUMENTS

| | | |
|---|---|---|
| DE | 102013005070 A1 | 9/2014 |
| EP | 2448099 A1 | 5/2012 |
| JP | 2008178220 A | 7/2008 |
| JP | 2012-60838 A | 3/2012 |
| JP | 2012-152079 A | 8/2012 |
| JP | 2013102595 A | 5/2013 |

OTHER PUBLICATIONS

German Office Action dated Jan. 19, 2015, issued in corresponding DE Patent Application No. 102014210326.6 with English translation (12 pages).

Japanese Office Action dated Sep. 13, 2016 issued in JP 2013-119940 (5 pages).

* cited by examiner

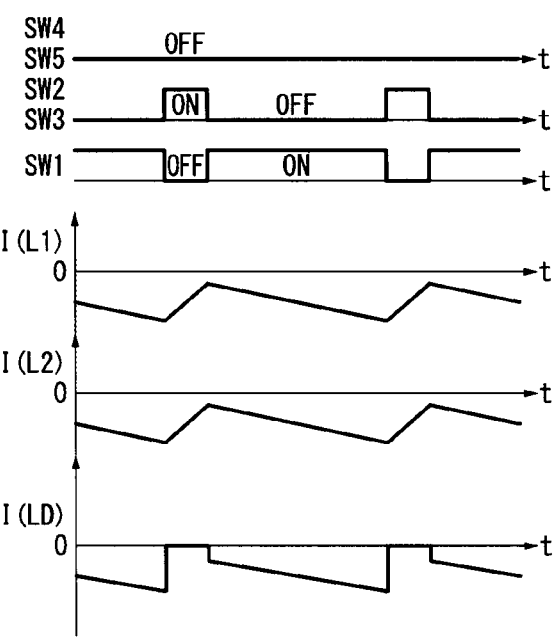

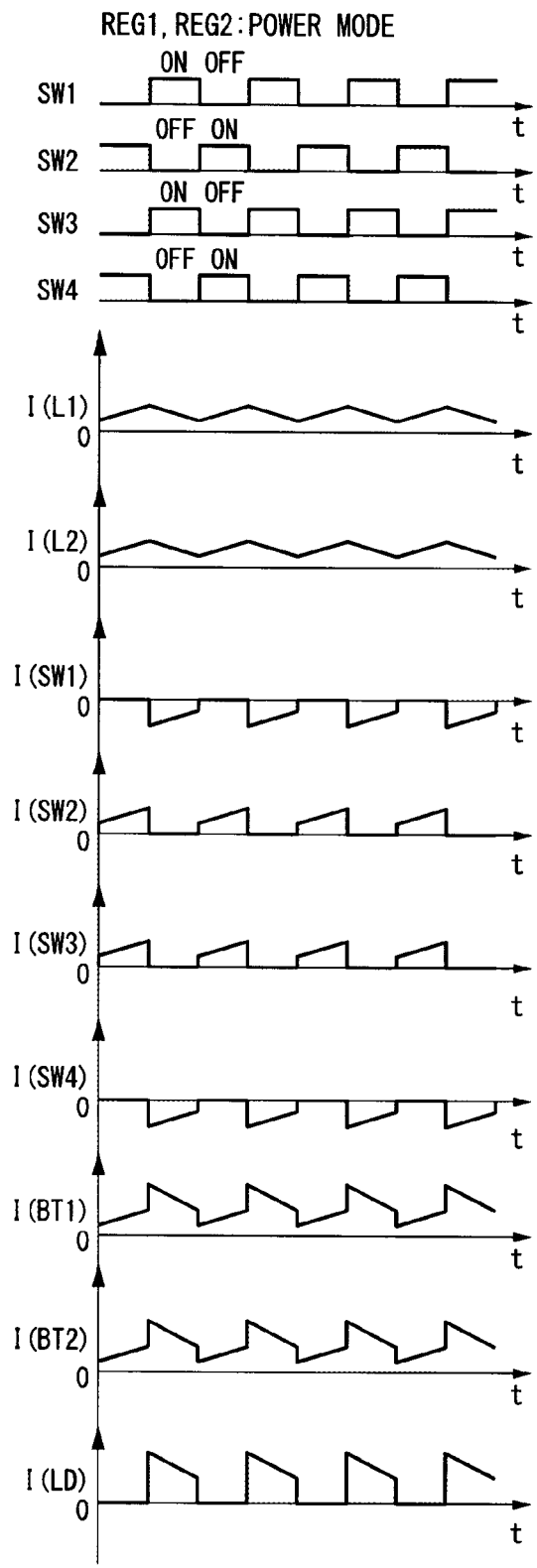

POWER DEVICE

BACKGROUND OF THE INVENTION

1. Field of the Invention

The present invention relates to a power device. Priority is claimed on

Japanese Patent Application No. 2013-119940, filed Jun. 6, 2013, the content of which is incorporated herein by reference.

2. Description of Related Art

A power system which includes a DC-DC converter, two switches including first and second switches, and two power sources including first and second power sources has been known. The power system switches between a serial connection state where the first and second power sources are connected in series and a parallel connection state where the first and second power sources are connected in parallel based on ON/OFF state of the first and second switches, and connects the first and second power sources in the serial connection state or the parallel connection state with an electrical load, while the power system adjusts a voltage applied to the electrical load using the DC-DC converter (for example, refer to Japanese Unexamined Patent Application, First Publication No. 2012-152079).

A power device which includes a step-up converter, four relays including first to fourth relays, and two secondary batteries has been known. The power device switches between a serial connection state where the two secondary batteries are connected in series and a parallel connection state where the two secondary batteries are connected in parallel based on ON/OFF state of the first to fourth relays, and connects the two secondary batteries in the serial connection state or the parallel connection state with an electrical load, while the power device adjusts a voltage applied to the electrical load using the step-up converter (for example, refer to Japanese Unexamined Patent Application, First Publication No. 2012-60838).

Operating points of the DC-DC converter (or the step-up converter) in the power system and power device of the related art described above are substantially limited to only two points including a first point where the first and second power sources (or secondary batteries) are connected in parallel and the step-up ratio is one and a second point where the first and second power sources (or the secondary batteries) are connected in series and the step-up ratio is two. Therefore, an operation point at which the step-up ratio is an arbitrary value more than 2 is desired.

The present invention provides a power device which is capable of stepping up voltages of a first power source and a second power source to an arbitrary voltage more than a voltage in which the first power source and the second power source are connected in series.

SUMMARY OF THE INVENTION (1) A power device according to one aspect of the present invention may include a first power source and a second power source, a load configured to be driven by power supplied from the first power source and the second power source, and a voltage control unit configured to control a voltage to be applied to the load. The voltage control unit may include a first reactor and a second reactor, a plurality of switches, at least one of a first step-up circuit and a second step-up circuit, and first to sixth nodes. A positive electrode of the second power source may be connected to the first node, and a negative electrode of the second power source may be connected to the second node. A positive electrode of the first power source may be connected to the third node, and a negative electrode of the first power source may be connected to the fourth node. A first end of the second reactor may be connected to the fifth node, and a second end of the second reactor may be connected to the second node. A first end of the first reactor may be connected to the sixth node, and a second end of the first reactor may be connected to the third node. The plurality of switches may include a first switch, a second switch, and a third switch. The first switch may have two ends, each of which is connected to one of both the fifth node and the sixth node, both the second node and the sixth node, and both the fifth node and the third node. The second switch may have two ends, each of which is connected to both the sixth node and the fourth node. The third switch may have two ends, each of which is connected to both the first node and the fifth node. The first step-up circuit may include the first reactor, and the first and second switches, and may be connected to the first power source. The second step-up circuit may include the second reactor, and the first and third switches, and may be connected to the second power source. The voltage control unit may be configured to control the voltage to be applied to the load to be an arbitrary voltage equal to or more than a summed voltage of a voltage of the first power source and a voltage of the second power source based on a duty of an ON and OFF switching operation of the switch.

(2) In the power device described in (1), the first switch may be a bidirectional switch. Each of the two ends of the first switch may be connected to both the fifth node and the sixth node. The plurality of switches may include a fourth switch, and a fifth switch. The fourth switch may have two ends, each of which is connected to both the fifth node and the fourth node. The fifth switch may have two ends, each of which is connected to both the first node and the sixth node. The voltage control unit may include the first step-up circuit and the second step-up circuit. The first step-up circuit may include the first, second and fourth switches. The second step-up circuit may include the first, third and fifth switches.

(3) In the power device described in (1), each of the two ends of the first switch may be connected to both the second node and the sixth node. The plurality of switches may include a fourth switch which has two ends, each of which is connected to both the fifth node and the third node. The voltage control unit may include the first step-up circuit and the second step-up circuit. The second step-up circuit may include the fourth switch instead of the first switch.

(4) In the power device described in (3), the first and fourth switches may be bidirectional switches. The plurality of switches may include a fifth switch and a sixth switch. The fifth switch may have two ends, each of which is connected to both the first node and the sixth node. The sixth switch may have two ends, each of which is connected to both the fifth node and the fourth node. The first step-up circuit may include the first, second and fifth switches. The second step-up circuit may include the third, fourth and sixth switches.

(5) In the power device described in (3), the voltage control unit may include a seventh node provided between the second node and the second reactor, and an eighth node provided between the third node and the first reactor. The plurality of switches may include a fifth switch, a sixth switch, a seventh switch, and an eighth switch. The fifth switch may have two ends, each of which is connected to both the third node and the eighth node. The sixth switch may have two ends, each of which is connected to both the eighth node and the fourth node. The seventh switch may have two ends, each of which is connected to both the first node and the seventh node. The eighth switch may have two ends, each of which is connected to both the seventh node and the second node. The first step-up circuit may have the first, second, fifth and sixth switches. The second step-up circuit may have the third, fourth, seventh and eighth switches.

(6) In the power device described in any one of (2), (4), and (5), the voltage control unit may be configured to control unit controls the voltage to be applied to the load to be an arbitrary voltage ranging from a voltage equal to a greater of the voltage of the first power source and the voltage of the second power source to a summed voltage of the voltage of the first power source and the voltage of the second power source based on a duty of an ON and OFF switching operation of the switch.

(7) In the power device described in any one of (1) to (6), the first reactor and the second reactor may be magnetically coupled.

In the power device according to the aspect described in any one of (1) to (5), the first step-up circuit steps up the voltage of the first power source by driving the first switch and the second switch so that the first switch and the second switch are inverted and each first and second switch is switched between ON and OFF. The second step-up circuit steps up the voltage of the second power source by driving the first switch and the third switch so that the first switch and the third switch are inverted and each first and third switch is switched between ON and OFF. Thereby, the voltage to be applied to the load can be easily controlled to be an arbitrary voltage equal to or more than the summed voltage of the voltage of the first power source and the voltage of the second power source by controlling the duty of the switching operation in the pair of the first and second switches and the pair of the first and third switches.

In the case of (6), the voltage to be applied to the load can be easily set to an arbitrary voltage ranging from a voltage equal to the greater of the voltage of the first power source and the voltage of the second power source to a voltage equal to the summed voltage of the voltage of the first power source and the voltage of the second power source, in addition to an arbitrary voltage equal to or more than the summed voltage of the voltage of the first power source and the voltage of the second power source, by controlling the duty of the switching operation of each switch.

In the case of (7), the frequency of the current flowing through the first reactor and the second reactor may be more than the switching frequency, and the frequency of magnetostrictive noise generated in the first reactor and the second reactor can be increase to be outside the audible band.

BRIEF DESCRIPTION OF THE DRAWINGS

FIG. 6C is a diagram showing ON/OFF of each switching device and a variation of each current when the power device according to the variation of the first embodiment of the present invention is in the regenerative mode.

FIG. 12A is a diagram showing ON/OFF of each switching device and a variation of each current when the power device according to the second embodiment of the present invention is in the powering operation of the second control mode.

DESCRIPTION OF EMBODIMENTS

Hereinafter, a power device according to an embodiment of the present invention will be described with reference to the attached drawings.

The power device according to the embodiment of the present invention provides a direct-current power to a load such as an inverter. The inverter controls a power mode and a regenerative mode of an electric motor which can produce, for example, a drive force to run a vehicle.

First Embodiment

Figure 1:
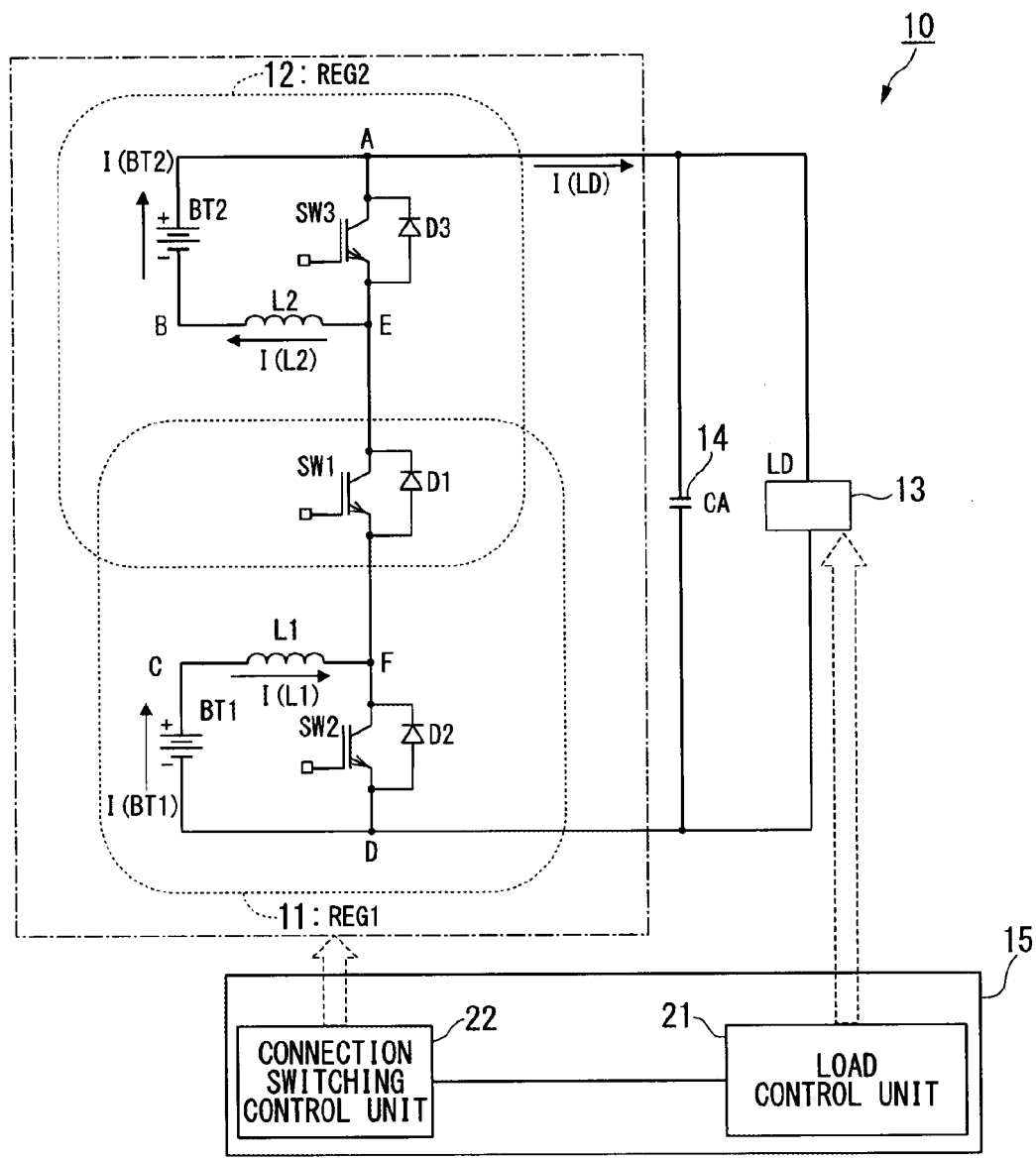
FIG. 1 is a configuration diagram showing a power device according to a first embodiment of the present invention.

As shown in FIG. 1, a power device 10 according to a first embodiment of the present invention includes a first direct-current power converter circuit (REG1) 11, a second direct-current power converter circuit (REG2) 12, a load (LD) 13, a capacitor (CA) 14, and a control device 15. The load 13 can be driven using a direct-current power supplied from the first and second direct-current power converter circuits 11 and 12 and can supply a generated direct-current power to the first and second direct-current power converter circuits 11 and 12. The capacitor (CA) 14 is connected to both ends of the load 13.

The first direct-current power converter circuit (REG1) 11 includes a first power source BT1 such as a battery, first and second switching devices SW1 and SW2 such as IGBT (Insulated Gate Bipolar mode Transistor), which configure a first switch group, and a first reactor L1.

The second direct-current power converter circuit (REG2) 12 includes a second power source BT2 such as a battery, first and third switching devices SW1 and SW3 such as IGBT, which configure a second switch group, and a second reactor L2.

The first and second direct-current power converter circuits 11 and 12 include the common first switching device SW1.

A first voltage VB1 output from the first power source BT1 and a second voltage VB2 output from the second power source BT2 have a predetermined voltage difference Vd (=VB2−VB1), including zero.

The power device 10 includes first to sixth nodes A to F.

A positive electrode of the second power source BT2 is connected to the first node A, and a negative electrode of the second power source BT2 is connected to the second node B. A positive electrode of the first power source BT1 is connected to the third node C, and a negative electrode of the first power source BT1 is connected to the fourth node D. One end of the second reactor L2 is connected to the fifth node E, and the other end of the second reactor L2 is connected to the second node B. One end of the first reactor L1 is connected to the sixth node F, and the other end of the first reactor L1 is connected to the third node C.

A collector and an emitter of the first switching device SW1 are connected to the fifth node E and the sixth node F, respectively. A collector and an emitter of the second switching device SW2 are connected to the sixth node F and the fourth node D, respectively. A collector and an emitter of the third switching device SW3 are connected to the first node A and the fifth node E, respectively. Diodes D1 to D3 are connected between the emitter and the collector of the switching devices SW1 to SW3, respectively. The direction from the emitter to the collector of each switching device SW1 to SW3 is a forward direction of each diode D1 to D3.

The first and second direct-current power converter circuits 11 and 12 are controlled based on pulse-width-modulated signals (PWM signals) output from the control device 15 and input into a gate of each switching device SW1 to SW3 so that the first and second direct-current power converter circuits 11 and 12 are driven independently from each other.

In more detail, the first and second direct-current power converter circuits 11 and 12 are controlled so that a switching operation for at least one of a pair of the first and second switching devices SW1 and SW2 included in the first direct-current power converter circuit 11 and a pair of the first and third switching devices SW1 and SW3 included in the second direct-current power converter circuit 12 is performed. In this switching operation, each switching device SW1 to SW3 is switched between close (ON) and open (OFF).

Figure 2A:
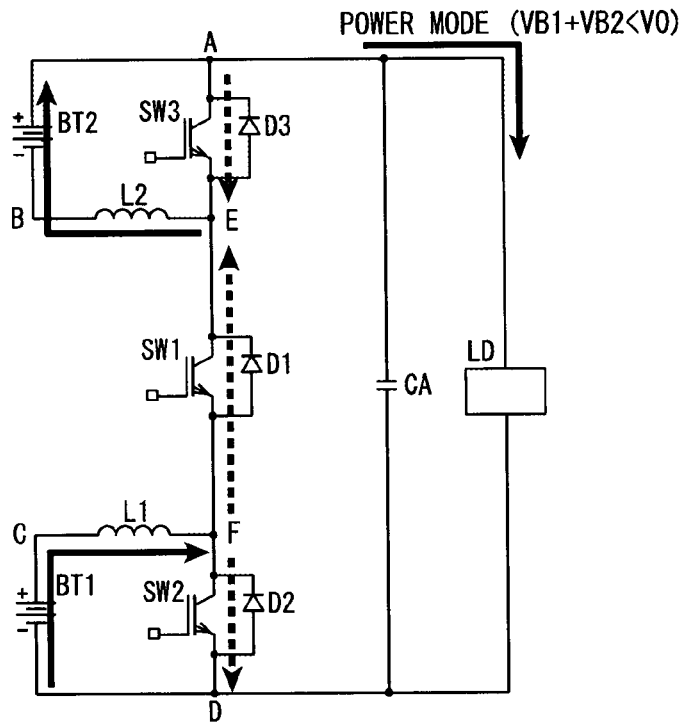
FIG. 2A is a diagram showing a current flow when the power device according to the first embodiment of the present invention is in a power mode.

For example, as shown in FIG. 2A, when the first direct-current power converter circuit 11 is in a power mode where the first direct-current power converter circuit 11 supplies a direct-current power to the load 13, the first switching device SW1 is turned off and the second switching device SW2 is turned on. Thereby, the first reactor L1 is excited by flowing a circulating current through the first power source BT1, the first reactor L1, and the second switching device SW2 in series, and a first reactor current I(L1) flowing through the first reactor L1 is increased. On the other hand, by turning on the first switching device SW1 and turning off the second switching device SW2, current flows into the load 13 via the first power source BT1, the first reactor L1, the first switching device SW1 and the first diode D1, the second reactor L2, and the second power source BT2.

Figure 2B:
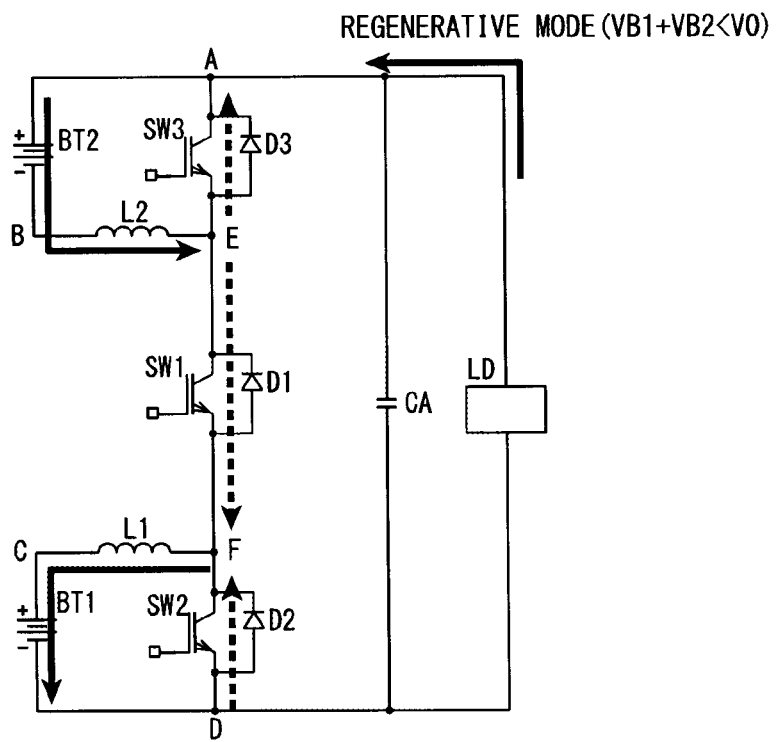
FIG. 2B is a diagram showing a current flow when the power device according to the first embodiment of the present invention is in a regenerative mode.

For example, as shown in FIG. 2B, when the first direct-current power converter circuit 11 is in a regenerative mode where a direct-current power is supplied from to the load 13, the first switching device SW1 is turned on and the second switching device SW2 is turned off. Thereby, current flows via the second power source BT2, the second reactor L2, the first switching device SW1, the first reactor L1, and the first power source BT1 in series. On the other hand, by turning off the first switching device SW1 and turning on the second switching device SW2, a circulating current flows via the second switching device SW2 and the second diode D2, the first reactor L1, and the first power source BT1 in series.

For example, as shown in FIG. 2A, when the second direct-current power converter circuit 12 is in a power mode where the second direct-current power converter circuit 12 supplies a direct-current power to the load 13, the first switching device SW1 is turned off and the third switching device SW3 is turned on. Thereby, the second reactor L2 is excited by flowing a circulating current through the second power source BT2, the third switching device SW3, and the second reactor L2 in series, and a second reactor current I(L2) flowing through the second reactor L2 is increased. On the other hand, by turning on the first switching device SW1 and turning off the third switching device SW3, current flows into the load 13 via the first power source BT1, the first reactor L1, the first switching device SW1 and the first diode D1, the second reactor L2, and the second power source BT2.

For example, as shown in FIG. 2B, when the second direct-current power converter circuit 12 is in a regenerative mode where a direct-current power is supplied from to the load 13, the first switching device SW1 is turned on and the third switching device SW3 is turned off. Thereby, current flows via the second power source BT2, the second reactor L2, the first switching device SW1, the first reactor L1, and the first power source BT1 in series. On the other hand, by turning off the first switching device SW1 and turning on the third switching device SW3, a circulating current flows via the second reactor L2, the third switching device SW3 and the third diode D3, and the second power source BT2 in series.

The control device 15 includes a load control unit 21 and a connection switching control unit 22.

The load control unit 21 controls the operation of the load 13. For example, if the load 13 includes an electric motor such as a three-phase brushless DC motor and an inverter for controlling the power mode and regenerative mode of the electric motor, the load control unit 21 controls a power conversion operation of the inverter. In more detail, when the electric motor is in the power mode, the load control unit 21 converts a direct-current power applied between both electrodes at the direct current side of the inverter into a three-phase alternating-current power, performs a commutation of a conduction for each phase of the electric motor sequentially, and thereby, each phase current, which is alternating-current, flows. On the other hand, when the electric motor is in the regenerative mode, the load control unit 21 converts the generated alternating-current power output from the electric motor into a direct-current power, while the load control unit 21 synchronizes the operations of the inverter based on a rotation angle of the electric motor.

The connection switching control unit 22 can drive the first and second direct-current power converter circuits 11 and 12 independently from each other by inputting signals (PWM signals) based on a pulse width modulation (PWM) into a gate of each switching device SW1 to SW3. The connection switching control unit 22 controls the first and second direct-current power converter circuits 11 and 12 so that a switching operation for at least one of a pair of the first and second switching devices SW1 and SW2 included in the first direct-current power converter circuit 11 and a pair of the first and the third switching devices SW1 and SW3 included in the second direct-current power converter circuit 12 is performed. Thereby, the connection switching control unit 22 controls a voltage V0 (a load voltage), which is applied to the load 13, to be a voltage equal to or more than the summed voltage of the first voltage VB1 of the first power source BT1 and the second voltage VB2 of the second power source BT2 (=VB1+VB2).

The connection switching control unit 22 controls a switching operation of the first switching device SW1 and the second switching device SW2 included in the first direct-current power converter circuit 11 based on a first duty DT1. In the switching operation, the first switching device SW1 and the second switching device SW2 are inverted and the alternative close and open (ON/OFF) switching operations of each switching device SW1 and SW2 are performed. As represented by the following equation (1), the first duty DT1 is defined by ON time t(SW1) of the first switching device SW1 and ON time t(SW2) of the second switching device SW2.

For example, when the first switching device SW1 is turned on and the second switching device SW2 is turned off, the first duty DT1 is 0%. On the other hand, when the first switching device SW1 is turned off and the second switching device SW2 is turned on, the first duty DT1 is 100%.

The connection switching control unit 22 can step up the first voltage VB1 based on the first duty DT1 and output the step-up voltage from the first direct-current power converter circuit 11. The connection switching control unit 22 controls output voltage V10 of the first direct-current power converter circuit 11 (in other words, the voltage applied between the fifth node E and the fourth node D) based on the first voltage VB1 and the first duty DT1.

$$\left. \begin{array}{l} DT1 = \dfrac{t(SW2)}{t(SW1)+t(SW2)} \\ DT2 = \dfrac{t(SW3)}{t(SW1)+t(SW3)} \end{array} \right\} \quad (1)$$

The connection switching control unit 22 controls a switching operation of the first switching device SW1 and the third switching device SW3 included in the second direct-current power converter circuit 12 based on a second duty DT2. In the switching operation, the first switching device SW1 and the third switching device SW3 are inverted and the alternative close and open (ON/OFF) switching operations of each switching device SW1 and SW3 are performed. As represented by the equation (1) described above, the second duty DT2 is defined by ON time t(SW1) of the first switching device SW1 and ON time t(SW3) of the third switching device SW3.

For example, when the third switching device SW3 is turned off and the first switching device SW1 is turned on, the second duty DT2 is 0%. On the other hand, when the third switching device SW3 is turned on and the first switching device SW1 is turned off, the second duty DT2 is 100%.

The connection switching control unit 22 can step up the second voltage VB2 based on the second duty DT2 and output the step-up voltage from the second direct-current power converter circuit 12. The connection switching control unit 22 controls output voltage V20 of the second direct-current power converter circuit 12 (in other words, the voltage applied between the first node A and the sixth node F) based on the second voltage VB2 and the second duty DT2.

The connection switching control unit 22 drives the first and second direct-current power converter circuits 11 and 12 one at a time or simultaneously. Thereby, the load voltage V0 can be controlled to be a voltage equal to or more than the summed voltage (=VB1+VB2) of the first voltage VB1 and the second voltage VB2.

As described above, the power device 10 according to the first embodiment of the present invention can easily control the load voltage V0 to be an arbitrary voltage equal to or more than the summed voltage (=VB1+VB2) of the first voltage VB1 and the second voltage VB2, by controlling the first duty DT1 and the second duty DT2.

(Variation of the First Embodiment)

Figure 3:
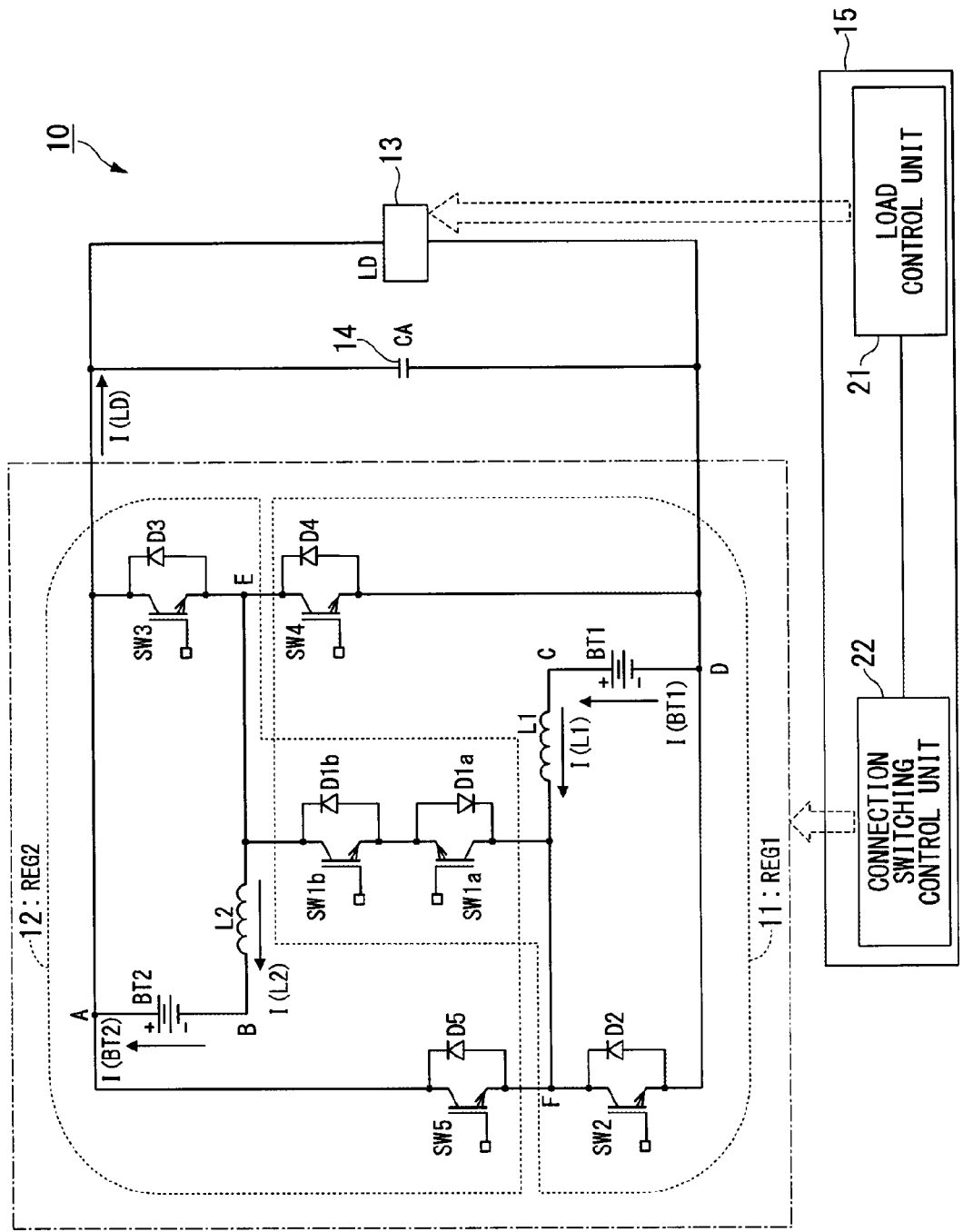
FIG. 3 is a configuration diagram showing a power device according to a variation of the first embodiment of the present invention.

As shown in FIG. 3, a power device 10 according to a variation of the first embodiment of the present invention includes a first switching device SW1, which is a bidirectional switch, and further includes fourth and fifth switching devices SW4 and SW5 in comparison with the first embodiment described above.

The power device 10 according to the variation can control a load voltage V0 to be a voltage ranging from a voltage equal to a greater of first and second voltages VB1 and VB2 to a voltage equal to the summed voltage (=VB1+VB2) of the first and second voltages VB1 and VB2, or to be a voltage equal to or more than the summed voltage of the first and second voltages VB1 and VB2 (=VB1+VB2).

A first direct-current power converter circuit (REG1) 11 includes a first power source BT1, first, second and fourth switching devices SW1, SW2 and SW4, which configure a first switch group, and a first reactor L1.

A second direct-current power converter circuit (REG2) 12 includes a second power source BT2, first, third and fifth switching devices SW1, SW3 and SW5, which configure a second switch group, and a second reactor L2.

The first switching device SW1, which is the bidirectional switch, includes, for example, two switching devices SW1$a$ and SW1$b$. These two switching devices SW1$a$ and SW1$b$ are connected in series to have opposite polarities.

A collector and an emitter of the fourth switching device SW4 are connected to a fifth node E and a fourth node D, respectively. A collector and an emitter of the fifth switching device SW5 are connected to a first node A and a sixth node F, respectively. Diodes D4 and D5 are connected between the emitter and collector of the fourth and fifth switching devices SW4 and SW5, respectively. The direction from the emitter to the collector of each switching device SW4 and SW5 is a forward direction of each diode D4 and D5.

The first and second direct-current power converter circuits 11 and 12 are controlled based on pulse-width-modulated signals (PWM signals) output from the control device 15 and input into a gate of each switching device SW1 to SW5 so that the first and second direct-current power converter circuits 11 and 12 are driven independently from each other.

In more detail, when the load voltage V0 is less than the summed voltage (=VB1+VB2) of the first and second voltages VB1 and VB2, at least one of a pair of the first and fourth switching devices SW1 and SW4 included in the first direct-current power converter circuit 11 and a pair of the first and fifth switching devices SW1 and SW5 included in the second direct-current power converter circuit 12 is controlled to perform a switching operation.

When the load voltage V0 is more than the summed voltage (=VB1+VB2) of the first and second voltages VB1 and VB2, at least one of a pair of the first and second switching devices SW1 and SW2 included in the first direct-current power converter circuit 11 and a pair of the first and third switching devices SW1 and SW3 included in the second direct-current power converter circuit 12 is controlled to perform a switching operation.

In these switching operations, each switching device SW1 to SW5 is switched between close (ON) and open (OFF).

Figure 4A:
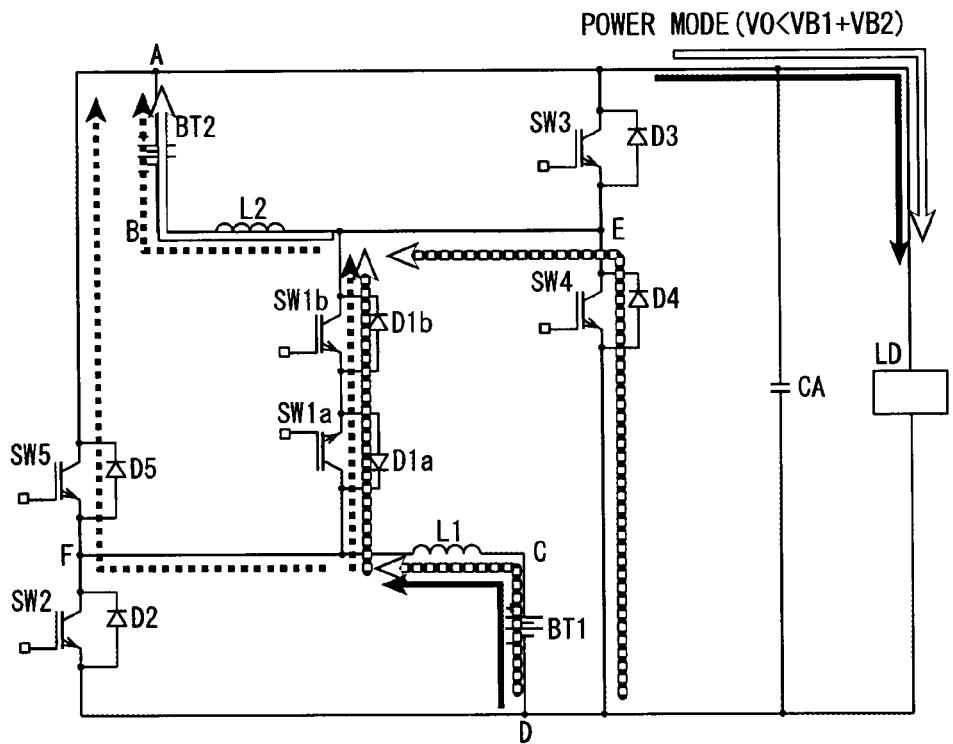
FIG. 4A is a diagram showing a current flow when the power device according to the variation of the first embodiment of the present invention is in a power mode.
Figure 4B:
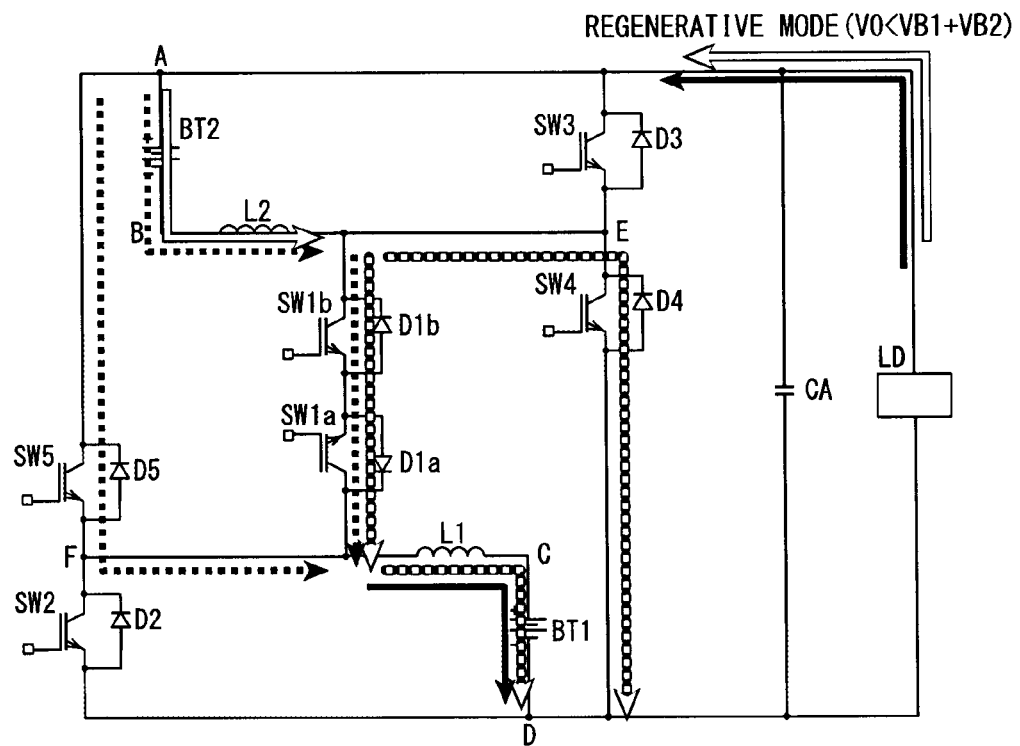
FIG. 4B is a diagram showing a current flow when the power device according to the variation of the first embodiment of the present invention is in a regenerative mode.

For example, as shown in FIGS. 4A and 4B, when the load voltage V0 is less than the summed voltage (=VB1+VB2) of the first and second voltages VB1 and VB2, the first direct-current power converter circuit (REG1) 11 turns off the second switching device SW2.

As shown in FIG. 4A, in a power mode where the first direct-current power converter circuit (REG1) 11 supplies direct-current power to the load 13, the first direct-current power converter circuit (REG1) 11 turns off the fourth switching device SW4 and turns on the first switching device SW1. Thereby, current flows into the load 13 via the first power source BT1, the first reactor L1, the first switching device SW1, the second reactor L2, and the second power source BT2 in series. On the other hand, by turning on the fourth switching device SW4 and turning off the first switching device SW1, a circulating current flows via the fourth switching device SW4 and the fourth diode D4, the second reactor L2, and the second power source BT2 in series.

As shown in FIG. 4B, in a regenerative mode where a direct-current power is supplied from the load 13, the first direct-current power converter circuit 11 turns on the fourth switching device SW4 and turns off the first switching device SW1. Thereby, current flows via the second power source BT2, the second reactor L2 and the fourth switching device SW4 in series. On the other hand, by turning off the fourth switching device SW4 and turning on the first switching device SW1, current flows via the second power source BT2, the second reactor L2, the first switching device SW1, the first reactor L1 and the first power source BT1 in series.

For example, as shown in FIGS. 4A and 4B, when the load voltage V0 is less than the summed voltage (=VB1+VB2) of the first and second voltages VB1 and VB2, the second direct-current power converter circuit (REG2) 12 turns off the third switching device SW3.

As shown in FIG. 4A, in a power mode where the second direct-current power converter circuit (REG2) 12 supplies direct-current power to the load 13, the second direct-current power converter circuit (REG2) 12 turns off the fifth switching device SW5 and turns on the first switching device SW1. Thereby, current flows into the load 13 via the first power source BT1, the first reactor L1, the first switching device SW1, the second reactor L2, and the second power source BT2 in series. On the other hand, by turning on the fifth switching device SW5 and turning off the first switching device SW1, a circulating current flows via the first power source BT1, the first reactor L1, the fifth switching device SW5 and the fifth diode D5 in series.

As shown in FIG. 4B, in a regenerative mode where a direct-current power is supplied from the load 13, the second direct-current power converter circuit (REG2) 12 turns on the first switching device SW1 and turns off the fifth switching device SW5. Thereby, current flows via the second power source BT2, the second reactor L2, the first switching device SW1, the first reactor L1 and the first power source BT1 in series. On the other hand, by turning off the first switching device SW1 and turning on the fifth switching device SW5, current flows via the fifth switching device SW5, the first reactor L1 and the first power source BT1 in series.

Figure 4C:
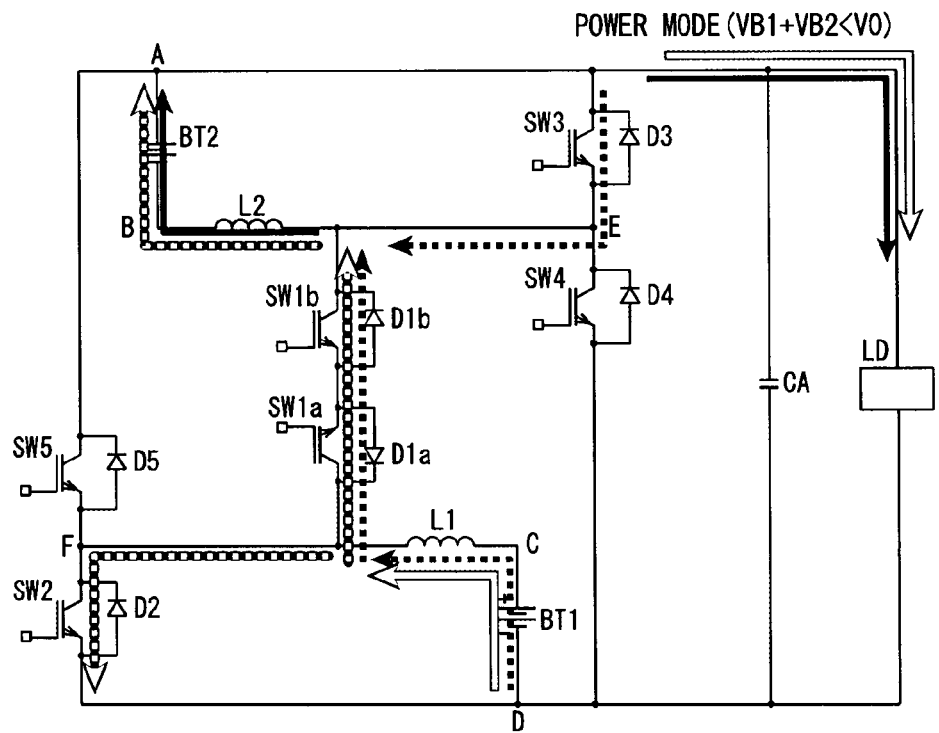
FIG. 4C is a diagram showing a current flow when the power device according to the variation of the first embodiment of the present invention is in the power mode.
Figure 4D:
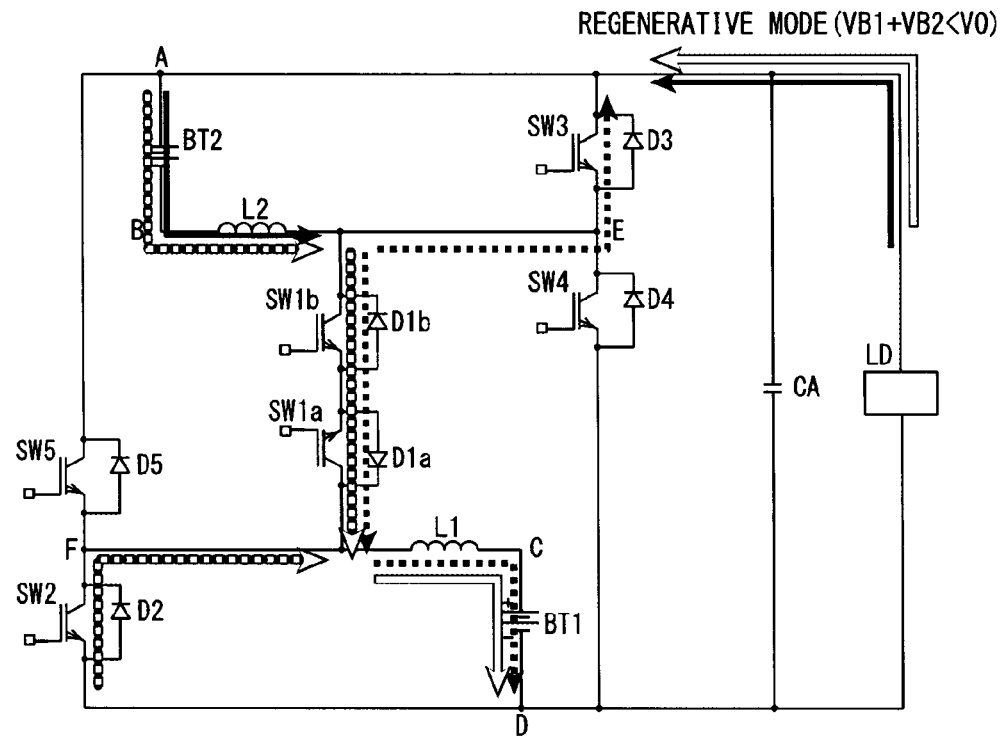
FIG. 4D is a diagram showing a current flow when the power device according to the variation of the first embodiment of the present invention is in the regenerative mode.

For example, as shown in FIGS. 4C and 4D, when the load voltage V0 is more than the summed voltage (=VB1+VB2) of the first and second voltages VB1 and VB2, the first direct-current power converter circuit (REG1) 11 turns off the fourth switching device SW4.

As shown in FIG. 4C, in a power mode where the first direct-current power converter circuit (REG1) 11 supplies direct-current power to the load 13, the first direct-current power converter circuit (REG1) 11 turns off the first switching device SW1 and turns on the second switching device SW2. Thereby, the first reactor L1 is excited by flowing a circulating current through the first power source BT1, the first reactor L1, and the second switching device SW2 in series, and a first reactor current I(L1) flowing through the first reactor L1 is increased. On the other hand, by turning on the first switching device SW1 and turning off the second switching device SW2, current flows into the load 13 via the first power source BT1, the first reactor L1, the first switching device SW1, the second reactor L2, and the second power source BT2 in series.

As shown in FIG. 4D, in a regenerative mode where a direct-current power is supplied from the load 13, the first direct-current power converter circuit (REG1) 11 turns on the first switching device SW1 and turns off the second switching device SW2. Thereby, current flows via the second power source BT2, the second reactor L2, the first switching device SW1, the first reactor L1, and the first power source BT1 in series. On the other hand, by turning off the first switching device SW1 and turning on the second switching device SW2, a circulating current flows via the second switching device SW2 and the second diode D2, the first reactor L1, and the first power source BT1 in series.

For example, as shown in FIGS. 4C and 4D, when the load voltage V0 is more than the summed voltage (=VB1+VB2) of the first and second voltages VB1 and VB2, the second direct-current power converter circuit (REG2) 12 turns off the fifth switching device SW5.

For example, as shown in FIG. 4C, when the second direct-current power converter circuit (REG2) 12 is in a power mode where the second direct-current power converter circuit (REG2) 12 supplies direct-current power to the load 13, the first switching device SW1 is turned off and the third switching device SW3 is turned on. Thereby, the second reactor L2 is excited by flowing a circulating current through the second power source BT2, the third switching device SW3 and the second reactor L2 in series, and a second reactor current I(L2) flowing through the second reactor L2 is increased. On the other hand, by turning on the first switching device SW1 and turning off the third switching device SW3, current flows into the load 13 via the first power source BT1, the first reactor L1, the first switching device SW1, the second reactor L2 and the second power source BT2 in series.

For example, as shown in FIG. 4D, when the second direct-current power converter circuit (REG2) 12 is in a regenerative mode where a direct-current power is supplied from the load 13, the first switching device SW1 is turned on and the third switching device SW3 is turned off. Thereby, current flows via the second power source BT2, the second reactor L2, the first switching device SW1, the first reactor L1 and the first power source BT1 in series. On the other hand, by turning off the first switching device SW1 and turning on the third switching device SW3, a circulating current flows through the second reactor L2, the third switching device SW3 and the third diode D3, and the second power source BT2 in series.

The connection switching control unit 22 can drive the first and second direct-current power converter circuits 11 and 12 independently from each other by inputting pulse-width-modulated signals (PWM signals) into a gate of each switching devices SW1 to SW5.

When the load voltage V0 is less than the summed voltage (=VB1+VB2) of the first and second voltages VB1 and VB2, the connection switching control unit 22 controls the first and second direct-current power converter circuits 11 and 12 so that a switching operation for at least one of a pair of the first and fourth switching devices SW1 and SW4 included in the first direct-current power converter circuit 11 and a pair of the first and third switching devices SW1 and SW3 included in the second direct-current power converter circuit 12 is performed. Thereby, the load voltage V0 is controlled to be a voltage ranging from a voltage equal to the greater of the first voltage VB1 of the first power source BT1 and the second voltage VB2 of the second power source BT2 to a voltage equal to the summed voltage (=VB1+VB2) of the first voltage VB1 and the second voltage VB2.

When the load voltage V0 is more than the summed voltage (=VB1+VB2) of the first and second voltages VB1 and VB2, the connection switching control unit 22 controls the first and second direct-current power converter circuits 11 and 12 so that a switching operation for at least one of a pair of the first and second switching devices SW1 and SW2 included in the first direct-current power converter circuit 11 and a pair of the first and third switching devices SW1 and SW3 included in the second direct-current power converter circuit 12 is performed. Thereby, the load voltage V0 is controlled to be a voltage equal to or more than the summed voltage (=VB1+VB2) of the first voltage VB1 and the second voltage VB2.

The connection switching control unit 22 controls a switching operation of the first switching device SW1 and the fourth switching device SW4 included in the first direct-current power converter circuit 11 based on a first step-down duty DT11. In the switching operation, the first switching device SW1 and the fourth switching device SW4 are inverted and the alternative close and open (ON/OFF) switching operations of each switching device SW1 and SW4 are performed. As represented by the following equation (2), the first step-down duty DT11 is defined by ON time t(SW1) of the first switching device SW1 and ON time t(SW4) of the fourth switching device SW4.

For example, when the first switching device SW1 is turned off and the fourth switching device SW4 is turned on, the first step-down duty DT11 is 0%. On the other hand, when the first switching device SW1 is turned on and the fourth switching device SW4 is turned off, the first step-down duty DT11 is 100%.

The connection switching control unit 22 can step down the first voltage VB1 based on the first step-down duty DT11 and output the step-down voltage from the first direct-current power converter circuit 11. The connection switching control unit 22 controls output voltage V10a of the first direct-current power converter circuit 11 (in other words, the voltage applied between the fifth node E and the fourth node D) as the product of the first voltage VB1 and the first step-down duty DT11 (VB1*DT11=V10a).

$$\left.\begin{aligned} DT11 &= \frac{t(SW1)}{t(SW1)+t(SW4)} \\ DT21 &= \frac{t(SW1)}{t(SW1)+t(SW5)} \\ DT12 &= \frac{t(SW2)}{t(SW1)+t(SW2)} \\ DT22 &= \frac{t(SW3)}{t(SW1)+t(SW3)} \end{aligned}\right\} \quad (2)$$

The connection switching control unit 22 controls a switching operation of the first switching device SW1 and the fifth switching device SW5 included in the second direct-current power converter circuit 12 based on a second step-down duty DT21. In the switching operation, the first switching device SW1 and the fifth switching device SW5 are inverted and the alternative close and open (ON/OFF) switching operations of each switching device SW1 and SW5 are performed. As represented by the equation (2) described above, the second step-down duty DT21 is defined by ON time t(SW1) of the first switching device SW1 and ON time t(SW5) of the fifth switching device SW5.

For example, when the first switching device SW1 is turned off and the fifth switching device SW5 is turned on, the second step-down duty DT21 is 0%. On the other hand, when the first switching device SW1 is turned on and the fifth switching device SW5 is turned off, the second step-down duty DT21 is 100%.

The connection switching control unit 22 can step down the second voltage VB2 based on the second step-down duty DT21 and output the step-down voltage from the second direct-current power converter circuit 12. The connection switching control unit 22 controls output voltage V20a of the second direct-current power converter circuit 12 (in other words, the voltage applied between the first node A and the sixth node F) as the product of the second voltage VB2 and the second step-down duty DT21 (VB2*DT21=V20a).

The connection switching control unit 22 controls a switching operation of the first switching device SW1 and the second switching device SW2 included in the first direct-current power converter circuit 11 based on a first step-up duty DT12. In the switching operation, the first switching device SW1 and the second switching device SW2 are inverted and the alternative close and open (ON/OFF) switching operations of each switching device SW1 and SW2 are performed. As represented by the equation (2) described above, the first step-up duty DT12 is defined by ON time t(SW1) of the first switching device SW1 and ON time t(SW2) of the second switching device SW2.

For example, when the first switching device SW1 is turned on and the second switching device SW2 is turned off, the first step-up duty DT12 is 0%. On the other hand, when the first switching device SW1 is turned off and the second switching device SW2 is turned on, the first step-up duty DT12 is 100%.

The connection switching control unit 22 can step up the first voltage VB1 based on the first step-up duty DT12 and output the step-up voltage from the first direct-current power converter circuit 11. The connection switching control unit 22 controls output voltage V10b of the first direct-current power converter circuit 11 (in other words, the voltage applied between the fifth node E and the fourth node D) based on the first voltage VB1 and the first step-up duty DT12.

The connection switching control unit 22 controls a switching operation of the first switching device SW1 and the third switching device SW3 included in the second direct-current power converter circuit 12 based on a second step-up duty DT22. In the switching operation, the first switching device SW1 and the third switching device SW3 are inverted and the alternative close and open (ON/OFF) switching operations of each switching device SW1 and SW3 are performed. As represented by the equation (2) described above, the second step-up duty DT22 is defined by ON time t(SW1) of the first switching device SW1 and ON time t(SW3) of the third switching device SW3.

For example, when the first switching device SW1 is turned on and the third switching device SW3 is turned off, the second step-up duty DT22 is 0%. On the other hand, when the first switching device SW1 is turned off and the third switching device SW3 is turned on, the second step-up duty DT22 is 100%.

The connection switching control unit 22 can step up the second voltage VB2 based on the second step-up duty DT22 and output the step-up voltage from the second direct-current power converter circuit 12. The connection switching control unit 22 controls output voltage V20b of the second direct-current power converter circuit 12 (in other words, the voltage applied between the first node A and the sixth node F) based on the second voltage VB2 and the second step-up duty DT22.

In each of the case in which the load voltage V0 is less than the summed voltage (=VB1+VB2) of the first and second voltages VB1 and VB2 and the case in which the load voltage V0 is more than the summed voltage (=VB1+VB2) of the first and second voltages VB1 and VB2, the connection switching control unit 22 drives the first and second direct-current power converter circuits 11 and 12 one at a time or simultaneously. Thereby, the load voltage V0 can be controlled to be a voltage ranging from a voltage equal to the greater of the first and second voltages VB1 and VB2 to a voltage equal to the summed voltage (=VB1+VB2) of the first voltage VB1 and the second voltage VB2, or to be a voltage equal to or more than the summed voltage (=VB1+VB2) of the first voltage VB1 and the second voltage VB2.

Figure 5A:
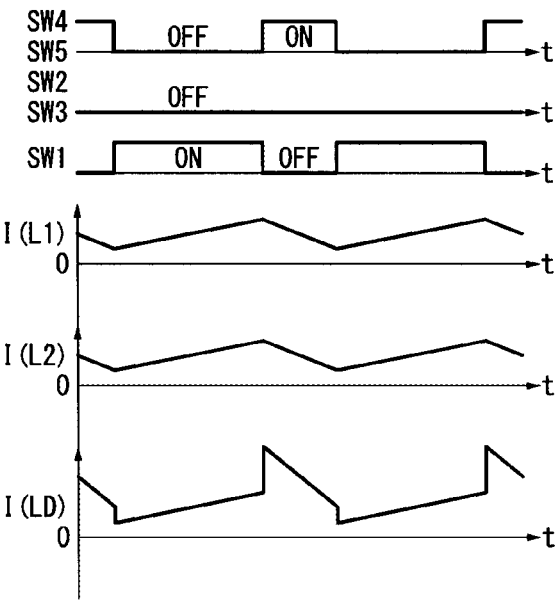
FIG. 5A is a diagram showing ON/OFF of each switching device and a variation of each current when the power device according to the variation of the first embodiment of the present invention is in the power mode.
Figure 5B:
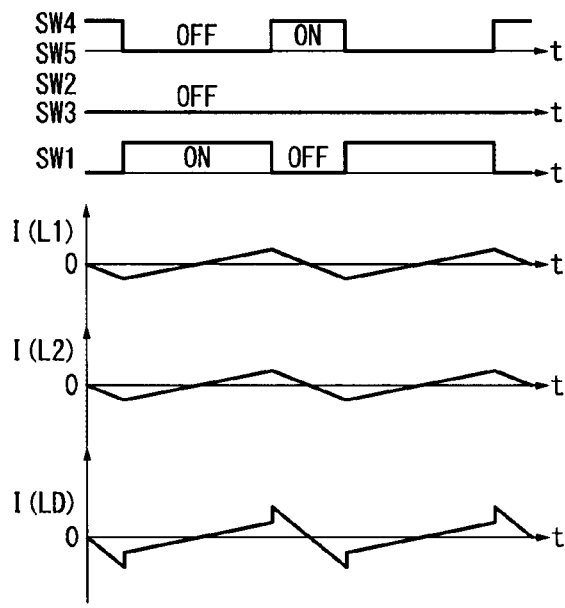
FIG. 5B is a diagram showing ON/OFF of each switching device and a variation of each current when a load included in the power device according to the variation of the first embodiment of the present invention is stopped.
Figure 5C:
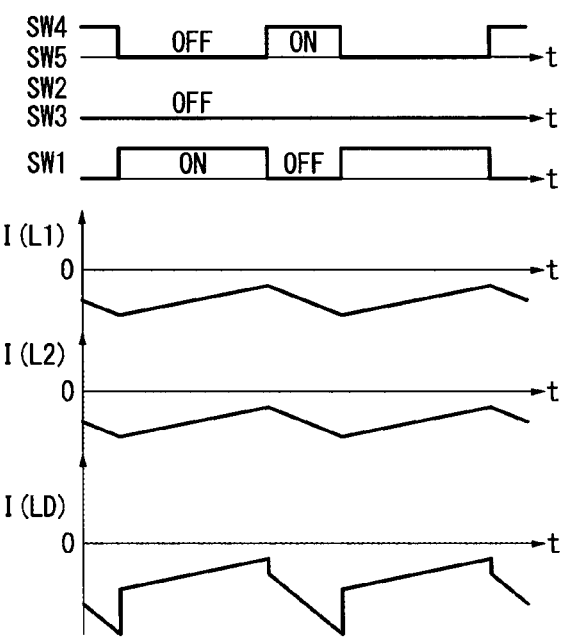
FIG. 5C is a diagram showing ON/OFF of each switching device and a variation of each current when the power device according to the variation of the first embodiment of the present invention is in the regenerative mode.

For example, as shown in FIGS. 5A to 5C, when the load voltage V0 is less than the summed voltage (=VB1+VB2) of the first and second voltages VB1 and VB2, the connection switching control unit 22 simultaneously drives the first and second direct-current power converter circuits 11 and 12. The phase of the switching operation of the first direct-current power converter circuit 11 is the same as that of the second direct-current power converter circuit 12.

Figure 6A:
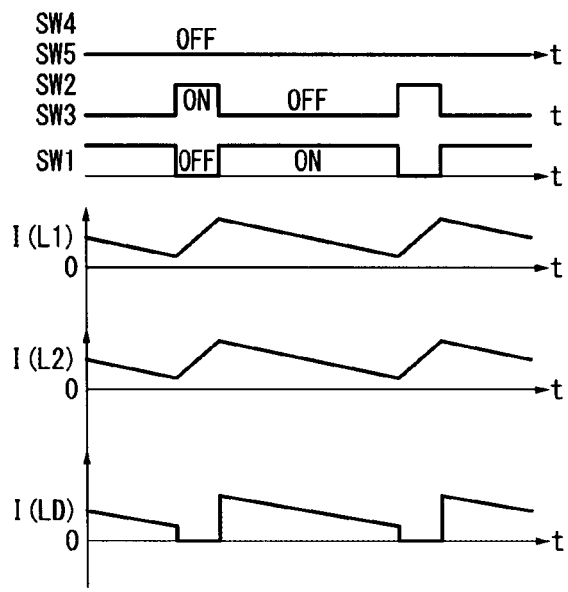
FIG. 6A is a diagram showing ON/OFF of each switching device and a variation of each current when the power device according to the variation of the first embodiment of the present invention is in the power mode.
Figure 6B:
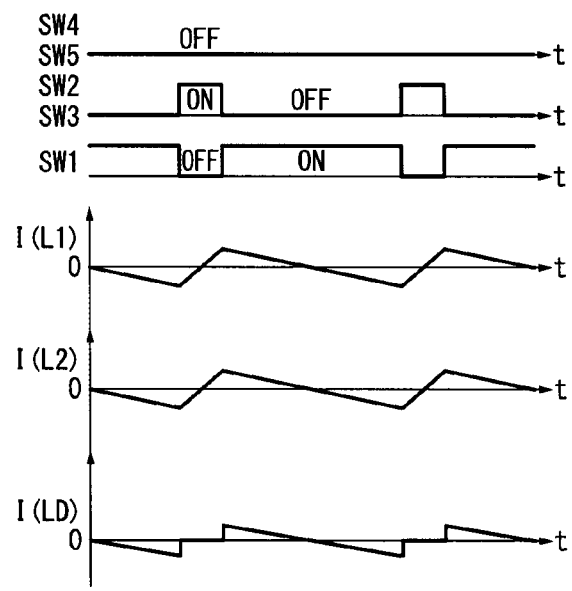
FIG. 6B is a diagram showing ON/OFF of each switching device and a variation of each current when the load included in the power device according to the variation of the first embodiment of the present invention is stopped.

For example, as shown in FIGS. 6A to 6C, when the load voltage V0 is more than the summed voltage (=VB1+VB2) of the first and second voltages VB1 and VB2, the connection switching control unit 22 simultaneously drives the first and second direct-current power converter circuits 11 and 12. The phase of the switching operation of the first direct-current power converter circuit 11 is the same as that of the second direct-current power converter circuit 12.

In a current waveform based on time t shown in FIGS. 5A to 5C and FIGS. 6A to 6C, a positive direction of the first reactor current I(L1) flowing through the first reactor L1 is from the third node C to the sixth node F, as shown in FIG. 3. A positive direction of the second reactor current I(L2) flowing through the second reactor L2 is from the fifth node E to the second node B. A positive direction of each of the current I(BT1) flowing through the first power source BT1 and the current I(BT2) flowing through the second power source BT2 is from the negative electrode to the positive electrode. A positive direction of a summed current I(LD) of currents flowing through the load 13 and the capacitor 14 is from the first node A to the fourth node D.

As described above, the power device 10 according to the variation of the first embodiment of the present invention can easily control the load voltage V0 to be an arbitrary voltage ranging from a voltage equal to the greater of the first and second voltages VB1 and VB2 to a voltage equal to the summed voltage (=VB1+VB2) of the first voltage VB1 and the second voltage VB2 by controlling the first step-down duty DT11 and the second step-down duty DT21. Moreover, the power device 10 according to the variation of the first embodiment of the present invention can easily control the load voltage V0 to be an arbitrary voltage equal to or more than the summed voltage (=VB1+VB2) of the first voltage VB1 and the second voltage VB2 by controlling the first step-up duty DT12 and the second step-up duty DT22.

Second Embodiment

Figure 7:
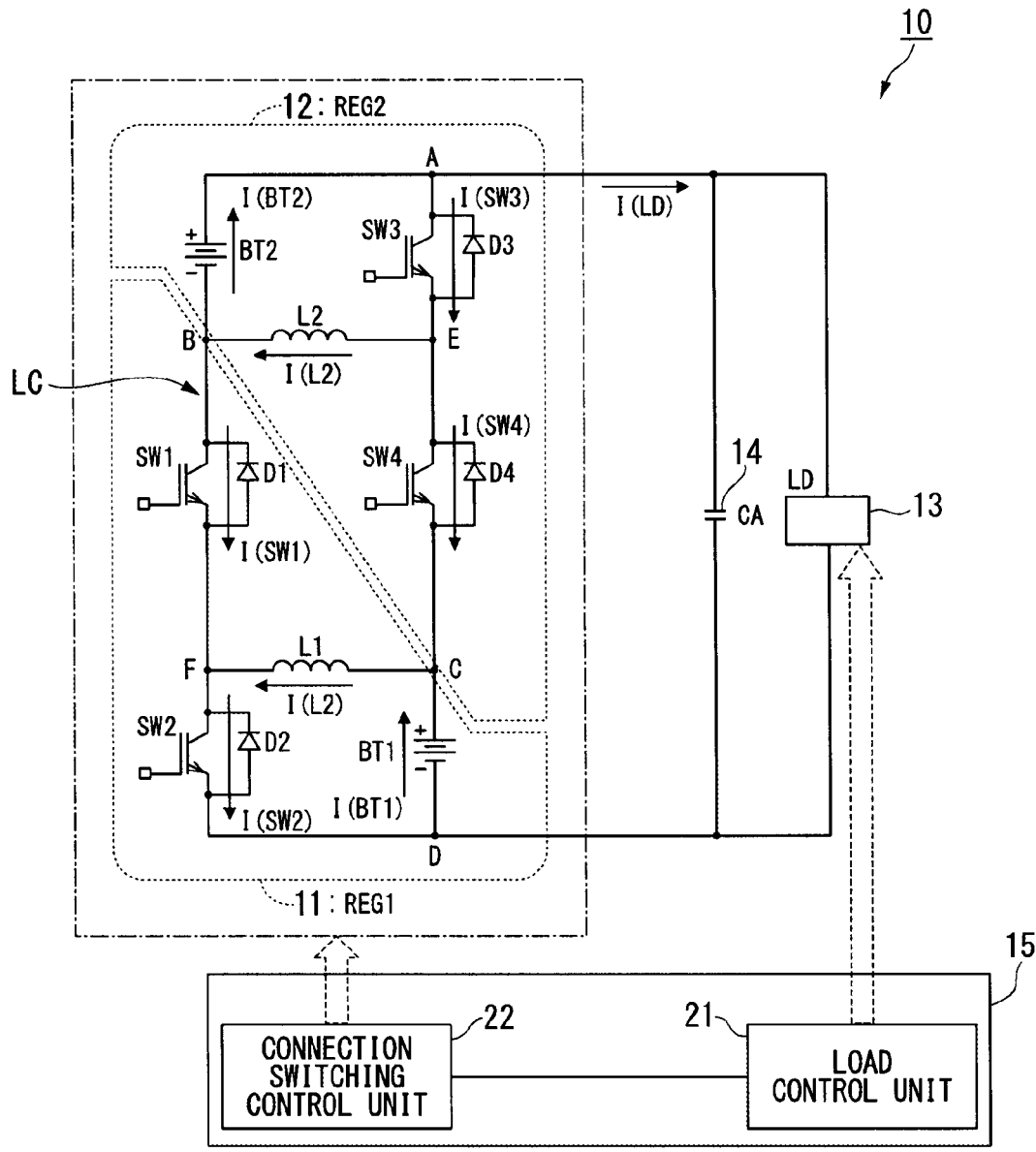
FIG. 7 is a configuration diagram showing a power device according to a second embodiment of the present invention.

As shown in FIG. 7, a power device 10 according to a second embodiment of the present invention includes a first direct-current power converter circuit (REG1) 11, a second direct-current power converter circuit (REG2) 12, a load (LD) 13, a capacitor (CA) 14, and a control device 15. The load 13 can be driven using direct-current power supplied from the first and second direct-current power converter circuits 11 and 12, and can supply generated direct-current power to the first and second direct-current power converter circuits 11 and 12. The capacitor (CA) 14 is connected to both ends of the load 13.

The first direct-current power converter circuit (REG1) 11 includes a first power source BT1 such as a battery, first and second switching devices SW1 and SW2 such as IGBT (Insulated Gate Bipolar mode Transistor), which configure a first switch group, and a first reactor L1.

The second direct-current power converter circuit (REG2) 12 includes a second power source BT2 such as a battery, third and fourth switching devices SW3 and SW4 such as IGBT, which configure a second switch group, and a second reactor L2.

A first voltage VB1 output from the first power source BT1 and a second voltage VB2 output from the second power source BT2 have a predetermined voltage difference Vd (=VB2−VB1), including zero.

The power device 10 includes first to sixth nodes A to F. A positive electrode of the second power source BT2 is connected to the first node A, and a negative electrode of the second power source BT2 is connected to the second node B. A positive electrode of the first power source BT1 is connected to the third node C, and a negative electrode of the first power source BT1 is connected to the fourth node D. One end of the second reactor L2 is connected to the fifth node E, and the other end of the second reactor L2 is connected to the second node B. One end of the first reactor L1 is connected to the sixth node F, and the other end of the first reactor L1 is connected to the third node C.

A collector and an emitter of the first switching device SW1 are connected to the second node B and the sixth node F, respectively. A collector and an emitter of the second switching device SW2 are connected to the sixth node F and the fourth node D, respectively. A collector and an emitter of the third switching device SW3 are connected to the first node A and the fifth node E, respectively. A collector and an emitter of the fourth switching device SW4 are connected to the fifth node E and the third node C, respectively. Diodes D1 to D4 are connected between the emitter and collector of the switching devices SW1 to SW4, respectively. The direction from the emitter to the collector of each switching device SW1 to SW4 is a forward direction of each diode D1 to D4.

The first and second direct-current power converter circuits 11 and 12 are connected at the second node B and the third node C which are common connection points. A loop circuit LC is formed by connecting at least the first and second reactors L1 and L2 in series.

In more detail, in the loop circuit LC, the first reactor L1 and the first switching device SW1 included in the first direct-current power converter circuit 11 and the second reactor L2 and the fourth switching device SW4 included in the second direct-current power converter circuit 12 are connected in series. The first reactor L1 and the first switching device SW1 included in the first direct-current power converter circuit 11 are connected in series, via the sixth node F, between the third node C and the second node B. The second reactor L2 and the fourth switching device SW4 included in the second direct-current power converter circuit 12 are connected in series, via the fifth node E, between the second node B and the third node C.

The first and second direct-current power converter circuits 11 and 12 are controlled based on pulse-width-modulated signals (PWM signals) output from the control device 15 and input into a gate of each switching device SW1 to SW4 so that the first and second direct-current power converter circuits 11 and 12 are driven independently from each other.

In more detail, the first and second direct-current power converter circuits 11 and 12 are controlled so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. In this switching operation, each switching device SW1 to SW4 is switched between close (ON) and open (OFF).

Figure 8A:
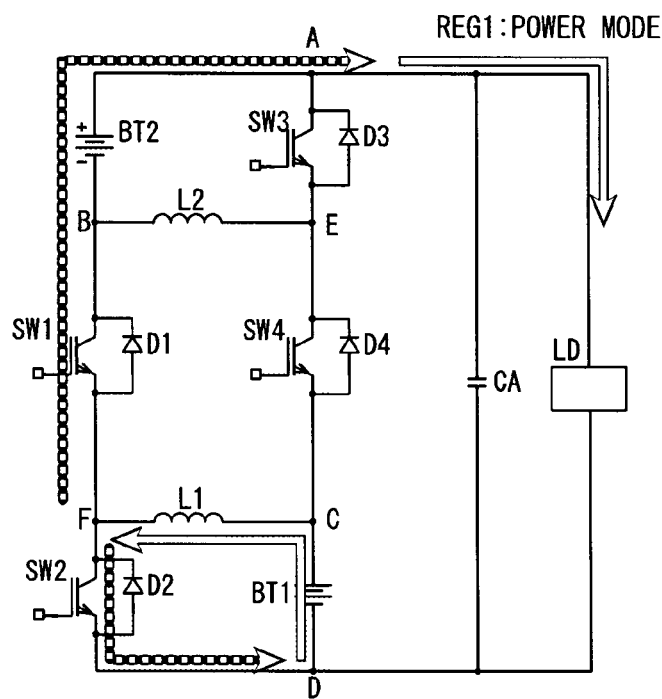
FIG. 8A is a diagram showing ON/OFF of each switching device and a current flow when a first direct-current power converter circuit included in the power device according to the second embodiment of the present invention is in a power mode.
Figure 9A:
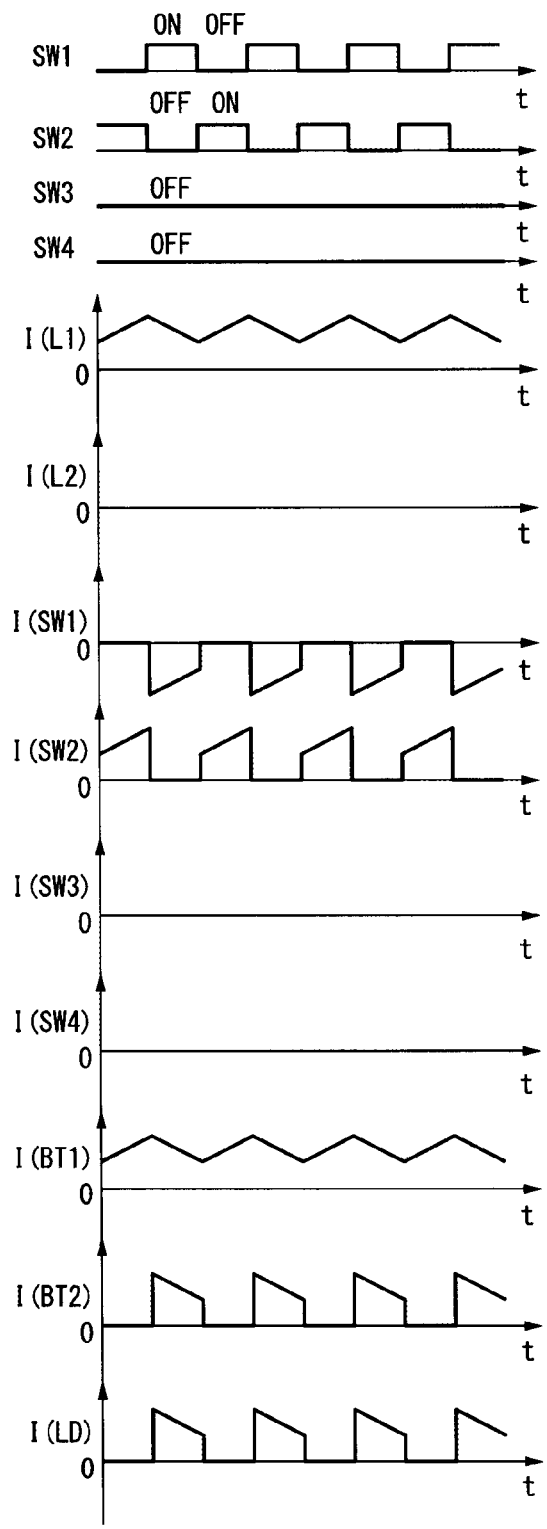
FIG. 9A is a diagram showing ON/OFF of each switching device and a variation of each current when the first direct-current power converter circuit included in the power device according to the second embodiment of the present invention is in the power mode.

For example, as shown in FIGS. 8A and 9A, when the first direct-current power converter circuit 11 is in a power mode where the first direct-current power converter circuit 11 supplies a direct-current power to the load 13, the first switching device SW1 is turned off and the second switching device SW2 is turned on. Thereby, the first reactor L1 is excited by flowing a circulating current through the first power source BT1, the first reactor L1 and the second switching device SW2 in series, and a first reactor current I(L1) flowing through the first reactor L1 is increased.

On the other hand, by turning on the first switching device SW1 and turning off the second switching device SW2, current flows into the load 13 via the first power source BT1, the first reactor L1, the first switching device SW1 and the first diode D1, and the second power source BT2 in series.

Figure 8B:
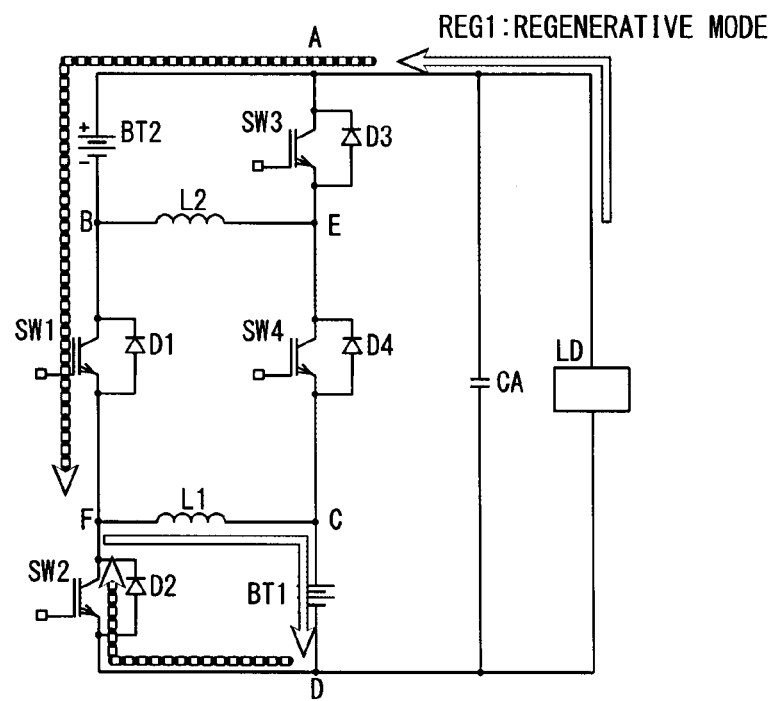
FIG. 8B is a diagram showing ON/OFF of each switching device and a current flow when the first direct-current power converter circuit included in the power device according to the second embodiment of the present invention is in a regenerative mode.
Figure 9B:
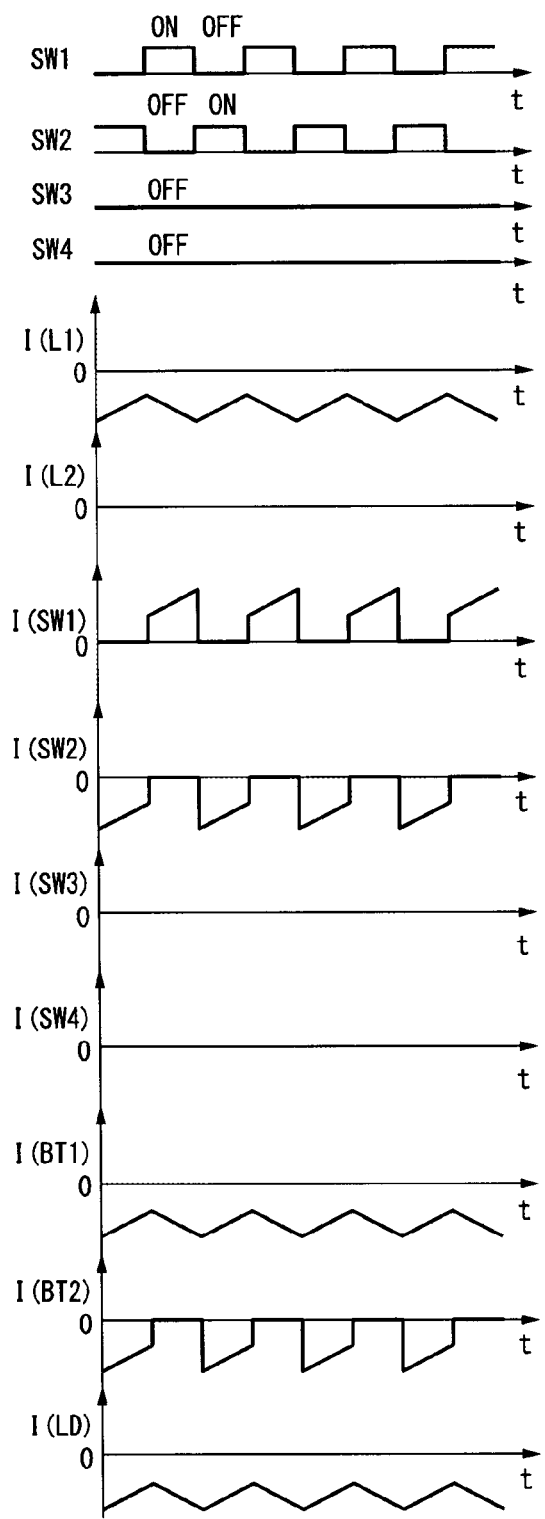
FIG. 9B is a diagram showing ON/OFF of each switching device and a variation of each current when the first direct-current power converter circuit included in the power device according to the second embodiment of the present invention is in the regenerative mode.

For example, as shown in FIGS. 8B and 9B, when the first direct-current power converter circuit 11 is in a regenerative mode where direct-current power is supplied from the load 13, the first switching device SW1 is turned on and the second switching device SW2 is turned off. Thereby, current flows via the second power source BT2, the first switching device SW1, the first reactor L1, and first power source BT1 in series. On the other hand, by turning off the first switching device SW1 and turning on the second switching device SW2, a circulating current flows via the second switching device SW2 and the second diode D2, the first reactor L1 and the first power source BT1 in series.

Figure 8C:
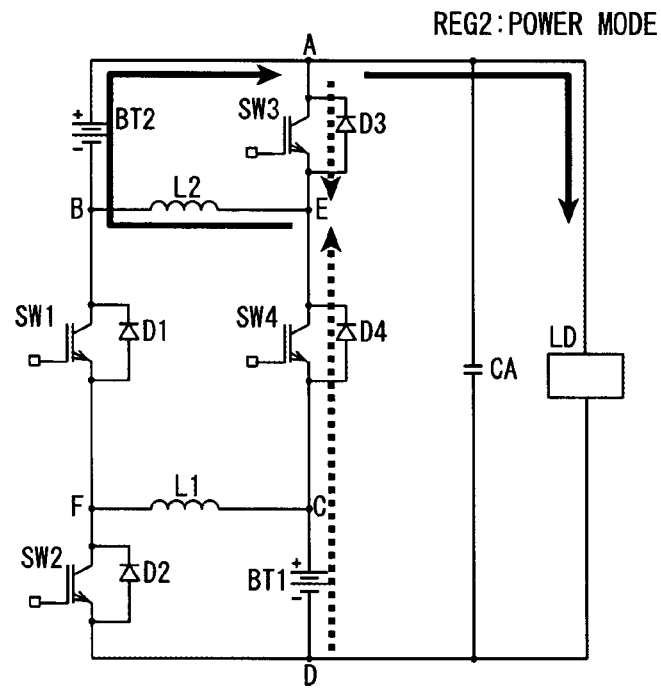
FIG. 8C is a diagram showing ON/OFF of each switching device and a current flow when a second direct-current power converter circuit included in the power device according to the second embodiment of the present invention is in a power mode.
Figure 9C:
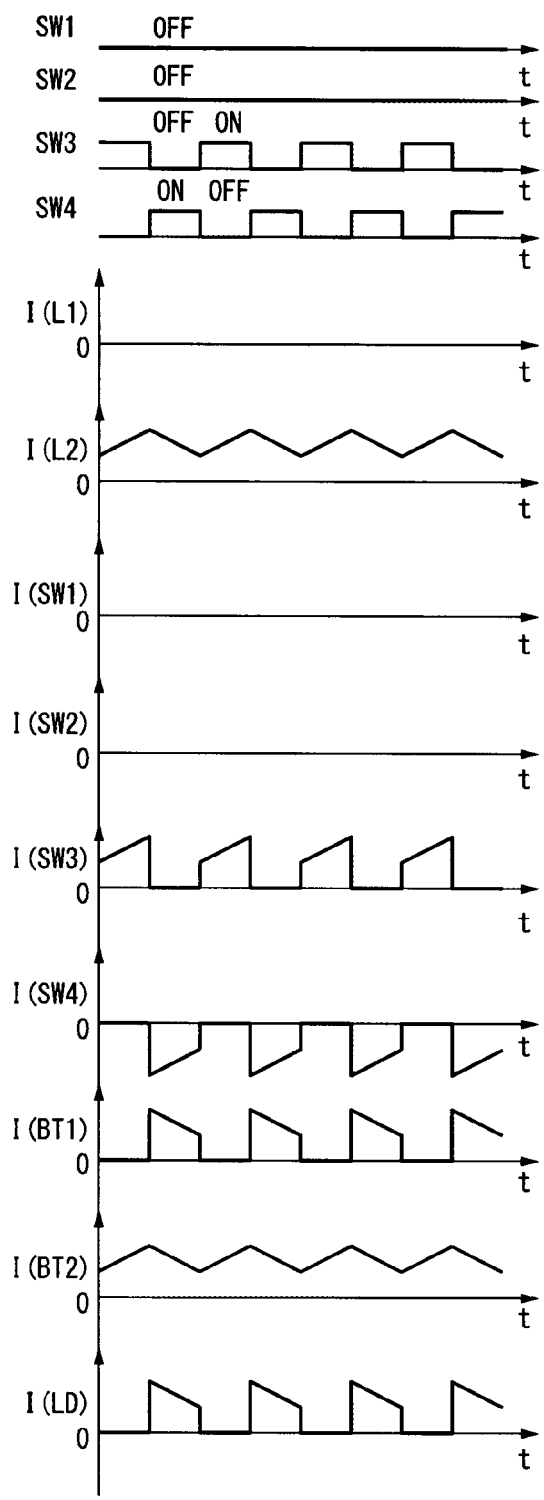
FIG. 9C is a diagram showing ON/OFF of each switching device and a variation of each current when the second direct-current power converter circuit included in the power device according to the second embodiment of the present invention is in the power mode.

For example, as shown in FIGS. 8C and 9C, when the second direct-current power converter circuit 12 is in a power mode where the second direct-current power converter circuit 12 supplies direct-current power to the load 13, the fourth switching device SW4 is turned off and the third switching device SW3 is turned on. Thereby, the second reactor L2 is excited by flowing a circulating current through the second power source BT2, the third switching device SW3 and the second reactor L2 in series, and a second reactor current I(L2) flowing through the second reactor L2 is increased.

On the other hand, by turning on the fourth switching device SW4 and turning off the third switching device SW3, current flows into the load 13 via the first power source BT1, the fourth switching device SW4 and the fourth diode D4, the second reactor L2, and the second power source BT2 in series.

Figure 8D:
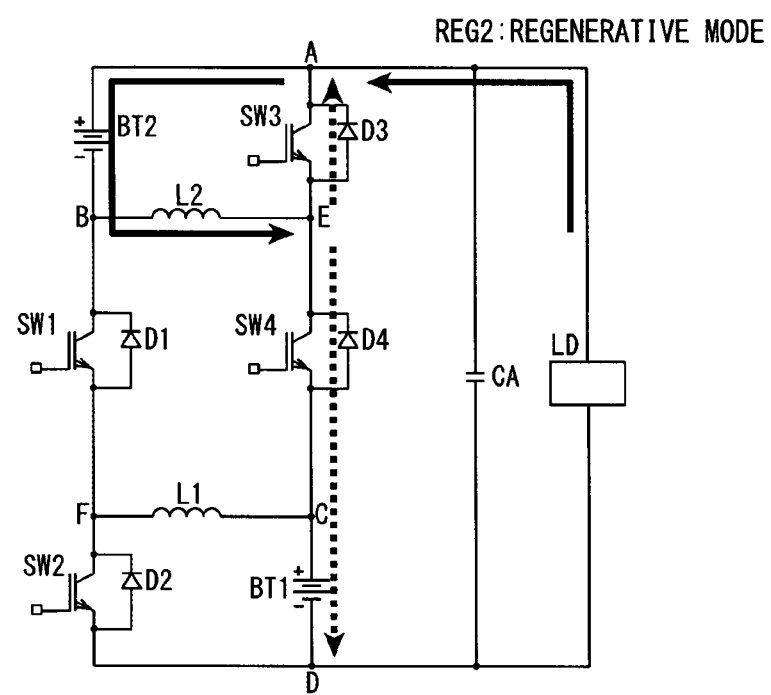
FIG. 8D is a diagram showing ON/OFF of each switching device and a current flow when the second direct-current power converter circuit included in the power device according to the second embodiment of the present invention is in a regenerative mode.
Figure 9D:
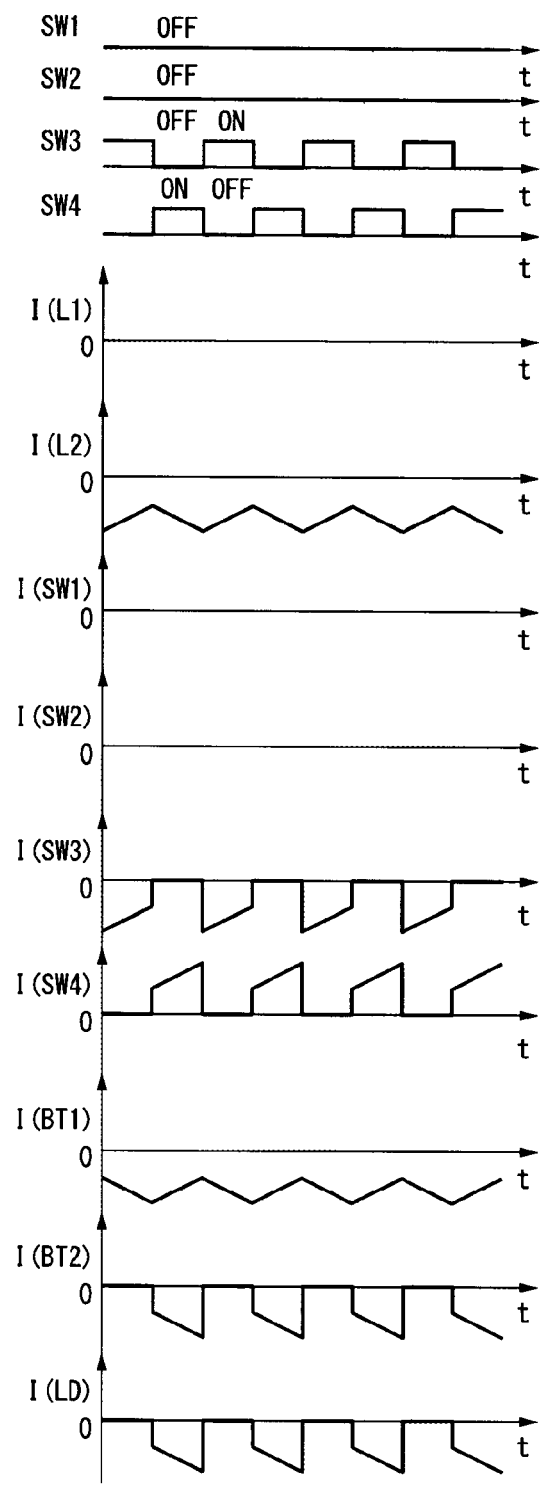
FIG. 9D is a diagram showing ON/OFF of each switching device and a variation of each current when the second direct-current power converter circuit included in the power device according to the second embodiment of the present invention is in the regenerative mode.

For example, as shown in FIGS. 8D and 9D, when the second direct-current power converter circuit 12 is in a regenerative mode where direct-current power is supplied from the load 13, the fourth switching device SW4 is turned on and the third switching device SW3 is turned off. Thereby, current flows via the second power source BT2, the second reactor L2, the fourth switching device SW4 and the first power source BT1 in series. On the other hand, by turning off the fourth switching device SW4 and turning on the third switching device SW3, a circulating current flows via the second reactor L2, the third switching device SW3 and the third diode D3, and the second power source BT2 in series.

In a current waveform based on a time t shown in FIGS. 9A to 9D, as shown in FIG. 7, a positive direction of the first reactor current I(L1) flowing through the first reactor L1 is from the third node C to the sixth node F. A positive direction of the second reactor current I(L2) flowing through the second reactor L2 is from the fifth node E to the second node B. A positive direction of summed currents I(SW1) to I(SW4) of currents flowing through the switching devices SW1 to SW4 and the diodes D1 to D4, respectively, is from the collector to the emitter. A positive direction of each of the current I(BT1) flowing through the first power source BT1 and the current I(BT2) flowing through the second power source BT2 is from the negative electrode to the positive electrode. A positive direction of the summed current I(LD) of currents flowing through the load 13 and the capacitor 14 is from the first node A to the fourth node D.

The control device 15 includes a load control unit 21 and a connection switching control unit 22.

The load control unit 21 controls the operation of the load 13. For example, if the load 13 includes an electric motor such as a three-phase brushless DC motor and an inverter for controlling the power mode and regenerative mode of the electric motor, the load control unit 21 controls a power conversion operation of the inverter. In more detail, when the electric motor is in the power mode, the load control unit 21 converts a direct-current power applied between both electrodes at the direct current side of the inverter into a three-phase alternating-current power, and performs a commutation of a conduction for each phase of the electric motor sequentially, and thereby, each phase current, which is alternating-current, flows. On the other hand, when the electric motor is in the regenerative mode, the load control unit 21 converts the generated alternating-current power output from the electric motor into direct-current power, while the load control unit 21 synchronizes operations of the inverter based on a rotation angle of the electric motor.

The connection switching control unit 22 can drive the first and second direct-current power converter circuits 11 and 12 independently from each other by inputting signals (PWM signals) based on a pulse width modulation (PWM) into a gate of each switching device SW1 to SW4. The connection switching control unit 22 controls the first and second direct-current power converter circuits 11 and 12 so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. Thereby, the connection switching control unit 22 controls a voltage V0, which is to be applied to the load 13 (a load voltage), to be a voltage equal to or more than the summed voltage of the first voltage VB1 and the second voltage VB2 (=VB1+VB2).

The connection switching control unit 22 controls a switching operation of the first switching device SW1 and the second switching device SW2 included in the first direct-current power converter circuit 11 based on a first duty DT1. In the switching operation, the first switching device SW1 and the second switching device SW2 are inverted and the alternative close and open (ON/OFF) switching operations of each switching device SW1 and SW2 are performed. As represented by the following equation (3), the first duty DT1 is defined by ON time t(SW1) of the first switching device SW1 and ON time t(SW2) of the second switching device SW2.

For example, when the first switching device SW1 is turned on and the second switching device SW2 is turned off, the first duty DT1 is 0%. On the other hand, when the first switching device SW1 is turned off and the second switching device SW2 is turned on, the first duty DT1 is 100%.

The connection switching control unit 22 can step up the first voltage VB1 based on the first duty DT1 and output the step-up voltage from the first direct-current power converter circuit 11. The connection switching control unit 22 controls output voltage V10 of the first direct-current power converter circuit 11 (in other words, the voltage applied between the second node B and the fourth node D) based on the first voltage VB1 and the first duty DT1.

$$DT1 = \frac{t(SW2)}{t(SW1)+t(SW2)} = \frac{V0 - 2 \cdot VB2 + Vd}{V0 - VB2}$$
$$DT2 = \frac{t(SW3)}{t(SW3)+t(SW4)} = \frac{V0 - 2 \cdot VB1 - Vd}{V0 - VB1}$$
(3)

The connection switching control unit 22 controls a switching operation of the third switching device SW3 and the fourth switching device SW4 included in the second direct-current power converter circuit 12 based on a second duty DT2. In the switching operation, the third switching device SW3 and the fourth switching device SW4 are inverted and the alternative close and open (ON/OFF) switching operations of each switching device SW3 and SW4 are performed. As represented by the equation (3) described above, the second duty DT2 is defined by ON time t(SW3) of the third switching device SW3 and ON time t(SW4) of the fourth switching device SW4.

For example, when the fourth switching device SW4 is turned on and the third switching device SW3 is turned off, the second duty DT2 is 0%. On the other hand, when the fourth switching device SW4 is turned off and the third switching device SW3 is turned on, the second duty DT2 is 100%.

The connection switching control unit 22 can step up the source voltage VB2 based on the second duty DT2 and output the step-up voltage from the second direct-current power converter circuit 12. The connection switching control unit 22 controls output voltage V20 of the second direct-current power converter circuit 12 (in other words, the voltage applied between the first node A and the third node C) based on the second voltage VB2 and the second duty DT2.

As represented by the equation (3) described above, the first duty DT1 is represented by the desired load voltage V0, the desired voltage difference Vd (=VB2−VB1), and the second voltage VB2 of the second power source BT2, and the second duty DT2 is represented by the desired load voltage V0, the desired voltage difference Vd (=VB2−VB1), and the first voltage VB1 of the first power source BT1. On the other hand, as represented by the following equation (4), based on the voltage difference Vd (=VB2−VB1), the first duty DT1 can be represented by the first voltage VB1 of the first power source BT1, and the second duty DT2 can be represented by the second voltage VB2 of the second power source BT2. In order to prevent a divergence of control responses, the connection switching control unit 22 may control switching operations using, not the duties DT1 and DT2 represented by the following equation (4), but the duties DT1 and DT2 represented by the equation (3) described above.

$$DT1 = \frac{V0 - 2 \cdot VB1 - Vd}{V0 - VB1 - Vd}$$
$$DT2 = \frac{V0 - 2 \cdot VB2 + Vd}{V0 - VB2 + Vd}$$
(4)

The power device 10 according to the second embodiment of the present invention includes the configuration described above. Hereinafter, the operation of the power device 10, that is, the control operation of the connection switching control unit 22 will be described.

(First Control Mode of the Second Embodiment)

In a first control mode, as illustrated in FIGS. 8A to 8D and 9A to 9D, the connection switching control unit 22 drives one of the first and second direct-current power converter circuits 11 and 12 at a time. Thereby, the connection switching control unit 22 can control the load voltage V0 to be a voltage equal to or more than the summed voltage of the first voltage VB1 and the second voltage VB2 (=VB1+VB2).

Figure 10:
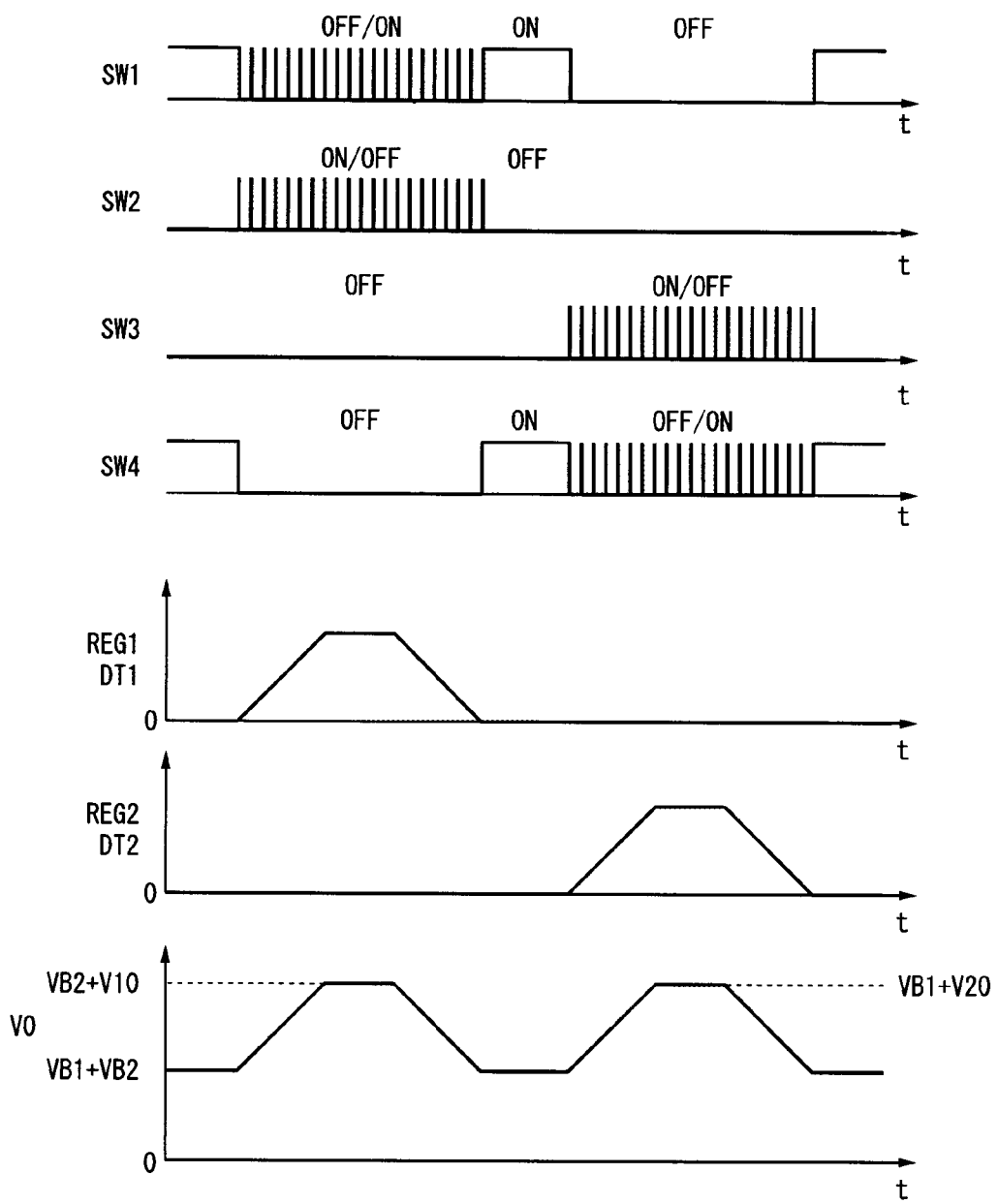
FIG. 10 is a diagram showing a variation of ON/OFF of each switching device, a variation of first and second duties, and a variation of a load voltage when the power device according to the second embodiment of the present invention is in a first control mode.
Figure 11A:
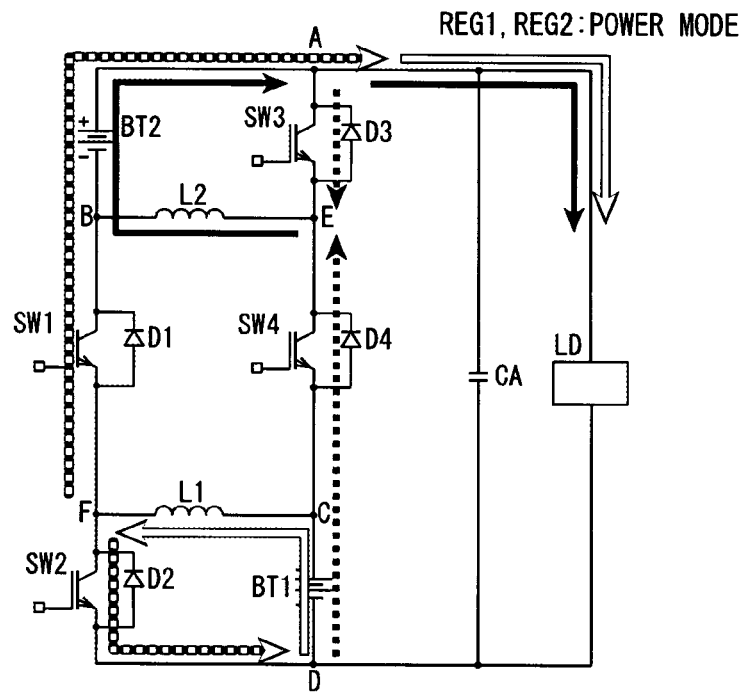
FIG. 11A is a diagram showing ON/OFF of each switching device and each current flow when the power device according to the second embodiment of the present invention is in a powering operation of a second control mode.
Figure 11B:
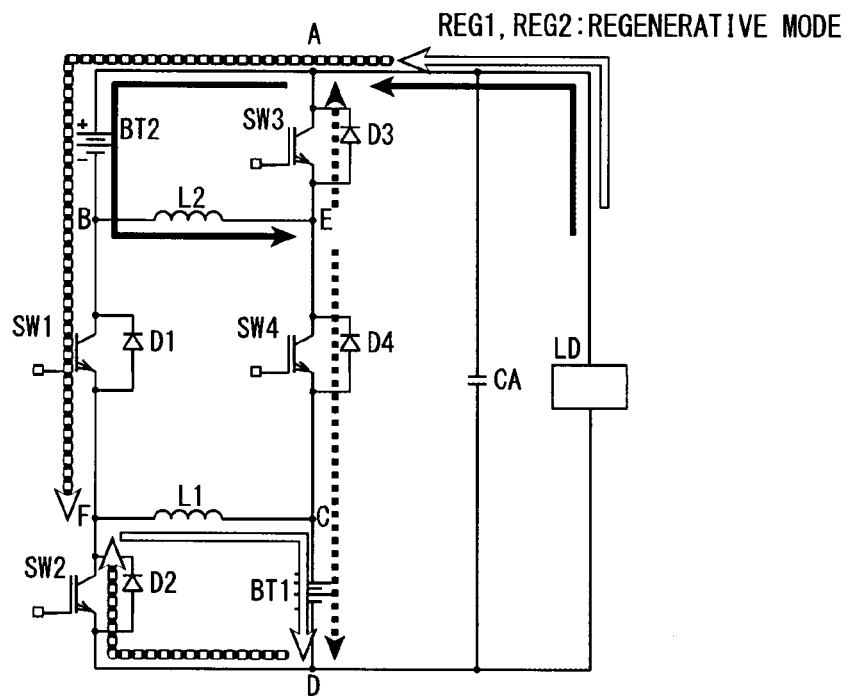
FIG. 11B is a diagram showing ON/OFF of each switching device and each current flow when the power device according to the second embodiment of the present invention is in a regenerative operation of the second control mode.
Figure 12B:
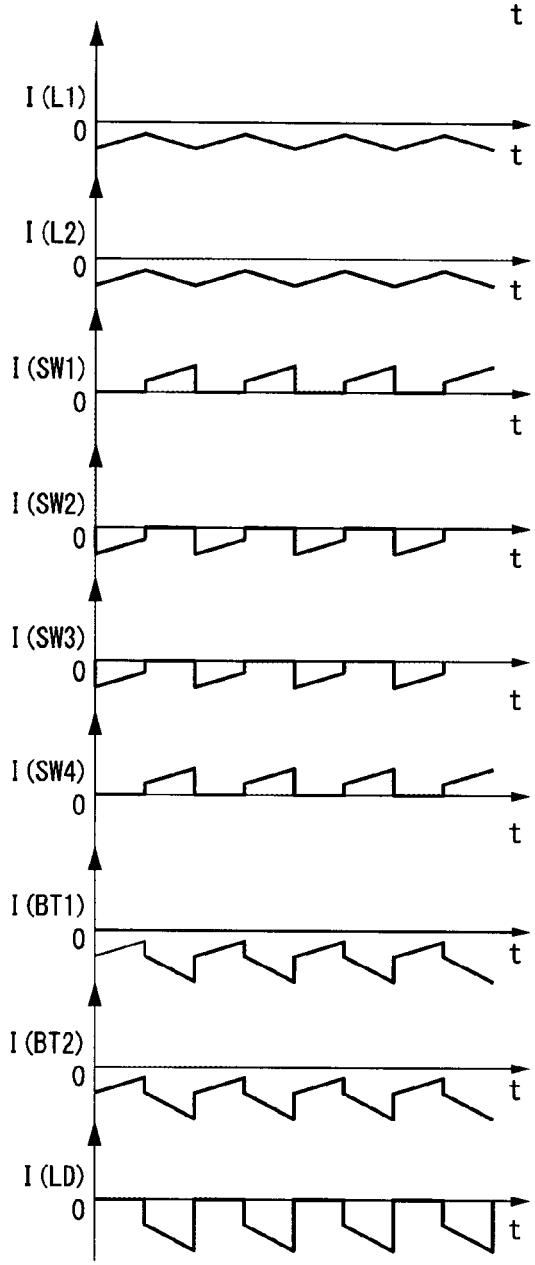
FIG. 12B is a diagram showing ON/OFF of each switching device and a variation of each current when the power device according to the second embodiment of the present invention is in the regenerative operation of the second control mode.
Figure 13A:
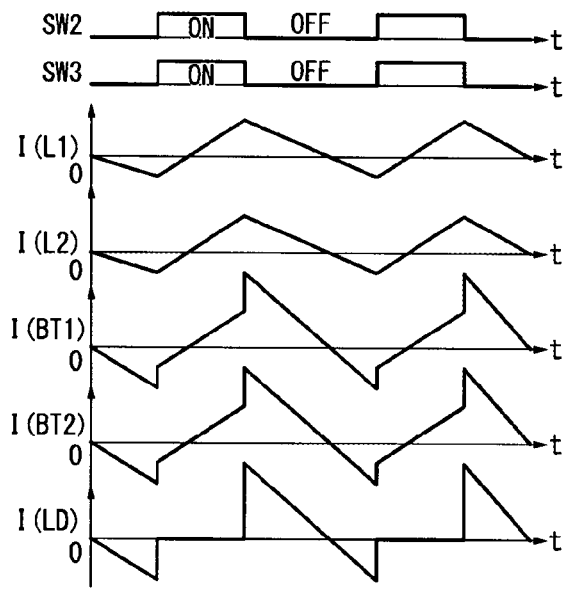
FIG. 13A is a diagram showing ON/OFF of each switching device and a variation of each current when the power device according to the second embodiment of the present invention is in the powering operation of the second control mode.
Figure 13B:
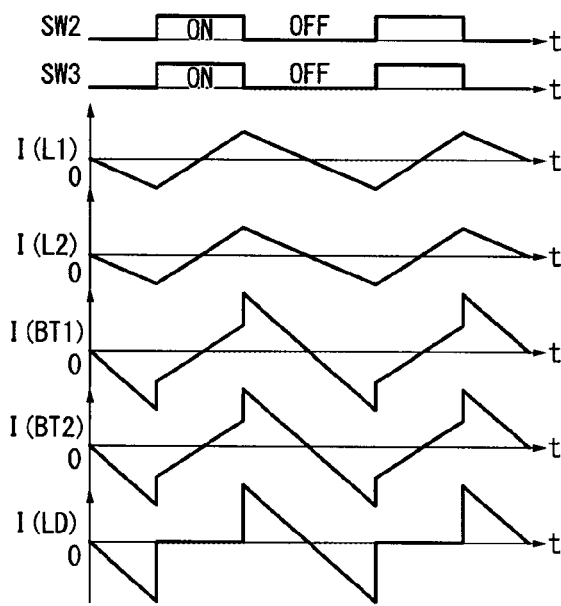
FIG. 13B is a diagram showing ON/OFF of each switching device and a variation of each current when the load included in the power device according to the second embodiment of the present invention is stopped in the second control mode.
Figure 13C:
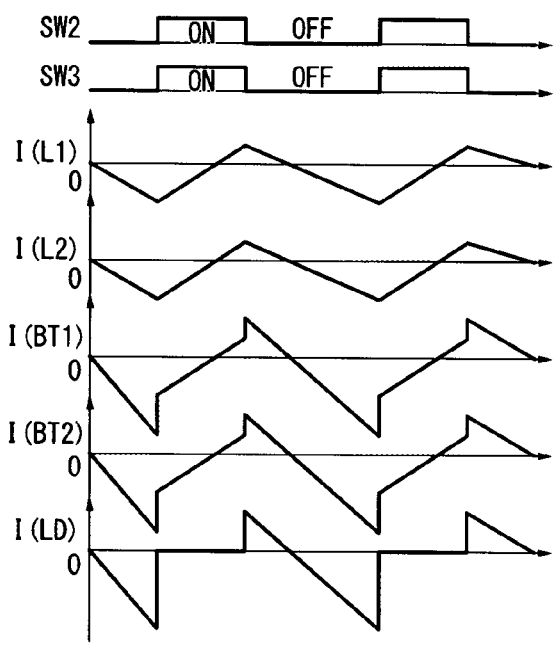
FIG. 13C is a diagram showing ON/OFF of each switching device and a variation of each current when the power device according to the second embodiment of the present invention is in the regenerative operation of the second control mode.

For example, as illustrated in FIG. 10, the connection switching control unit 22 connects the first and second power sources BT1 and BT2, which are connected in series, with the load 13 by turning on the first and fourth switching devices SW1 and SW4 and turning off the second and third switching devices SW2 and SW3.

In the condition that the first and second power sources BT1 and BT2 are connected in series, the connection switching control unit 22 performs a switching operation of turning off the fourth switching device SW4 and gradually increasing the first duty DT 1 from zero. Thereby, the output voltage V10 of the first direct-current power converter circuit 11 is gradually increased to be more than the first voltage VB1 by a back electromotive force of the first reactor L1, and the electric power of the first power source BT1 is supplied to the load 13 and the capacitor 14 via the first reactor L1 and the second power source BT2. Thereby, the capacitor 14 is charged, and the load voltage V0 (=V10+VB2) is gradually increased based on the first duty DT1.

Moreover, the connection switching control unit 22 performs a switching operation of gradually decreasing the first duty DT1 to zero. Thereby, an electrical charge charged in the capacitor 14 is supplied to the first power source BT1 via the second power source BT2 and the first reactor L1 while the electrical charge is consumed in the load 13. Thereby, the first power source BT1 is charged, and the load voltage V0 (=V10+VB2) is gradually decreased based on the first duty DT1. When the first duty DT1 reaches zero, the connection switching control unit 22 turns on the first switching device SW1. Thereby, the first and second power sources BT1 and BT2, which are connected in series, are connected to the load 13, and the load voltage V0 is equal to the summed voltage of the first voltage VB1 and the second voltage VB2 (=VB1+VB2). In the condition that the first and second power sources BT1 and BT2 are connected in series, the connection switching control unit 22 may turn on the fourth switching device SW4.

Similarly, in the condition that the first and second power sources BT1 and BT2 are connected in series, the connection switching control unit 22 performs a switching operation of turning off the first switching device SW1 and gradually increasing the second duty DT2 from zero. Thereby, the output voltage V20 of the second direct-current power converter circuit 12 is gradually increased to be more than the second voltage VB2 by a back electromotive force of the second reactor L2, and the electric power of the second power source BT2 is supplied to the load 13 and the capacitor 14 via the second reactor L2 and the first power source BT1. Thereby, the capacitor 14 is charged, and the load voltage V0 (=V20+VB1) is gradually increased based on the second duty DT2.

Moreover, the connection switching control unit 22 performs a switching operation of gradually decreasing the second duty DT2 to zero. Thereby, an electrical charge charged in the capacitor 14 is supplied to the second power source BT2 via the first power source BT1 and the second reactor L2 while the electrical charge is consumed in the load 13. Thereby, the second power source BT2 is charged, and the load voltage V0 (=V20+VB1) is gradually decreased based on the second duty DT2. When the second duty DT2 reaches zero, the connection switching control unit 22 turns on the fourth switching device SW4. Thereby, the first and second power sources BT1 and BT2, which are connected in series, are connected to the load 13, and the load voltage V0 is equal to the summed voltage of the first voltage VB1 and the second voltage VB2 (=VB1+VB2). In the condition that the first and second power sources BT1 and BT2 are connected in series, the connection switching control unit 22 may turn on the first switching device SW1.

(Second Control Mode of the Second Embodiment)

In a second control mode, as shown in FIGS. 11A, 11B, 12A, 12B, and 13A to 13C, the connection switching control unit 22 simultaneously drives the first and second direct-current power converter circuits 11 and 12. The phase of the switching operation of the first direct-current power converter circuit 11 is the same as that of the second direct-current power converter circuit 12. Thereby, the connection switching control unit 22 can control the load voltage V0 to be a voltage equal to or more than the summed voltage of the first voltage VB1 and the second voltage VB2 (=VB1+VB2). In this case, regarding the current flowing through each switching device SW1 to SW4, each diodes D1 to D4, and each reactor L1 and L2, the currents which flow in the operations of the first direct-current power converter circuit 11 do not interfere those in the operations of the second direct-current power converter circuit 12. The current flowing through each first and second power source BT1 and BT2, and the load 13 and the capacitor 14 is generated by combining currents generated by based on the mutual operations of the first and second direct-current power converter circuits 11 and 12.

Figure 14:
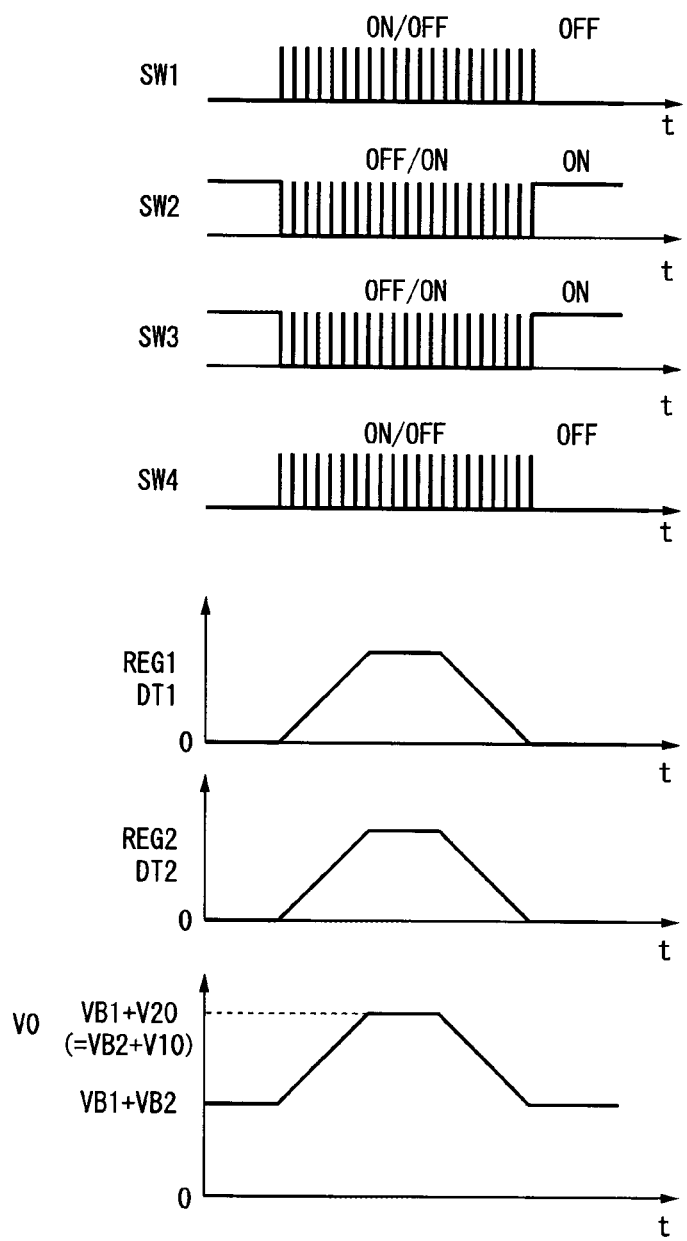
FIG. 14 is a diagram showing a variation of ON/OFF of each switching device, a variation of first and second duties, and a variation of a load voltage when the power device according to the second embodiment of the present invention is in the second control mode.

For example, as shown in FIG. 14, the connection switching control unit 22 connects the first and second power sources BT1 and BT2, which are connected in series, with the load 13 by turning on the first and fourth switching devices SW1 and SW4, and turning off the second and third switching devices SW2 and SW3.

Figure 15:
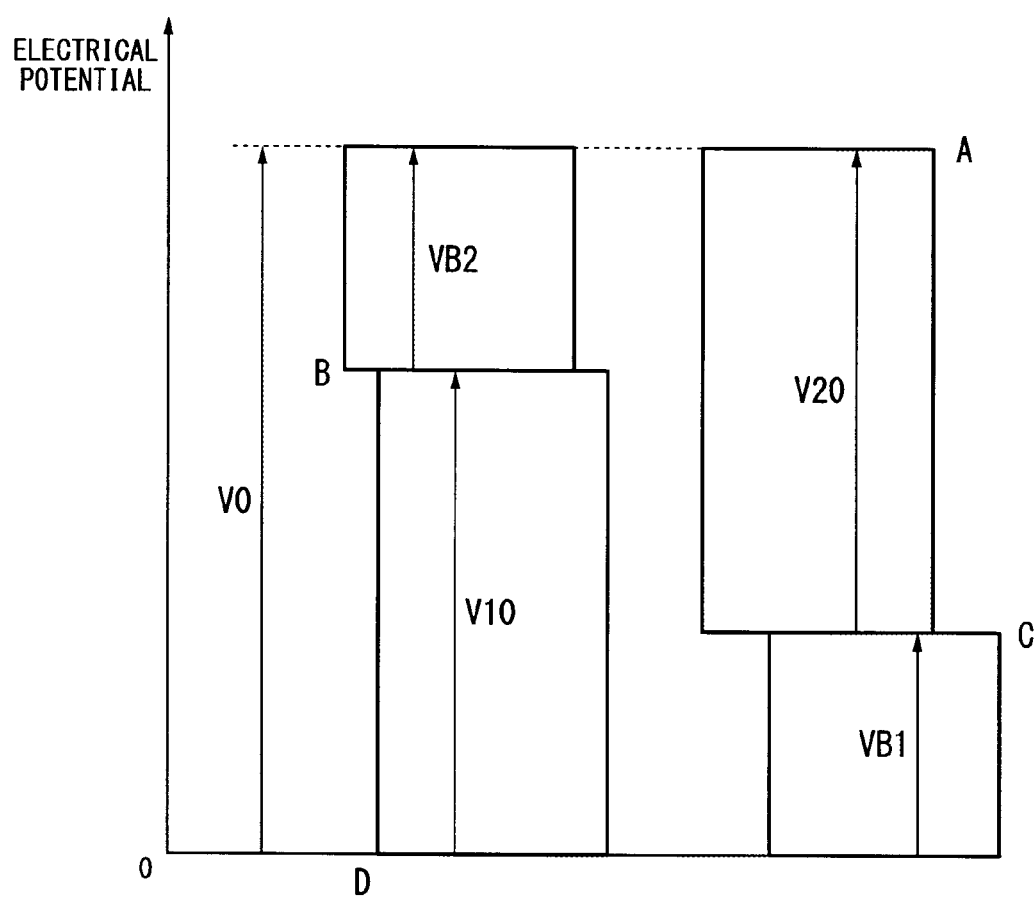
FIG. 15 is a diagram showing a relationship among a load voltage, first and second voltages, and each output voltage of the power device according to the second embodiment of the present invention.

In the condition that the first and second power sources BT1 and BT2 are connected in series, the connection switching control unit 22 performs a switching operation of gradually increasing the first and second duties DT1 and DT2 from zero. Thereby, the output voltage V10 of the first direct-current power converter circuit 11 is gradually increased to be more than the first voltage VB1 by a back electromotive force of the first reactor L1, the output voltage V20 of the second direct-current power converter circuit 12 is gradually increased to be more than the second voltage VB2 by a back electromotive force of the second reactor L2, and the electric power is supplied to the load 13 and the capacitor 14. Thereby, the capacitor 14 is charged, and the load voltage V0 (=V10+VB2=V20+VB1) as shown in FIG. 15 is gradually increased based on the first and second duties DT1 and DT2.

Moreover, the connection switching control unit 22 performs a switching operation of gradually decreasing the first and second duties DT1 and DT2 to zero. Thereby, an electrical charge charged in the capacitor 14 is supplied to the first and second power sources BT1 and BT2 while the electrical charge is consumed in the load 13. Thereby, the first and second power sources BT1 and BT2 are charged, and the load voltage V0 (=V10+VB2=V20+VB1) is gradually decreased based on the first and second duties DT1 and DT2. When the first and second duties DT1 and DT2 reach zero, the first and second power sources BT1 and BT2, which are connected in series, are connected to the load 13, and the load voltage V0 is equal to the summed voltage of the first voltage VB1 and the second voltage VB2 (=VB1+ VB2).

(Third Control Mode of the Second Embodiment)

Figure 16A:
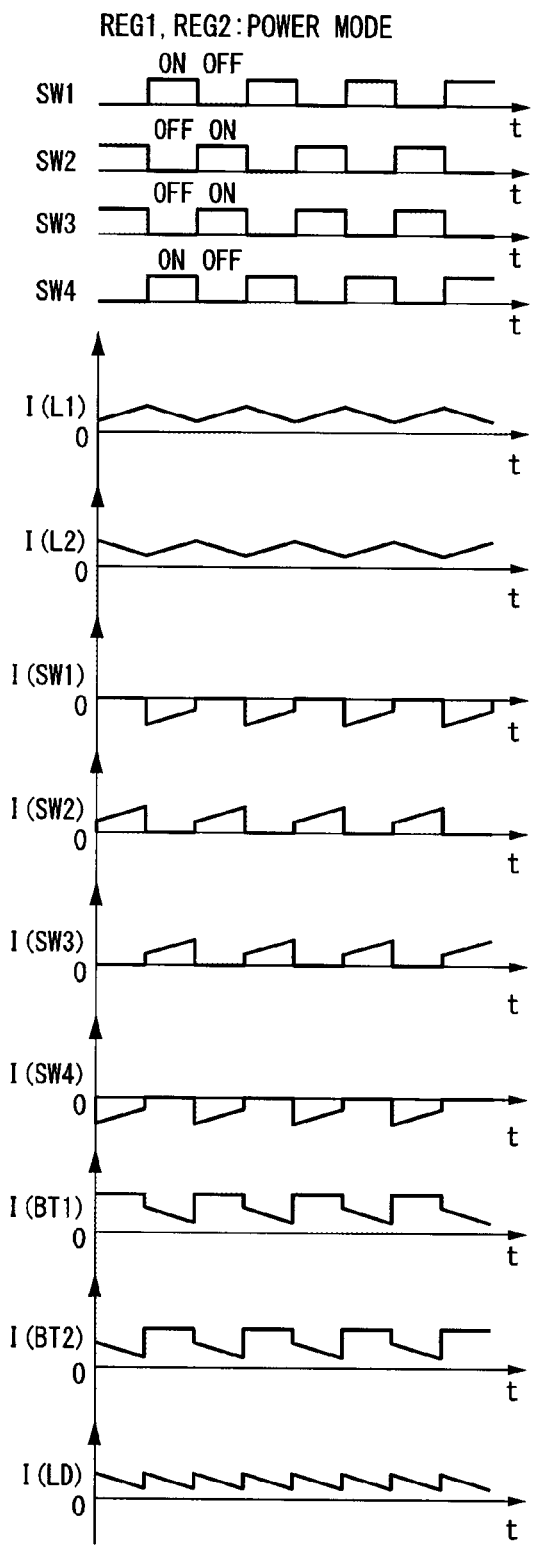
FIG. 16A is a diagram showing ON/OFF of each switching device and a variation of each current when the power device according to the second embodiment of the present invention is in a powering operation of a third control mode.
Figure 16B:
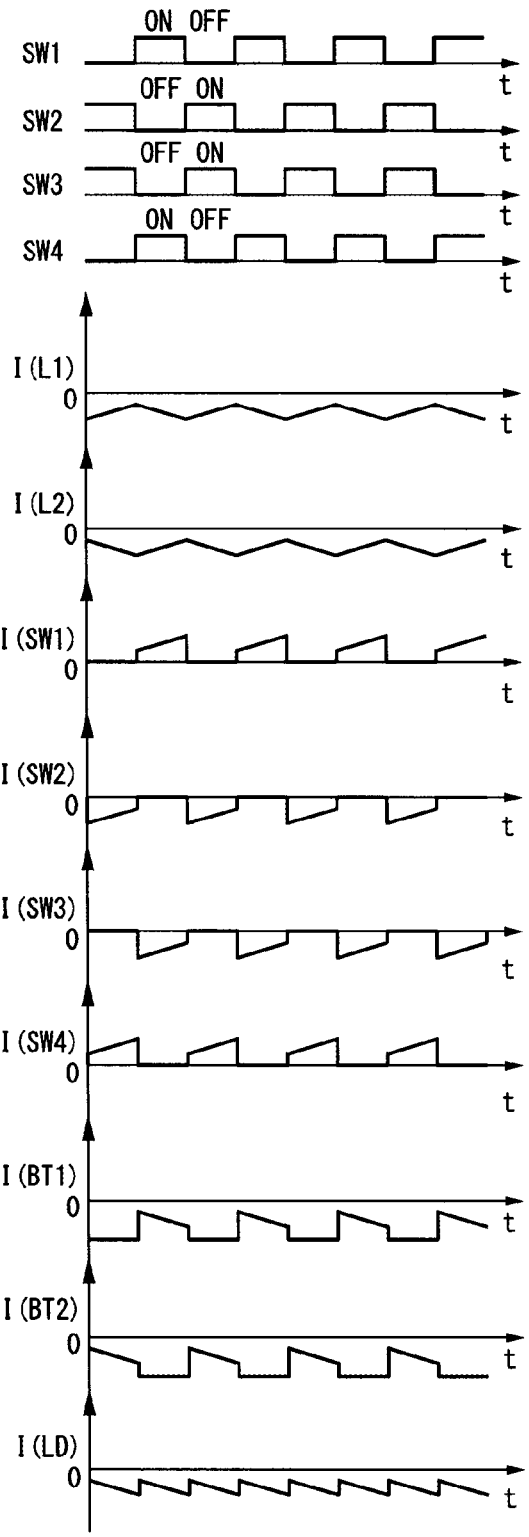
FIG. 16B is a diagram showing ON/OFF of each switching device and a variation of each current when the power device according to the second embodiment of the present invention is in a regenerative operation of the third control mode.

In a third control mode, as shown in FIGS. 16A and 16B, the connection switching control unit 22 simultaneously drives the first and second direct-current power converter circuits 11 and 12. The phase of the switching operation of the first direct-current power converter circuit 11 is opposite to that of the second direct-current power converter circuit 12. Thereby, the connection switching control unit 22 can control the load voltage V0 to be a voltage equal to or more than the summed voltage of the first voltage VB1 and the second voltage VB2 (=VB1+VB2). Since the ripple of current based on the operation of the first direct-current power converter circuit 11 and that of the second direct-current power converter circuit 12 are superimposed in the opposite phase each other, the ripple of current flowing through the load 13 and the capacitor 14 can be decreased in comparison with the second control mode.

(Fourth Control Mode of the Second Embodiment)

In a fourth control mode, the connection switching control unit 22 simultaneously drives the first and second direct-current power converter circuits 11 and 12 in the condition that the first and second reactors L1 and L2 are magnetically coupled. The phase of the switching operation of the first direct-current power converter circuit 11 is arbitrarily shifted from that of the second direct-current power converter circuit 12 (for example, a phase shift is 180°). Thereby, the ripple frequency of each first and second reactor current I(L1) and I(L2) can be more than a switching frequency. For example, even if the switching frequency is within an audible band, a frequency of magnetostrictive noise generated in the first and second reactors L1 and L2 can be set to be outside the audible band. Thereby, the noise can be suppressed.

The first and second reactors L1 and L2 are magnetically coupled by, for example, winding the first and second reactors L1 and L2 around a common core so that they share a magnetic path. Moreover, the first and second reactors L1 and L2 may be provided by, for example, winding the first and second reactors L1 and L2 around a common core in opposite directions each other (reverse phase) so that they share a magnetic path. In this case, the first reactor current I(L1) and second reactor current I(L2) flow so that magnetizations of the magnetic path are canceled.

Figure 17:
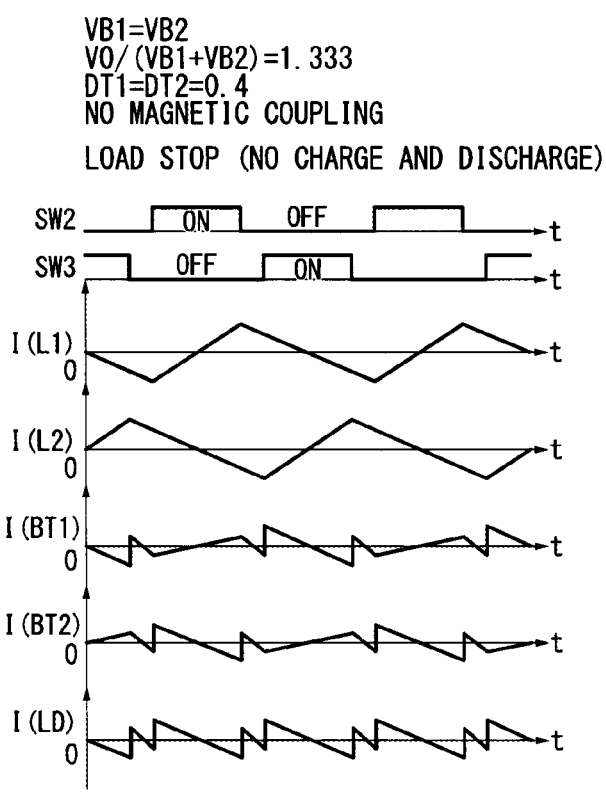
FIG. 17 is a diagram showing ON/OFF of each switching device and a variation of each current when the power device according to the second embodiment of the present invention is in a fourth control mode.

For example, as shown in FIG. 17, in the condition that the first and second reactors L1 and L2 are not magnetically coupled, the connection switching control unit 22 switches the increase state and decrease state of the first reactor current I(L1) by switching ON and OFF of the second switching device SW2. Moreover, the connection switching control unit 22 switches the increase state and decrease state of the second reactor current I(L2) by switching ON and OFF of the third switching device SW3.

Figure 18:
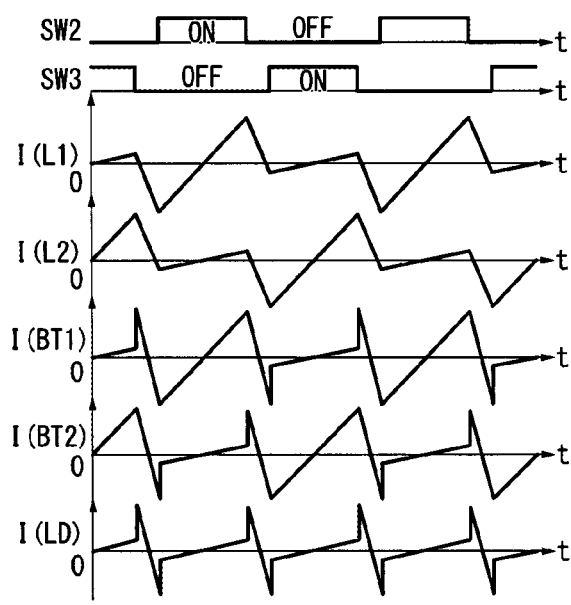
FIG. 18 is a diagram showing ON/OFF of each switching device and a variation of each current when the power device according to the second embodiment of the present invention is in the fourth control mode.

On the other hand, for example, as shown in FIG. 18, in the condition that the first and second reactors L1 and L2 are magnetically coupled, the connection switching control unit 22 increases the first reactor current I(L1) by turning on the second switching device SW2 included in the first direct-current power converter circuit 11. Subsequently, by turning off the second switching device SW2, and then, by turning on the third switching device SW3 in the state that the first reactor current I(L1) is decreasing, the connection switching control unit 22 increases the second reactor current I(L2). Thereby, an inductive voltage caused by the magnetic coupling is generated in the first reactor L1, and the state of the first reactor current I(L1) is changed from the decrease to the increase. Subsequently, by turning off the third switching device SW3, the second reactor current I(L2) is decreased, and the first reactor current I(L1) is decreased.

Moreover, the connection switching control unit 22 increases the second reactor current I(L2) by turning on the third switching device SW3 included in the second direct-current power converter circuit 12.

Subsequently, by turning off the third switching device SW3, and then, by turning on the second switching device SW2 in the state that the second reactor current I(L2) is decreasing, the first reactor current I(L1) is increased. Thereby, an inductive voltage caused by the magnetic coupling is generated in the second reactor L2, and the state of the second reactor current I(L2) is changed from the decrease to the increase. Subsequently, by turning off the second switching device SW2, the first reactor current I(L1) is decreased, and the second reactor current I(L2) is decreased.

(Fifth to Eighth Control Modes of the Second Embodiment)

In relation to the first to fourth control modes, the connection switching control unit 22 in fifth to eighth control modes can control any one of parameters to corresponded to an arbitrary target value while the connection switching control unit 22 maintains each parameters other than the one parameter at an arbitrary value by adjusting the first and second duties DT1 and DT2. The parameters include the load voltage V0, the voltage difference Vd (=VB2−VB1), the first voltage VB1, and the second voltage VB2.

In the fifth control mode, the connection switching control unit 22 can control the load voltage V0 to correspond to an arbitrary target load voltage Va while the connection switching control unit 22 maintains the value of each parameter other than the load voltage V0 independently from the condition of the load 13.

In the sixth control mode, the connection switching control unit 22 can control the voltage difference Vd (=VB2−VB1) to correspond to an arbitrary target voltage difference Vda while the connection switching control unit 22 maintains the value of each parameter other than the voltage difference Vd (=VB2−VB1) independently from the charge and discharge conditions of the first and second power sources BT1 and BT2.

In the seventh control mode, the connection switching control unit 22 can control the first voltage VB1 to correspond to an arbitrary target first voltage VB1a while the connection switching control unit 22 maintains the value of each parameter other than the first voltage VB1 independently from the condition of the first power source BT1.

In the eighth control mode, the connection switching control unit 22 can control the second voltage VB2 to correspond to an arbitrary target second voltage VB2a while the connection switching control unit 22 maintains the value of each parameter other than the second voltage VB2 independently from the condition of the second power source BT2.

(Ninth Control Mode of the Second Embodiment)

In relation to the first to eighth control modes, in a condition that other load is connected in addition to the load 13, the first voltage VB1 is different from the second voltage VB2, the total capacity of the first power source BT1 is different from that of the second power source BT2, etc., the connection switching control unit 22 in a ninth control mode can control a voltage at any location to correspond an arbitrary target value by adjusting the first and second duties DT1 and DT2.

As described above, the power device 10 according to the second embodiment of the present invention can easily control the load voltage V0 to be an arbitrary voltage equal to or more than the summed voltage of the first voltage VB1 and the second voltage VB2 (=VB1+VB2) by controlling the first duty DT1 and the second duty DT2.

(First Variation of the Second Embodiment)

Figure 19A:
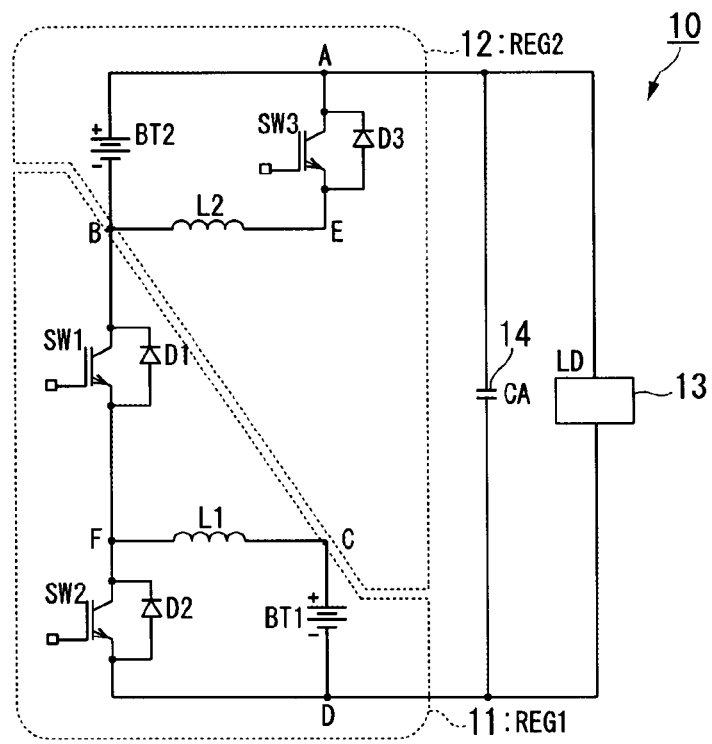
FIG. 19A is a configuration diagram showing a power device according to a first variation of the second embodiment of the present invention.
Figure 19B:
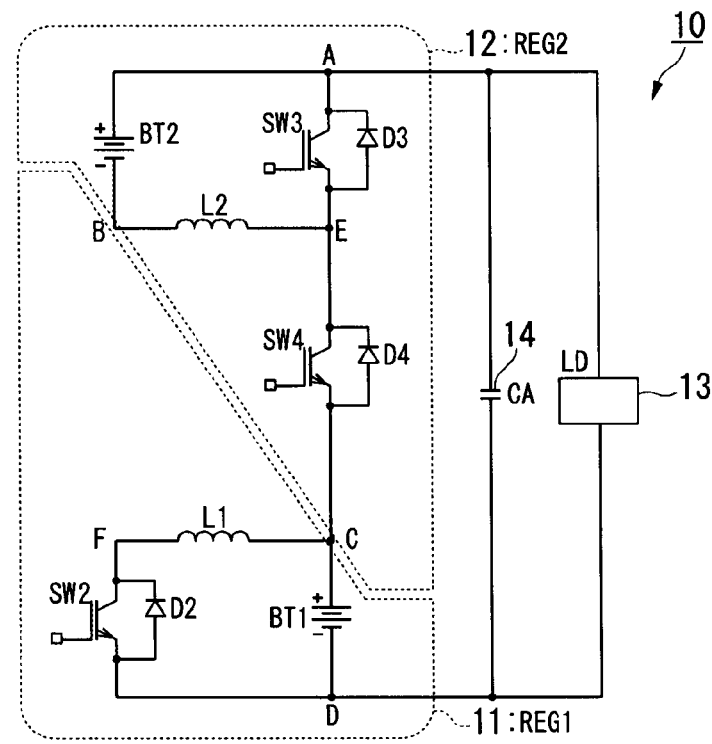
FIG. 19B is a configuration diagram showing the power device according to the first variation of the second embodiment of the present invention.

In the second embodiment of the present invention described above, as a power device 10 according to a first variation as shown in FIGS. 19A and 19B, the fourth switching device SW4 or the first switching device SW1 may be omitted.

(Second Variation of the Second Embodiment)

Figure 20:
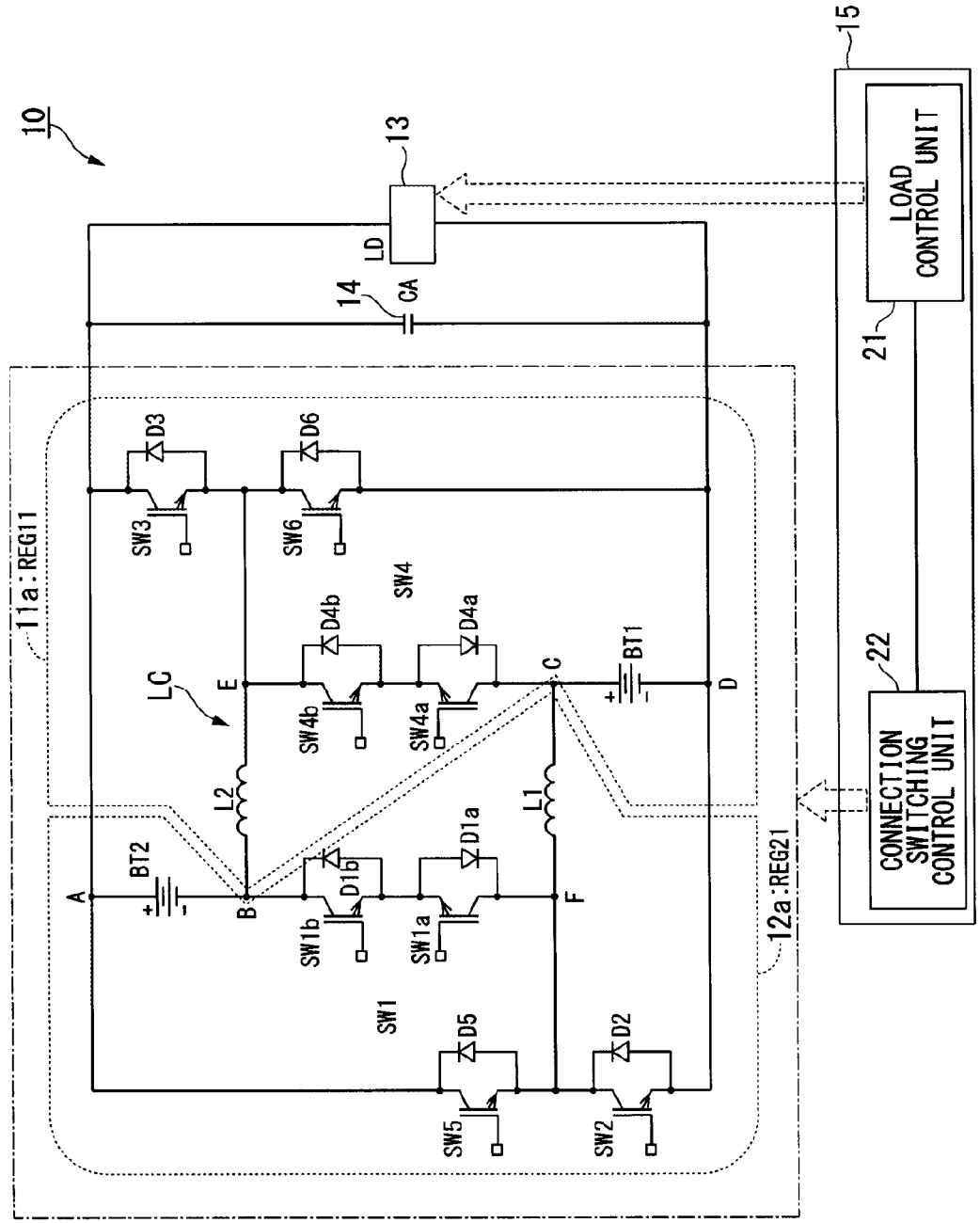
FIG. 20 is a configuration diagram showing a power device according to a second variation of the second embodiment of the present invention.
Figure 21:
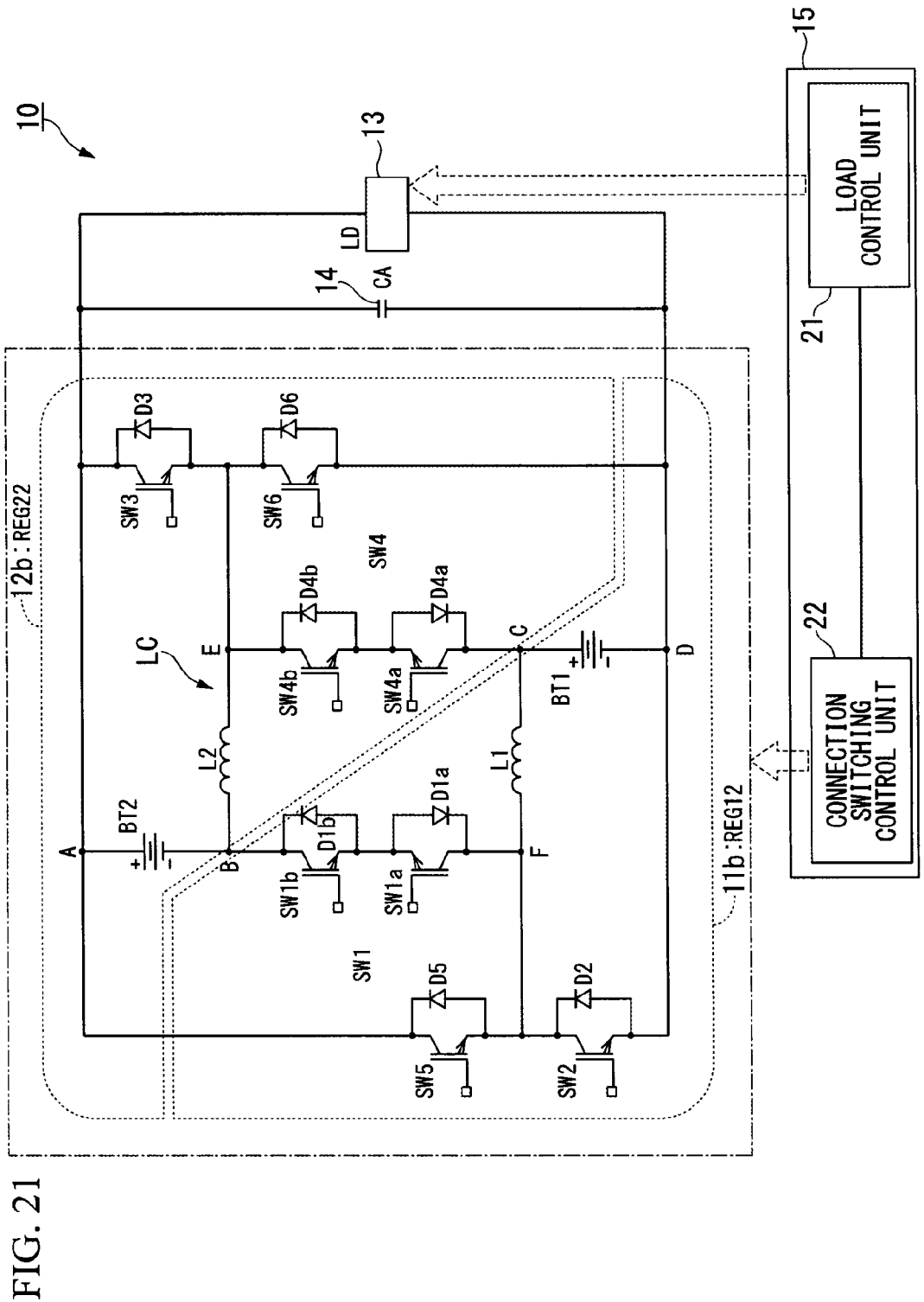
FIG. 21 is a configuration diagram showing the power device according to the second variation of the second embodiment of the present invention.

As shown in FIGS. 20 and 21, a power device 10 according to a second variation of the second embodiment of the present invention includes first and fourth switching devices SW1 and SW4, each of which is a bidirectional switch, and further includes fifth and sixth switching devices SW5 and SW6 in comparison with the second embodiment described above.

The power device 10 according to the second variation can control a voltage V0 to be a voltage ranging from a voltage equal to a greater of a first voltage VB1 and a second voltage VB2 to a voltage equal to the summed voltage of the first and the second voltages VB1 and VB2 (=VB1+VB2), or to be a voltage equal to or more than the summed voltage of the first and the second voltages VB1 and VB2 (=VB1+VB2).

As shown in FIG. 20, the power device 10 according to the second variation includes a first step-down direct-current power converter circuit (REG11) 11a, a second step-down direct-current power converter circuit (REG21) 12a, a load (LD) 13, a capacitor (CA) 14, and a control device 15.

As shown in FIG. 21, the power device 10 includes a first step-up direct-current power converter circuit (REG12) 11b and a second step-up direct-current power converter circuit (REG22) 12b, instead of the first and second step-down direct-current power converter circuits 11a and 12a.

The first step-down direct-current power converter circuit (REG11) 11a includes a first power source BT1, third, fourth, and sixth switching devices SW3, SW4, and SW6, which configure a second switch group, and a second reactor L2.

The second step-down direct-current power converter circuit (REG21) 12a includes a second power source BT2, first, second, and fifth switching devices SW1, SW2, and SW5, which configure a first switch group, and a first reactor L1.

The first step-up direct-current power converter circuit (REG12) 11b includes a first power source BT1, first, second, and fifth switching devices SW1, SW2, and SW5, which configure a first switch group, and a first reactor L1.

The second step-up direct-current power converter circuit (REG22) 12b includes a second power source BT2, third, fourth, and sixth switching devices SW3, SW4, and SW6, which configure a second switch group, and a second reactor L2.

The first switching device SW1, which is a bidirectional switch, includes, for example, two switching devices SW1a and SW1b. These two switching devices SW1a and SW1b are connected in series to have opposite polarities. The fourth switching device SW4, which is a bidirectional switch, includes, for example, two switching devices SW4a and SW4b. These two switching devices SW4a and SW4b are connected in series to have opposite polarities.

A collector and an emitter of the fifth switching device SW5 are connected to a first node A and a sixth node F, respectively. A collector and an emitter of the sixth switching device SW6 are connected to a fifth node E and a fourth node D, respectively. Diodes D5 and D6 are connected between the emitter and collector of the fifth and sixth switching devices SW5 and SW6, respectively. The direction from the emitter to the collector of each switching device SW5 and SW6 is a forward direction of each diode D5 and D6.

The first and second step-down direct-current power converter circuits 11a and 12a are controlled based on pulse-width-modulated signals (PWM signals) output from the control device 15 and input into a gate of each switching device SW1 to SW6 so that the first and second step-down direct-current power converter circuits 11a and 12a are driven independently from each other. The first and second step-up direct-current power converter circuits 11b and 12b are controlled based on pulse-width-modulated signals (PWM signals) output from the control device 15 and input into a gate of each switching device SW1 to SW6 so that the first and second step-up direct-current power converter circuits 11b and 12b are driven independently from each other.

In more detail, when the load voltage V0 is less than the summed voltage of the first and second voltages VB1 and VB2 (=VB1+VB2), the first and second step-down direct-current power converter circuits 11a and 12a are controlled so that a switching operation for at least one of a pair of the fourth and sixth switching devices SW4 and SW6 included in the first step-down direct-current power converter circuit 11a and a pair of the first and fifth switching devices SW1 and SW5 included in the second step-down direct-current power converter circuit 12a is performed.

When the load voltage V0 is more than the summed voltage of the first and second voltages VB1 and VB2 (=VB1+VB2), the first and second step-up direct-current power converter circuits 11b and 12b are controlled so that a switching operation for at least one of a pair of the first and second switching devices SW1 and SW2 included in the first step-up direct-current power converter circuit 11b and a pair of the third and fourth switching devices SW3 and SW4 included in the second step-up direct-current power converter circuit 12b is performed.

In these switching operations, each switching device SW1 to SW6 is switched between close (ON) and open (OFF).

Figure 22A:
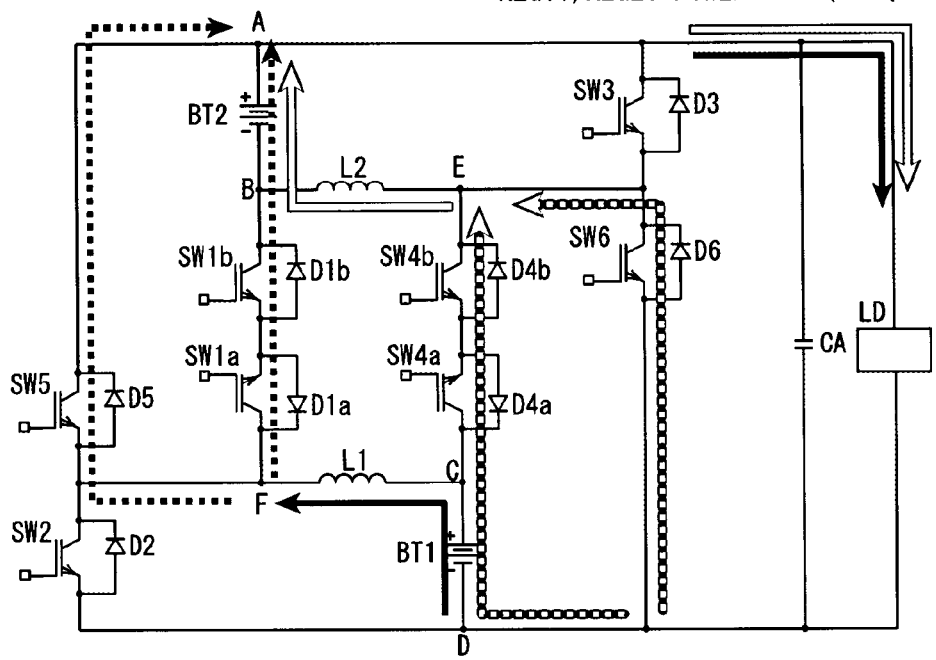
FIG. 22A is a diagram showing each current flow when the power device according to the second variation of the second embodiment of the present invention is in a power mode.

For example, as shown in FIG. 22A, when the load voltage V0 is less than the summed voltage of the first and second voltages VB1 and VB2 (=VB1+VB2) in the power mode where the first step-down direct-current power converter circuit (REG11) 11a supplies a direct-current power to the load 13, the first step-down direct-current power converter circuit (REG11) 11a turns off the sixth switching device SW6, and turns on the fourth switching device SW4. Thereby, current flows into the load 13 via the first power source BT1, the fourth switching device SW4, the second reactor L2, and the second power source BT2 in series. On the other hand, by turning on the sixth switching device SW6 and turning off the fourth switching device SW4, a circulating current flows via the sixth switching device SW6 and the sixth diode D6, the second reactor L2, and the second power source BT2 in series.

Figure 22B:
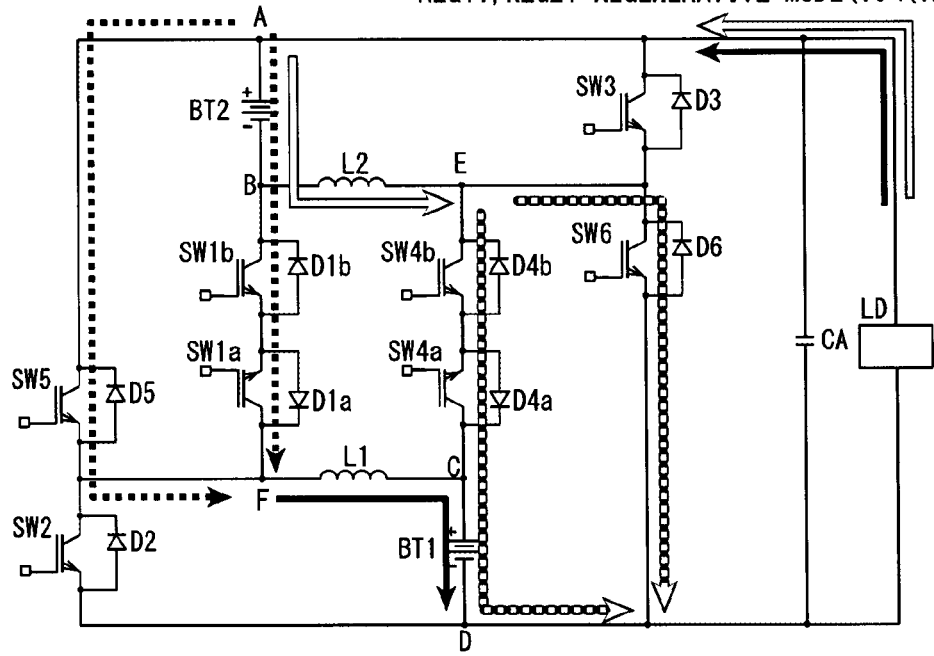
FIG. 22B is a diagram showing each current flow when the power device according to the second variation of the second embodiment of the present invention is in a regenerative mode.

For example, as shown in FIG. 22B, when the load voltage V0 is less than the summed voltage of the first and second voltages VB1 and VB2 (=VB1+VB2) in the regenerative mode where a direct-current power is supplied from the load 13, the first step-down direct-current power converter circuit (REG11) 11a turns on the sixth switching device SW6 and turns off the fourth switching device SW4. Thereby, current flows via the second power source BT2, the second reactor L2, and the sixth switching device SW6 in series. On the other hand, by turning off the sixth switching device SW6 and turning on the fourth switching device SW4, current flows via the second power source BT2, the second reactor L2, the fourth switching device SW4 and the first power source BT1 in series.

For example, as shown in FIG. 22A, when the load voltage V0 is less than the summed voltage of the first and second voltages VB1 and VB2 (=VB1+VB2) in the power mode where the second step-down direct-current power converter circuit (REG21) 12a supplies a direct-current power to the load 13, the second step-down direct-current power converter circuit (REG21) 12a turns off the fifth switching device SW5, and turns on the first switching device SW1. Thereby, current flows into the load 13 via the first power source BT1, the first reactor L1, the first switching device SW1, and the second power source BT2 in series. On the other hand, by turning on the fifth switching device SW5 and turning off the first switching device SW1, a circulating current flows via the first power source BT1, the first reactor L1, and the fifth switching device SW5 and the fifth diode D5 in series.

For example, as shown in FIG. 22B, when the load voltage V0 is less than the summed voltage of the first and second voltages VB1 and VB2 (=VB1+VB2) in the regenerative mode where a direct-current power is supplied from the load 13, the second step-down direct-current power converter circuit (REG21) 12a turns on the first switching device SW1 and turns off the fifth switching device SW5. Thereby, current flows via the second power source BT2, the first switching device SW1, the first reactor L1, and the first power source BT1 in series. On the other hand, by turning off the first switching device SW1 and turning on the fifth switching device SW5, current flows via the fifth switching device SW5, the first reactor L1, and the first power source BT1 in series.

Figure 22C:
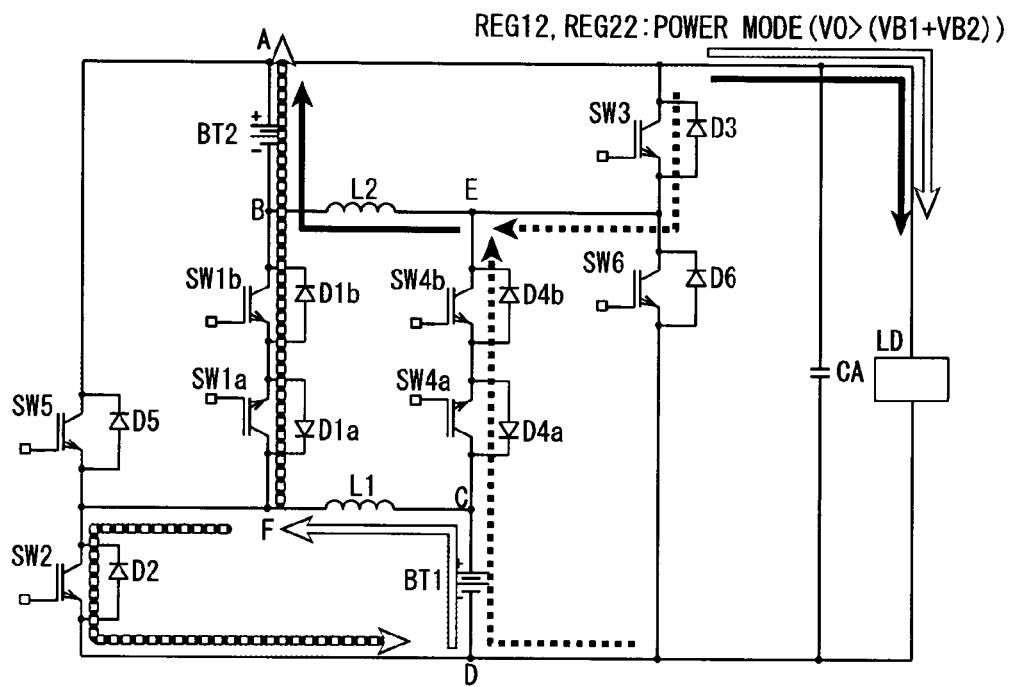
FIG. 22C is a diagram showing each current flow when the power device according to the second variation of the second embodiment of the present invention is in the power mode.

For example, as shown in FIG. 22C, when the load voltage V0 is more than the summed voltage of the first and second voltages VB1 and VB2 (=VB1+VB2) in a power mode where the first step-up direct-current power converter circuit (REG12) 11b supplies a direct-current power to the load 13, the first step-up direct-current power converter circuit (REG12) 11b turns off the first switching device SW1, and turns on the second switching device SW2. Thereby, the first reactor L1 is excited by flowing a circulating current through the first power source BT1, the first reactor L1, and the second switching device SW2 in series, and a first reactor current I(L1) flowing through the first reactor L1 is increased. On the other hand, by turning on the first switching device SW1 and turning of the second switching device SW2, current flows into the load 13 via the first power source BT1, the first reactor L1, the first switching device SW1, and the second power source BT2 in series.

Figure 22D:
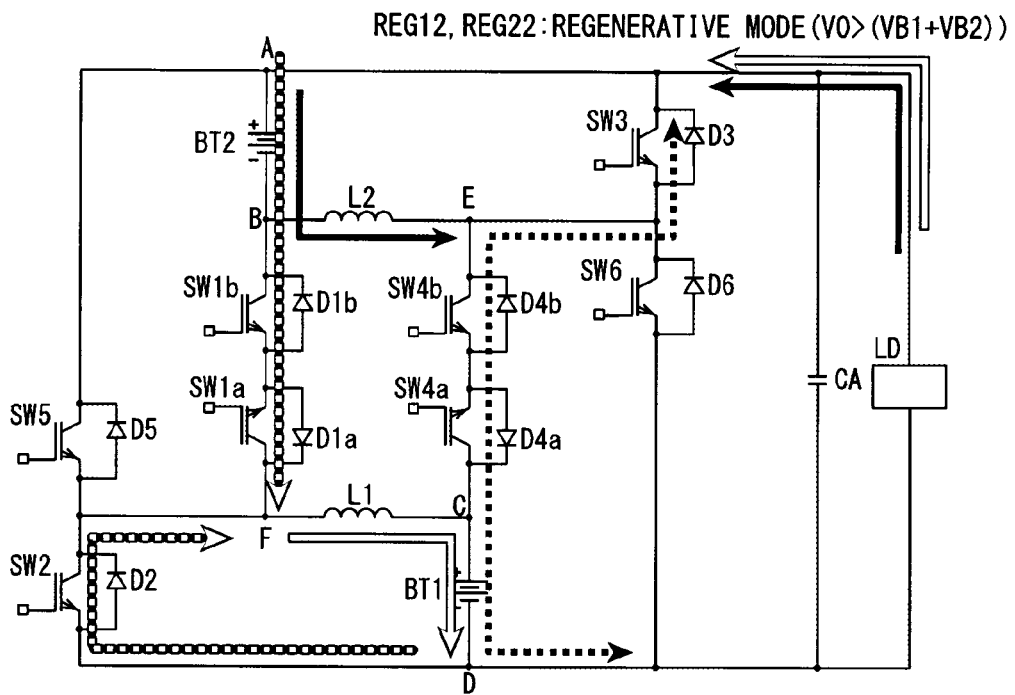
FIG. 22D is a diagram showing each current flow when the power device according to the second variation of the second embodiment of the present invention is in the regenerative mode.

As shown in FIG. 22D, when the load voltage V0 is more than the summed voltage of the first and second voltages VB1 and VB2 (=VB1+VB2) in a regenerative mode where a direct-current power is supplied from the load 13, the first step-up direct-current power converter circuit (REG12) 11b turns on the first switching device SW1 and turns off the second switching device SW2. Thereby, current flows via the second power source BT2, the first switching device SW1, the first reactor L1, and the first power source BT1 in series. On the other hand, by turning off the first switching device SW1 and turning on the second switching device SW2, a circulating current flows via the second switching device SW2 and the second diode D2, the first reactor L1, and the first power source BT1 in series.

For example, as shown in FIG. 22C, when the load voltage V0 is more than the summed voltage of the first and second voltages VB1 and VB2 (=VB1+VB2) in a power mode where the second step-up direct-current power converter circuit (REG22) 12b supplies a direct-current power to the load 13, the second step-up direct-current power converter circuit (REG22) 12b turns off the fourth switching device SW4, and turns on the third switching device SW3. Thereby, the second reactor L2 is excited by flowing a circulating current through the second power source BT2, the third switching device SW3, and the second reactor L2 in series, and a second reactor current I(L2) flowing through the second reactor L2 is increased. On the other hand, by turning on the fourth switching device SW4 and turning off the third switching device SW3, current flows into the load 13 via the first power source BT1, the fourth switching device SW4, the second reactor L2, and the second power source BT2 in series.

As shown in FIG. 22D, when the load voltage V0 is more than the summed voltage of the first and second voltages VB1 and VB2 (=VB1+VB2) in a regenerative mode where a direct-current power is supplied from the load 13, the second step-up direct-current power converter circuit (REG22) 12b turns on the fourth switching device SW4 and turns off the third switching device SW3. Thereby, current flows via the second power source BT2, the second reactor L2, the fourth switching device SW4, and the first power source BT1 in series. On the other hand, by turning off the fourth switching device SW4 and turning on the third switching device SW3, a circulating current flows via the second reactor L2, the third switching device SW3 and the third diode D3, and the second power source BT2 in series.

The connection switching control unit 22 can drive the first and second step-down direct-current power converter circuits 11a and 12a independently from each other, and drive the first and second step-up direct-current power converter circuits 11b and 12b independently from each other, by inputting pulse-width-modulated signals (PWM signals) into a gate of each switching device SW1 to SW6.

When the load voltage V0 is less than the summed voltage of the first and second voltages VB1 and VB2 (=VB1+VB2), the connection switching control unit 22 controls the first and second step-down direct-current power converter circuits 11a and 12a so that a switching operation for at least one of a pair of the fourth and sixth switching devices SW4 and SW6 included in the first step-down direct-current power converter circuit 11a and a pair of the first and fifth switching devices SW1 and SW5 included in the second step-down direct-current power converter circuit 12a is performed. Thereby, the connection switching control unit 22 controls the voltage V0 to be a voltage ranging from the greater of the first voltage VB1 of the first power source BT1 and the second voltage VB2 of the second power source BT2 to the summed voltage of the first voltage VB1 and the second voltage VB2 (=VB1+VB2).

When the load voltage V0 is more than the summed voltage of the first and second voltages VB1 and VB2 (=VB1+VB2), the connection switching control unit 22 controls the first and second step-up direct-current power converter circuits 11b and 12b so that a switching operation for at least one of a pair of the first and second switching devices SW1 and SW2 included in the first step-up direct-current power converter circuit 11*b* and a pair of the third and fourth switching devices SW3 and SW4 included in the second step-up direct-current power converter circuit 12*b* is performed. Thereby, the connection switching control unit 22 controls the voltage V0 to be a voltage equal to or more than the summed voltage of the first voltage VB1 and the second voltage VB2 (=VB1+VB2).

The connection switching control unit 22 controls a switching operation of the fourth switching device SW4 and the sixth switching device SW6 included in the first step-down direct-current power converter circuit 11*a* based on a first step-down duty DT11. In the switching operation, the fourth switching device SW4 and the sixth switching device SW6 are inverted and the alternative close and open (ON/OFF) switching operations of each switching device SW4 and SW6 are performed. As represented by the following equation (5), the first step-down duty DT11 is defined by ON time t(SW4) of the fourth switching device SW4 and ON time t(SW6) of the sixth switching device SW6.

For example, when the fourth switching device SW4 is turned off and the sixth switching device SW6 is turned on, the first step-down duty DT11 is 0%. On the other hand, when the fourth switching device SW4 is turned on and the sixth switching device SW6 is turned off, the first step-down duty DT11 is 100%.

The connection switching control unit 22 can step down the first voltage VB1 based on the first step-down duty DT11 and output the step-down voltage from the first step-down direct-current power converter circuit 11*a*. The connection switching control unit 22 controls output voltage V10*a* of the first step-down direct-current power converter circuit 11*a* (in other words, the voltage applied between the second node B and the fourth node D) as the product of the first voltage VB1 and the first step-down duty DT11 (VB1\*DT11=V10*a*).

$$DT11 = \frac{t(SW4)}{t(SW4)+t(SW6)} = \frac{V0-VB1+Vd}{VB1} \\ DT21 = \frac{t(SW1)}{t(SW1)+t(SW5)} = \frac{V0-VB2+Vd}{VB2}$$ (5)

The connection switching control unit 22 controls a switching operation of the first switching device SW1 and the fifth switching device SW5 included in the second step-down direct-current power converter circuit 12*a* based on a second step-down duty DT21. In the switching operation, the first switching device SW1 and the fifth switching device SW5 are inverted and the alternative close and open (ON/OFF) switching operations of each switching device SW1 and SW5 are performed. As represented by the equation (5) described above, the second step-down duty DT21 is defined by ON time t(SW1) of the first switching device SW1 and ON time t(SW5) of the fifth switching device SW5.

For example, when the first switching device SW1 is turned off and the fifth switching device SW5 is turned on, the second step-down duty DT21 is 0%. On the other hand, when the first switching device SW1 is turned on and the fifth switching device SW5 is turned off, the second step-down duty DT21 is 100%.

The connection switching control unit 22 can step down the second voltage VB2 based on the second step-down duty DT21 and output the step-down voltage from the second step-down direct-current power converter circuit 12*a*. The connection switching control unit 22 controls output voltage V20*a* of the second step-down direct-current power converter circuit 12*a* (in other words, the voltage applied between the first node A and the third node C) as the product of the second voltage VB2 and the second step-down duty DT21 (VB2\*DT21=V20*a*).

The connection switching control unit 22 controls a switching operation of the first switching device SW1 and the second switching device SW2 included in the first step-up direct-current power converter circuit 11*b* based on a first step-up duty DT12. In the switching operation, the first switching device SW1 and the second switching device SW2 are inverted and the alternative close and open (ON/OFF) switching operations of each switching device SW1 and SW2 are performed. As represented by the following equation (6), the first step-up duty DT12 is defined by ON time t(SW1) of the first switching device SW1 and ON time t(SW2) of the second switching device SW2.

For example, when the first switching device SW1 is turned on and the second switching device SW2 is turned off, the first step-up duty DT12 is 0%. On the other hand, when the first switching device SW1 is turned off and the second switching device SW2 is turned on, the first step-up duty DT12 is 100%.

The connection switching control unit 22 can step up the first voltage VB1 based on the first step-up duty DT12 and output the step-up voltage from the first step-up direct-current power converter circuit 11*b*. The connection switching control unit 22 controls output voltage V10*b* of the first step-up direct-current power converter circuit 11*b* (in other words, the voltage applied between the second node B and the fourth node D) based on the first voltage VB1 and the first step-up duty DT12.

$$DT12 = \frac{t(SW2)}{t(SW2)+t(SW1)} = \frac{V0-2\cdot VB2+Vd}{V0-VB2} \\ DT22 = \frac{t(SW3)}{t(SW3)+t(SW4)} = \frac{V0-2\cdot VB1-Vd}{V0-VB1}$$ (6)

The connection switching control unit 22 controls a switching operation of the third switching device SW3 and the fourth switching device SW4 included in the second step-up direct-current power converter circuit 12*b* based on a second step-up duty DT22. In the switching operation, the third switching device SW3 and the fourth switching device SW4 are inverted and the alternative close and open (ON/OFF) switching operations of each switching device SW3 and SW4 are performed. As represented by the equation (6) described above, the second step-up duty DT22 is defined by ON time t(SW3) of the third switching device SW3 and ON time t(SW4) of the fourth switching device SW4.

For example, when the fourth switching device SW4 is turned on and the third switching device SW3 is turned off, the second step-up duty DT22 is 0%. On the other hand, when the fourth switching device SW4 is turned off and the third switching device SW3 is turned on, the second step-up duty DT22 is 100%.

The connection switching control unit 22 can step up the second voltage VB2 based on the second step-up duty DT22 and output the step-up voltage from the second step-up direct-current power converter circuit 12*b*. The connection switching control unit 22 controls output voltage V20*b* of the second step-up direct-current power converter circuit 12*b* (in other words, the voltage applied between the first node A and the third node C) based on the second voltage VB2 and the second step-up duty DT22.

As represented by the equation (5) described above, the first step-down duty DT11 is represented by the desired load voltage V0, the desired voltage difference Vd (=VB2−VB1), and the first voltage VB1, and the second step-down duty DT21 is represented by the desired load voltage V0, the desired voltage difference Vd (=VB2−VB1), and the second voltage VB2. On the other hand, based on the voltage difference Vd (=VB2−VB1), the first step-down duty DT11 can be represented by the second voltage VB2, and the second step-down duty DT21 can be represented by the first voltage VB1. In order to prevent a divergence of control responses, the connection switching control unit 22 may control switching operations using the first and second step-down duties DT11 and DT21 represented by the equation (5) described above.

Similarly, as represented by the equation (6) described above, the first step-up duty DT12 is represented by the second voltage VB2, and the second step-up duty DT22 is represented by the first voltage VB1. On the other hand, based on the voltage difference Vd (=VB2−VB1), the first step-up duty DT12 can be represented by the first voltage VB1, and the second step-up duty DT22 can be represented by the second voltage VB2. In order to prevent a divergence of control responses, the connection switching control unit 22 may control switching operations using the first and second step-up duties DT12 and DT22 represented by the equation (6) described above.

The power device 10 according to the second variation includes the constitution described above. Hereinafter, the operation of the power device 10 according to the second variation, in other words, the control operation of the connection switching control unit 22 will be described.

The connection switching control unit 22 can perform similar control operations to those in the first to ninth control modes of the second embodiment described above.

(First to Fourth Control Modes of the Second Variation of the Second Embodiment)

In a first control mode, when the load voltage V0 is less than the summed voltage of the first and second voltages VB1 and VB2 (=VB1+VB2), the connection switching control unit 22 drives one of the first and second step-down direct-current power converter circuits 11a and 12a at a time. When the load voltage V0 is more than the summed voltage of the first and second voltages VB1 and VB2 (=VB1+VB2), the connection switching control unit 22 drives one of the first and second step-up direct-current power converter circuits 11b and 12b at a time.

Figure 23:
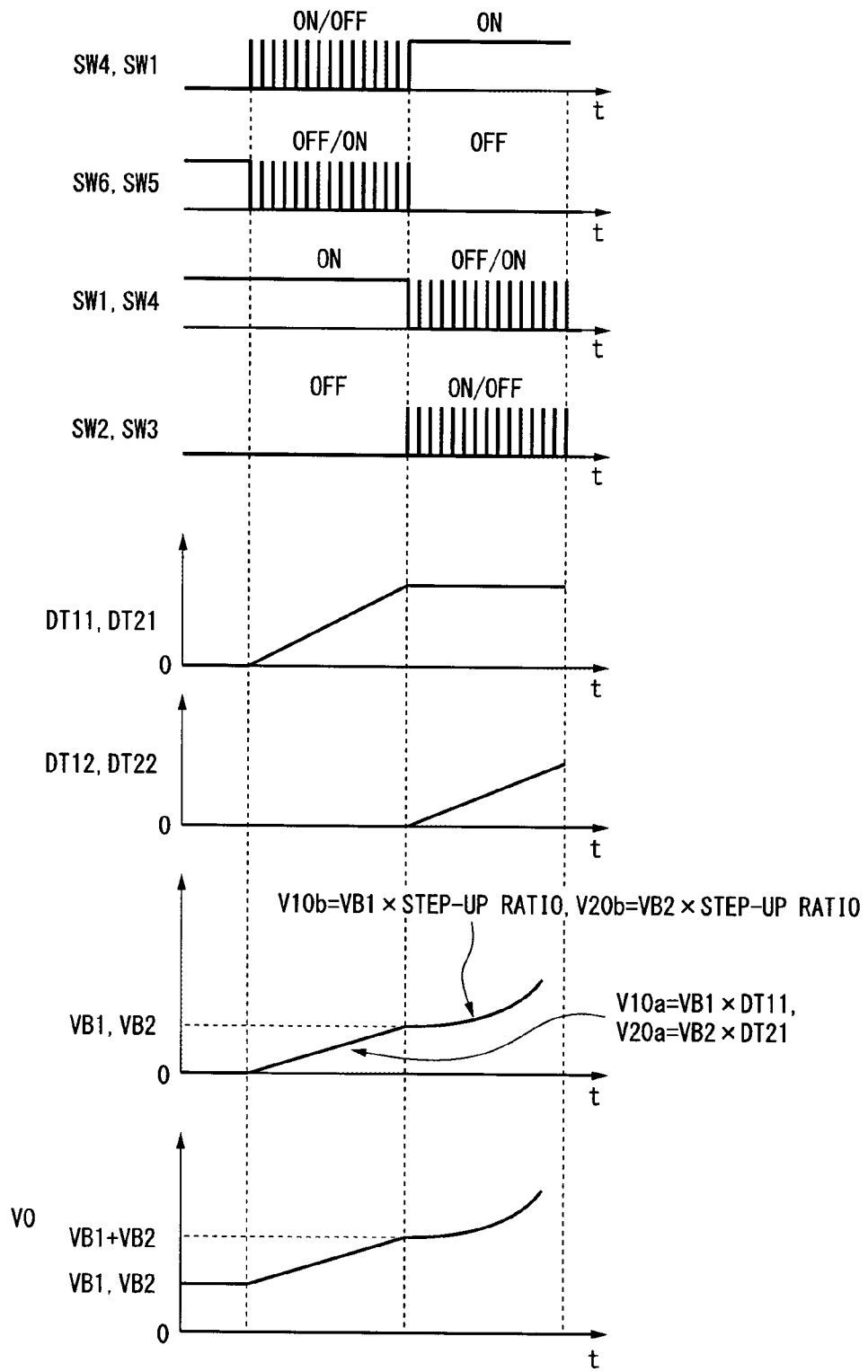
FIG. 23 is a diagram showing a variation of ON/OFF of each switching device, a variation of first and second step-down duties, a variation of first and second step-up duties, and a variation of each voltage when the power device according to the second variation of the second embodiment of the present invention is in the second control mode.

In second to fourth control modes, when the load voltage V0 is less than the summed voltage of the first and second voltages VB1 and VB2 (=VB1+VB2), the connection switching control unit 22 simultaneously drives the first and second step-down direct-current power converter circuits 11a and 12a. For example, as shown in FIG. 23, the phase of the switching operation of the first step-down direct-current power converter circuit 11a may be the same as or opposite to that of the second step-down direct-current power converter circuit 12a, or the phase of the switching operation of the first step-down direct-current power converter circuit 11a may be arbitrarily shifted from that of the second step-down direct-current power converter circuit 12a (for example, a phase shift is 180°). When the load voltage V0 is more than the summed voltage of the first and second voltages VB1 and VB2 (=VB1+VB2), the connection switching control unit 22 simultaneously drives the first and second step-up direct-current power converter circuits 11b and 12b. For example, as shown in FIG. 23, the phase of the switching operation of the first step-up direct-current power converter circuit 11b may be the same as or opposite to that of the second step-up direct-current power converter circuit 12b, or the phase of the switching operation of the first step-up direct-current power converter circuit 11b may be arbitrarily shifted from that of the second step-up direct-current power converter circuit 12b (for example, a phase shift is) 180°.

(Fifth to Eighth Control Modes of the Second Variation of the Second Embodiment)

In relation to the first to fourth control modes, the connection switching control unit 22 in fifth to eighth control modes can control any one of parameters to correspond to an arbitrary target value while the connection switching control unit 22 maintains each parameters other than the one at an arbitrary value by adjusting the first and second step-down duties DT11 and DT21 or the first and second step-up duties DT12 and DT22. The parameters include the load voltage V0, the voltage difference Vd (=VB2−VB1), the first voltage VB1, and the second voltage VB2.

(Ninth Control Mode of the Second Variation of the Second Embodiment)

In relation to the first to eighth control modes, in a condition that other load is connected in addition to the load 13, the first voltage VB1 is different from the second voltage VB2, the total capacity of the first power source BT1 is different from that of the second power source BT2, etc., the connection switching control unit 22 in a ninth control mode can control a voltage at any location to correspond an arbitrary target value by adjusting the first and second step-down duties DT11 and DT21 or the first and second step-up duties DT12 and DT22. For example, if the voltage difference Vd (=VB2−VB1) is caused, the connection switching control unit 22 can control the voltage difference to be small.

As described above, the power device 10 according to the second variation of the second embodiment of the present invention can easily control the load voltage V0 to be an arbitrary voltage ranging from a voltage equal to the greater of the first voltage VB1 and the second voltage VB2 to a voltage equal to the summed voltage of the first voltage VB1 and the second voltage VB2 (=VB1+VB2) by controlling the first step-down duty DT11 and the second step-down duty DT21. Moreover, the power device 10 can easily control the load voltage V0 to be an arbitrary voltage equal to or more than the summed voltage of the first voltage VB1 and the second voltage VB2 (=VB1+VB2), by controlling the first step-up duty DT12 and the second step-up duty DT22.

(Third Variation of the Second Embodiment)

Figure 24:
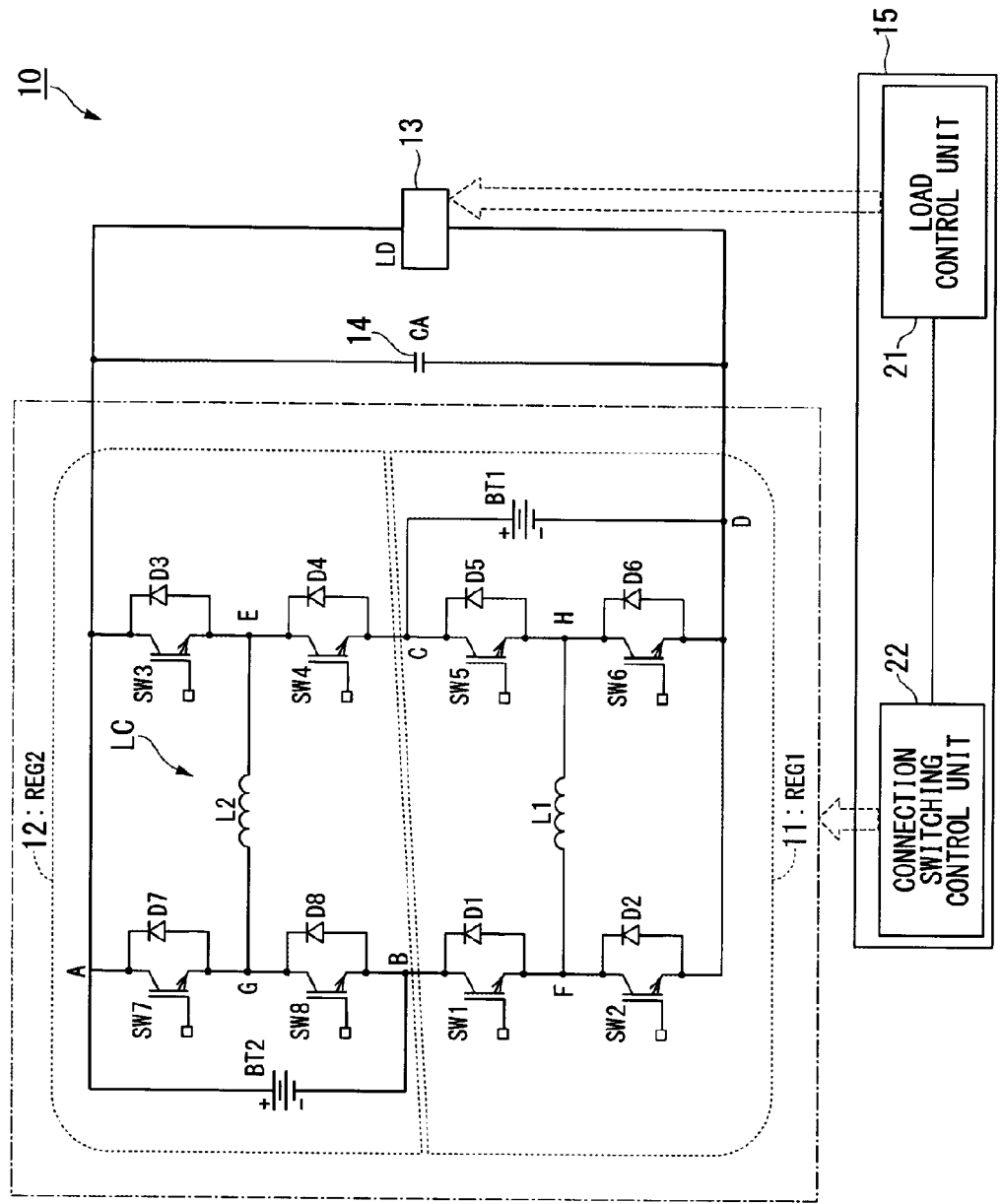
FIG. 24 is a configuration diagram showing a power device according to a third variation of the second embodiment of the present invention.

As shown in FIG. 24, a power device 10 according to a third variation of the second embodiment of the present invention further includes seventh and eighth nodes G and H, and fifth to eighth switching devices SW5 to SW8 in comparison with the second embodiment described above.

The power device 10 according to the third variation can control a load voltage V0 to be a voltage ranging from a voltage equal to a greater of the first and second voltages VB1 and VB2 to a voltage equal to the summed voltage (=VB1+VB2) of the first and second voltages VB1 and VB2, or to be a voltage equal to or more than the summed voltage of the first and the second voltages VB1 and VB2 (=VB1+VB2).

The first direct-current power converter circuit (REG1) 11 includes a first power source BT1, first, second, fifth and sixth switching devices SW1, SW2, SW5 and SW6, which configure a first switch group, and a first reactor L1.

The second direct-current power converter circuit (REG2) 12 includes a second power source BT2, third, fourth, seventh and eighth switching devices SW3, SW4, SW7 and SW8, which configure a second switch group, and a second reactor L2.

The seventh node G is provided between the second node B and the second reactor L2, and the eighth node H is provided between the third node C and the first reactor L1.

A collector and an emitter of the fifth switching device SW5 are connected to the third node C and the eighth node H, respectively. A collector and an emitter of the sixth switching device SW6 are connected to the eighth node H and the fourth node D, respectively. A collector and an emitter of the seventh switching device SW7 are connected to the first node A and the seventh node G, respectively. A collector and an emitter of the eighth switching device SW8 are connected to the seventh node G and the second node B, respectively. Diodes D5 and D8 are connected between the emitter and collector of the fifth to eighth switching devices SW5 to SW8, respectively. The direction from the emitter to the collector of each switching device SW5 to SW8 is a forward direction of each diode D5 to D8.

The first and second direct-current power converter circuits 11 and 12 are controlled based on pulse-width-modulated signals (PWM signals) output from the control device 15 and input into a gate of each switching device SW1 to SW8 so that the first and second direct-current power converter circuits 11 and 12 are driven independently from each other.

In more detail, when the load voltage V0 is less than the summed voltage of the first and second voltages VB1 and VB2 (=VB1+VB2), the first and second direct-current power converter circuits 11 and 12 are controlled so that a switching operation for at least one of a pair of the fifth and sixth switching devices SW5 and SW6 included in the first direct-current power converter circuit 11 and a pair of the seventh and eighth switching devices SW7 and SW8 included in the second direct-current power converter circuit 12 is performed.

When the load voltage V0 is more than the summed voltage of the first and second voltages VB1 and VB2 (=VB1+VB2), the first and second direct-current power converter circuits 11 and 12 are controlled so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed.

In these switching operations, each switching device SW1 to SW8 is switched between close (ON) and open (OFF).

Figure 25A:
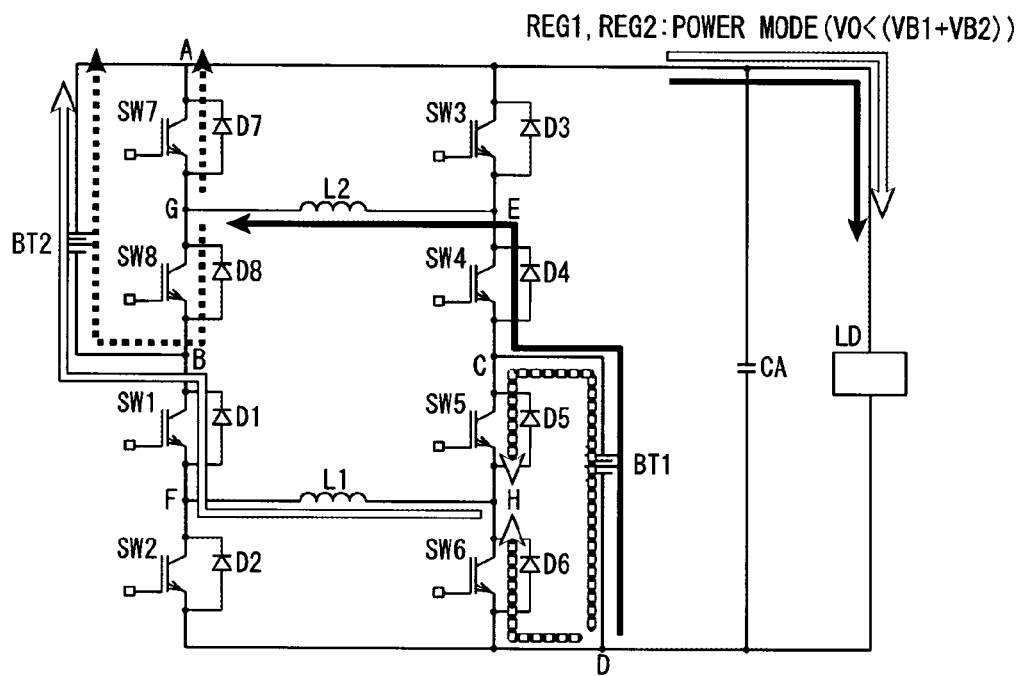
FIG. 25A is a diagram showing each current flow when the power device according to the third variation of the second embodiment of the present invention is in a power mode.
Figure 25B:
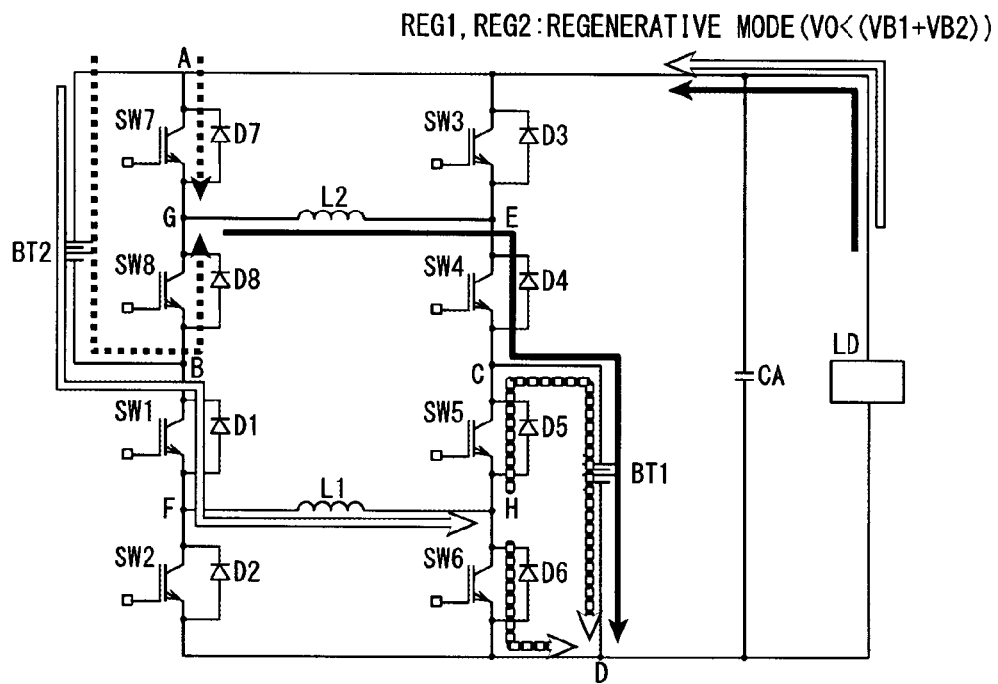
FIG. 25B is a diagram showing each current flow when the power device according to the third variation of the second embodiment of the present invention is in a regenerative mode.

For example, as shown in FIGS. 25A and 25B, when the load voltage V0 is less than the summed voltage of the first and second voltages VB1 and VB2 (=VB1+VB2), the first direct-current power converter circuit (REG1) 11 turns on the first and fourth switching devices SW1 and SW4, and turns off the second and third switching devices SW2 and SW3.

As shown in FIG. 25A, when the first direct-current power converter circuit (REG1) 11 is in a power mode where the first direct-current power converter circuit (REG1) 11 supplies a direct-current power to the load 13, the sixth switching device SW6 is turned off and the fifth switching device SW5 is turned on. Thereby, current flows into the load 13 via the first power source BT1, the fifth switching device SW5, the first reactor L1, the first switching device SW1 and the first diode D1, and the second power source BT2 in series. On the other hand, by turning on the sixth switching device SW6 and turning off the fifth switching device SW5, a circulating current flows via the sixth switching device SW6 and the sixth diode D6, the first reactor L1, the first switching device SW1 and the first diode D1, and the second power source BT2 in series.

As shown in FIG. 25B, when the first direct-current power converter circuit 11 is in a regenerative mode where a direct-current power is supplied from the load 13, the sixth switching device SW6 is turned on and the fifth switching device SW5 is turned off. Thereby, current flows via the second power source BT2, the first switching device SW1, the first reactor L1, and the sixth switching device SW6 in series. On the other hand, by turning off the sixth switching device SW6 and turning on the fifth switching device SW5, current flows via the second power source BT2, the first switching device SW1, the first reactor L1, the fifth switching device SW5, and the first power source BT1 in series.

As shown in FIG. 25A, when the second direct-current power converter circuit (REG2) 12 is in a power mode where the second direct-current power converter circuit (REG2) 12 supplies a direct-current power to the load 13, the seventh switching device SW7 is turned off, and the eighth switching device SW8 is turned on. Thereby, current flows into the load 13 via the first power source BT1, the fourth switching device SW4 and the fourth diode D4, the second reactor L2, the eighth switching device SW8, and the second power source BT2 in series. On the other hand, by turning on the seventh switching device SW7 and turning off the eighth switching device SW8, a circulating current flows via the first power source BT1, the fourth switching device SW4 and the fourth diode D4, the second reactor L2, and the seventh switching device SW7 and the seventh diode D7 in series.

As shown in FIG. 25B, when the second direct-current power converter circuit (REG2) 12 is in a regenerative mode where a direct-current power is supplied from the load 13, the eighth switching device SW8 is turned on and the seventh switching device SW7 is turned off. Thereby, current flows via the second power source BT2, the eighth switching device SW8 and the eighth diode D8, the second reactor L2, the fourth switching device SW4, and the first power source BT1 in series. On the other hand, by turning off the eighth switching device SW8 and turning on the seventh switching device SW7, current flows via the seventh switching device SW7, the second reactor L2, the fourth switching device SW4, and the first power source BT1 in series.

Figure 25C:
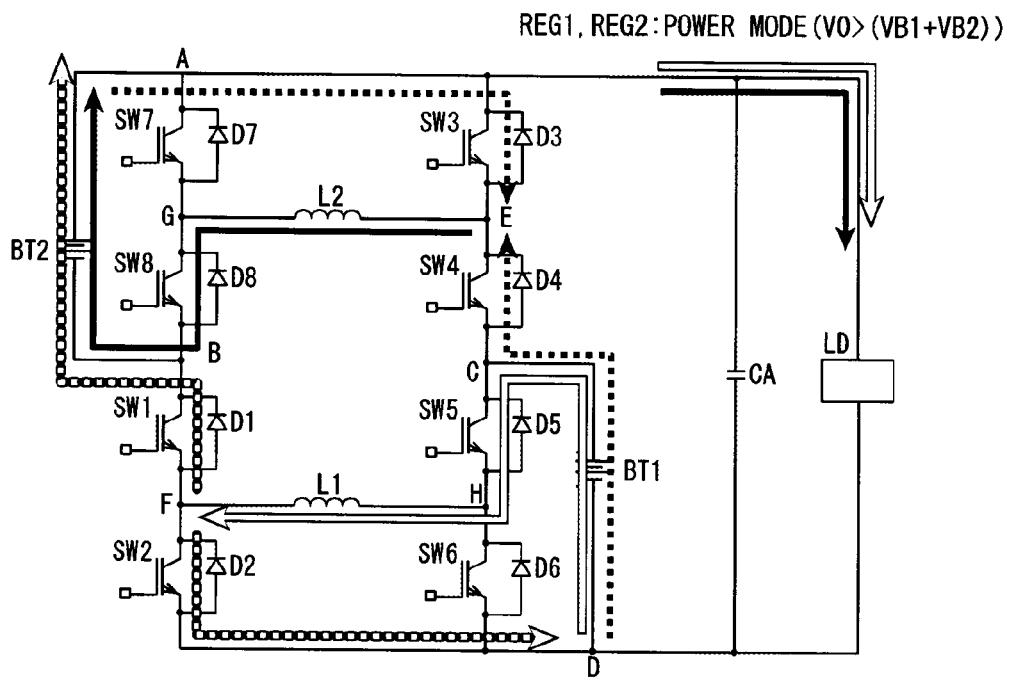
FIG. 25C is a diagram showing each current flow when the power device according to the third variation of the second embodiment of the present invention is in the power mode.
Figure 25D:
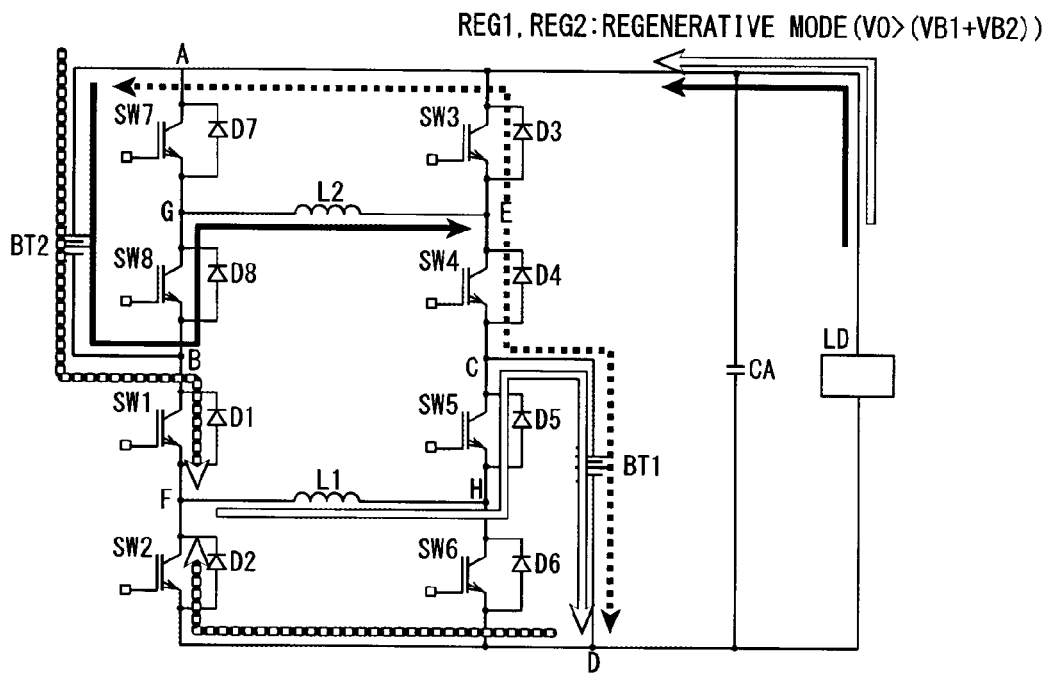
FIG. 25D is a diagram showing each current flow when the power device according to the third variation of the second embodiment of the present invention is in the regenerative mode.

For example, as shown in FIGS. 25C and 25D, when the load voltage V0 is more than the summed voltage of the first and second voltages VB1 and VB2 (=VB1+VB2), the first direct-current power converter circuit (REG1) 11 turns on the fifth and eighth switching devices SW5 and SW8, and turns off the sixth and seventh switching devices SW6 and SW7.

As shown in FIG. 25C, when the first direct-current power converter circuit (REG1) 11 is in a power mode where the first direct-current power converter circuit (REG1) 11 supplies a direct-current power to the load 13, the first switching device SW1 is turned off and the second switching device SW2 is turned on. Thereby, the first reactor L1 is excited by flowing a circulating current through the first power source BT1, the fifth switching device SW5, the first reactor L1, and the second switching device SW2 in series, and a first reactor current I(L1) flowing through the first reactor L1 is increased. On the other hand, by turning on the first switching device SW1 and turning off the second switching device SW2, current flows into the load 13 via the first power source BT1, the fifth switching device SW5, the first reactor L1, the first switching device SW1 and the first diode D1, and the second power source BT2 in series.

As shown in FIG. 25D, when the first direct-current power converter circuit (REG1) 11 is in a regenerative mode where a direct-current power is supplied from the load 13, the first switching device SW1 is turned on and the second switching device SW2 is turned off. Thereby, current flows via the second power source BT2, the first switching device SW1, the first reactor L1, the fifth switching device SW5 and the fifth diode D5, and the first power source BT1 in series. On the other hand, by turning off the first switching device SW1 and turning on the second switching device SW2, a circulating current flows via the second switching device SW2 and the second diode D2, the first reactor L1, the fifth switching device SW5 and the fifth diode D5, and the first power source BT1 in series.

For example, as shown in FIG. 25C, when the second direct-current power converter circuit (REG2) 12 is in a power mode where the second direct-current power converter circuit (REG2) 12 supplies a direct-current power to the load 13, the fourth switching device SW4 is turned off and the third switching device SW3 is turned on. Thereby, the second reactor L2 is excited by flowing a circulating current through the second power source BT2, the third switching device SW3, the second reactor L2, and the eighth switching device SW8 in series, and a second reactor current I(L2) flowing through the second reactor L2 is increased. On the other hand, by turning on the fourth switching device SW4 and turning off the third switching device SW3, current flows into the load 13 via the first power source BT1, the fourth switching device SW4 and the fourth diode D4, the second reactor L2, the eighth switching device SW8, and the second power source BT2 in series.

For example, as shown in FIG. 25D, when the second direct-current power converter circuit (REG2) 12 is in a regenerative mode where a direct-current power is supplied from the load 13, the fourth switching device SW4 is turned on and the third switching device SW3 is turned off. Thereby, current flows via the second power source BT2, the eighth switching device SW8 and the eighth diode D8, the second reactor L2, the fourth switching device SW4, and the first power source BT1 in series. On the other hand, by turning off the fourth switching device SW4 and turning on the third switching device SW3, a circulating current flows via the second reactor L2, the third switching device SW3 and the third diode D3, the second power source BT2, the eighth switching device SW8 and the eighth diode D8 in series.

The connection switching control unit 22 can drive the first and second direct-current power converter circuits 11 and 12 independently from each other by inputting pulse-width-modulated signals (PWM signals) into a gate of each switching device SW1 to SW8.

When the load voltage V0 is less than the summed voltage of the first and second voltages VB1 and VB2 (=VB1+VB2), the connection switching control unit 22 controls the first and second direct-current power converter circuits 11 and 12 so that a switching operation for at least one of a pair of the fifth and sixth switching devices SW5 and SW6 included in the first direct-current power converter circuit 11 and a pair of the seventh and eighth switching devices SW7 and SW8 included in the second direct-current power converter circuit 12 is performed. Thereby, the connection switching control unit 22 controls the voltage V0 to be a voltage ranging from the greater of the first voltage VB1 of the first power source BT1 and the second voltage VB2 of the second power source BT2 to the summed voltage of the first voltage VB1 and the second voltage VB2 (=VB1+VB2).

When the load voltage V0 is more than the summed voltage of the first and second voltages VB1 and VB2 (=VB1+VB2), the connection switching control unit 22 controls the first and second direct-current power converter circuits 11 and 12 so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. Thereby, the connection switching control unit 22 controls the voltage V0 to be a voltage equal to or more than the summed voltage of the first voltage VB1 and the second voltage VB2 (=VB1+VB2).

The connection switching control unit 22 controls a switching operation of the fifth switching device SW5 and the sixth switching device SW6 included in the first direct-current power converter circuit 11 based on a first step-down duty DT11. In the switching operation, the fifth switching device SW5 and the sixth switching device SW6 are inverted and the alternative close and open (ON/OFF) switching operations of each switching device SW5 and SW6 are performed. As represented by the following equation (7), the first step-down duty DT11 is defined by ON time t(SW5) of the fifth switching device SW5 and ON time t(SW6) of the sixth switching device SW6.

For example, when the fifth switching device SW5 is turned off and the sixth switching device SW6 is turned on, the first step-down duty DT11 is 0%. On the other hand, when the fifth switching device SW5 is turned on and the sixth switching device SW6 is turned off, the first step-down duty DT11 is 100%.

The connection switching control unit 22 can step down the first voltage VB1 based on the first step-down duty DT11 and output the step-down voltage from the first direct-current power converter circuit 11. The connection switching control unit 22 controls output voltage V10a of the first direct-current power converter circuit 11 (in other words, the voltage applied between the second node B and the fourth node D) as the product of the first voltage VB1 and the first step-down duty DT11 (VB1*DT11=V10a).

$$DT11 = \frac{t(SW5)}{t(SW5) + t(SW6)} = \frac{V0 - VB1 - Vd}{VB1} \quad (7)$$
$$DT21 = \frac{t(SW8)}{t(SW8) + t(SW7)} = \frac{V0 - VB2 + Vd}{VB2}$$

The connection switching control unit 22 controls a switching operation of the seventh switching device SW7 and the eighth switching device SW8 included in the second direct-current power converter circuit 12 based on a second step-down duty DT21. In the switching operation, the seventh switching device SW7 and the eighth switching device SW8 are inverted and the alternative close and open (ON/OFF) switching operations of each switching device SW7 and SW8 are performed. As represented by the equation (7) described above, the second step-down duty DT21 is defined by ON time t(SW8) of the eighth switching device SW8 and ON time t(SW7) of the seventh switching device SW7.

For example, when the eighth switching device SW8 is turned off and the seventh switching device SW7 is turned on, the second step-down duty DT21 is 0%. On the other hand, when the eighth switching device SW8 is turned on and the seventh switching device SW7 is turned off, the second step-down duty DT21 is 100%.

The connection switching control unit 22 can step down the second voltage VB2 based on the second step-down duty DT21 and output the step-down voltage from the second direct-current power converter circuit 12. The connection switching control unit 22 controls output voltage V20a of the second direct-current power converter circuit 12 (in other words, the voltage applied between the first node A and the third node C) as the product of the second voltage VB2 and the second step-down duty DT21 (VB2*DT21=V20a).

The connection switching control unit 22 controls a switching operation of the first switching device SW1 and the second switching device SW2 included in the first direct-current power converter circuit 11 based on a first step-up duty DT12. In the switching operation, the first switching device SW1 and the second switching device SW2 are inverted and the alternative close and open (ON/OFF) switching operations of each switching device SW1 and SW2 are performed. As represented by the following equation (8), the first step-up duty DT12 is defined by ON time t(SW1) of the first switching device SW1 and ON time t(SW2) of the second switching device SW2.

For example, when the first switching device SW1 is turned on and the second switching device SW2 is turned off, the first step-up duty DT12 is 0%. On the other hand, when the first switching device SW1 is turned off and the second switching device SW2 is turned on, the first step-up duty DT12 is 100%.

The connection switching control unit 22 can step up the first voltage VB1 based on the first step-up duty DT12 and output the step-up voltage from the first direct-current power converter circuit 11. The connection switching control unit 22 controls output voltage V10b of the first direct-current power converter circuit 11 (in other words, the voltage applied between the second node B and the fourth node D) based on the first voltage VB1 and the first step-up duty DT12.

$$DT12 = \frac{t(SW2)}{t(SW2)+t(SW1)} = \frac{V0-2 \cdot VB2+Vd}{V0-VB2} \left.\begin{matrix}\\\\\end{matrix}\right\} \quad (8)$$
$$DT22 = \frac{t(SW3)}{t(SW3)+t(SW4)} = \frac{V0-2 \cdot VB1+Vd}{V0-VB1}$$

The connection switching control unit 22 controls a switching operation of the third switching device SW3 and the fourth switching device SW4 included in the second direct-current power converter circuit 12 based on a second step-up duty DT22. In the switching operation, the third switching device SW3 and the fourth switching device SW4 are inverted and the alternative close and open (ON/OFF) switching operations of each switching device SW3 and SW4 are performed. As represented by the equation (8) described above, the second step-up duty DT22 is defined by ON time t(SW3) of the third switching device SW3 and ON time t(SW4) of the fourth switching device SW4.

For example, when the fourth switching device SW4 is turned on and the third switching device SW3 is turned off, the second step-up duty DT22 is 0%. On the other hand, when the fourth switching device SW4 is turned off and the third switching device SW3 is turned on, the second step-up duty DT22 is 100%.

The connection switching control unit 22 can step up the second voltage VB2 based on the second step-up duty DT22 and output the step-up voltage from the second direct-current power converter circuit 12. The connection switching control unit 22 controls output voltage V20b of the second direct-current power converter circuit 12 (in other words, the voltage applied between the first node A and the third node C) based on the second voltage VB2 and the second step-up duty DT22.

As represented by the equation (7) described above, the first step-down duty DT11 is represented by the desired load voltage V0, the desired voltage difference Vd (=VB2−VB1), and the first voltage VB1, and the second step-down duty DT21 is represented by the desired load voltage V0, the desired voltage difference Vd (=VB2−VB1), and the second voltage VB2. On the other hand, based on the voltage difference Vd (=VB2−VB1), the first step-down duty DT11 can be represented by the second voltage VB2, and the second step-down duty DT21 can be represented by the first voltage VB1. In order to prevent a divergence of control responses, the connection switching control unit 22 may control switching operations using the first and second step-down duties DT11 and DT21 represented by the equation (7) described above.

Similarly, as represented by the equation (8) described above, the first step-up duty DT12 is represented by the second voltage VB2, and the second step-up duty DT22 is represented by the first voltage VB1. On the other hand, based on the voltage difference Vd (=VB2−VB1), the first step-up duty DT12 can be represented by the first voltage VB1, and the second step-up duty DT22 can be represented by the second voltage VB2. In order to prevent a divergence of control responses, the connection switching control unit 22 may control switching operations using the first and second step-up duties DT12 and DT22 represented by the equation (8) described above.

The power device 10 according to the third variation includes the constitution described above. Hereinafter, the operation of the power device 10 according to the third variation, in other words, the control operation of the connection switching control unit 22 will be described.

The connection switching control unit 22 can perform similar control operations to those in the first to ninth control modes of the second embodiment described above.
(First to Fourth Control Modes of the Third Variation of the Second Embodiment)

In a first control mode, when the load voltage V0 is less than the summed voltage of the first and second voltages VB1 and VB2 (=VB1+VB2), or when the load voltage V0 is more than the summed voltage of the first and second voltages VB1 and VB2 (=VB1+VB2), the connection switching control unit 22 drives one of the first and second direct-current power converter circuits 11 and 12 at a time.

Figure 26:
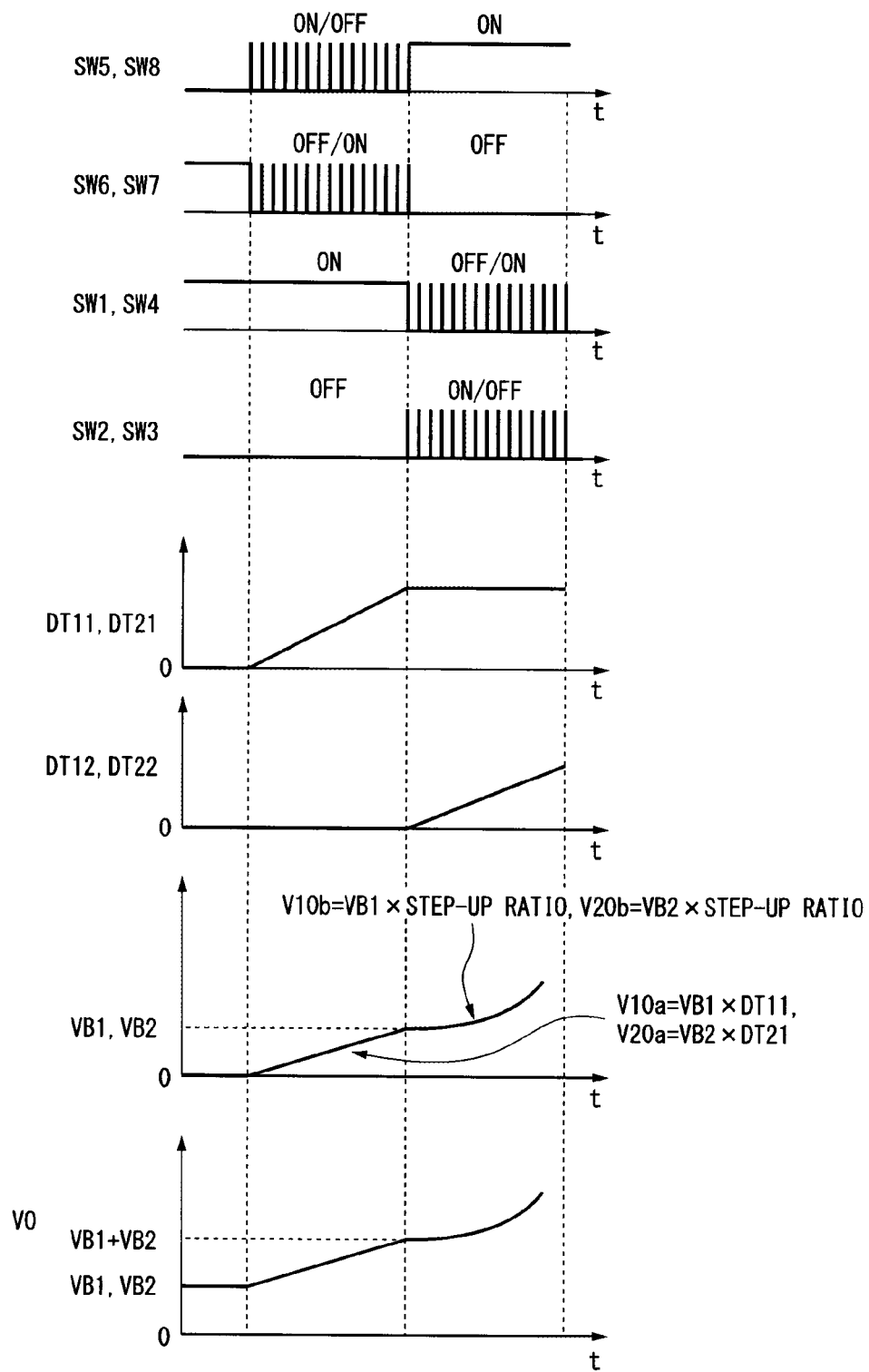
FIG. 26 is a diagram showing a variation of ON/OFF of each switching device, a variation of first and second step-down duties, a variation of first and second step-up duties, and a variation of each voltage when the power device according to the third variation of the second embodiment of the present invention is in a second control mode.

In second to fourth control modes, when the load voltage V0 is less than the summed voltage of the first and second voltages VB1 and VB2 (=VB1+VB2), or when the load voltage V0 is more than the summed voltage of the first and second voltages VB1 and VB2 (=VB1+VB2), the connection switching control unit 22 simultaneously drives the first and second direct-current power converter circuits 11 and 12. For example, as shown in FIG. 26, the phase of the switching operation of the first direct-current power converter circuit 11 may be the same as or opposite to that of the second direct-current power converter circuit 12. The phase of the switching operation of the first direct-current power converter circuit 11 may be arbitrarily shifted from that of the second direct-current power converter circuit 12 (for example, a phase shift is) 180°.

(Fifth to Eighth Control Modes of the Third Variation of the Second Embodiment)

In relation to the first to fourth control mode, the connection switching control unit 22 in fifth to eighth control modes can control any one of parameters to correspond to an arbitrary target value while the connection switching control unit 22 maintains each parameters other than the one at an arbitrary value by adjusting the first and second step-down duties DT11 and DT21 or the first and second step-up duties DT12 and DT22. The parameters include the load voltage V0, the voltage difference Vd (=VB2-VB1), the first voltage VB1, and the second voltage VB2.

(Ninth Control Mode of the Third Variation of the Second Embodiment)

In relation to the first to eighth control modes, in a condition that other load is connected in addition to the load 13, the first voltage VB1 is different from the second voltage VB2, the total capacity of the first power source BT1 is different from that of the second power source BT2, etc., the connection switching control unit 22 in a ninth control mode can control a voltage at any location to correspond an arbitrary target value by adjusting the first and second step-down duties DT11 and DT21 or the first and second step-up duties DT12 and DT22. For example, if the voltage difference Vd (=VB2-VB1) is caused, the connection switching control unit 22 can control the voltage difference to be small.

As described above, the power device 10 according to the third variation of the second embodiment of the present invention can easily control the load voltage V0 to be an arbitrary voltage ranging from a voltage equal to the greater of the first voltage VB1 and the second voltage VB2 to a voltage equal to the summed voltage of the first voltage VB1 and the second voltage VB2 (=VB1+VB2) by controlling the first step-down duty DT11 and the second step-down duty DT21. Moreover, the power device 10 can easily control the load voltage V0 to be an arbitrary voltage equal to or more than the summed voltage of the first voltage VB1 and the second voltage VB2 (=VB1+VB2), by controlling the first step-up duty DT12 and the second step-up duty DT22.

In the second embodiment, and the first and third variations of the second embodiment, if the power device 10 is mounted in a vehicle, the first power source BT1 may be connected to a low voltage load such as an electric component for vehicle and the second power source BT2 may be connected to a high voltage load such as an inverter. Thereby, the first and second power sources BT1 and BT2 are connected in series, and the power device 10 can drive the high voltage load. Thereby, the maximum power output of the second power source BT2 can be decreased. Moreover, the amount of charge and discharge of the first power source BT1 and that of the second power source BT2 can be arbitrarily balanced.

The technical scope of the present invention is not limited to the embodiments described above, and includes variations where a variety of modifications are made in the embodiments described above without departing from the spirit or scope of the present invention. In other words, the embodiments described above are illustrative only, and modifications may be made accordingly in the embodiments.

What is claimed is:

1. A power device, comprising:
   a first power source and a second power source;
   a load configured to be driven by power supplied from the first power source and the second power source; and
   a voltage control unit configured to control a voltage to be applied to the load, the voltage control unit comprising:
      a first reactor and a second reactor;
      a plurality of switches;
      at least one of a first step-up circuit and a second step-up circuit; and
      first to sixth nodes,
   a positive electrode of the second power source being connected to the first node,
   a negative electrode of the second power source being connected to the second node,
   a positive electrode of the first power source being connected to the third node,
   a negative electrode of the first power source being connected to the fourth node,
   a first end of the second reactor being connected to the fifth node, and a second end of the second reactor being connected to the second node,
   a first end of the first reactor being connected to the sixth node, and a second end of the first reactor being connected to the third node,
   the plurality of switches comprising:
      a first switch which has two ends, each of which is connected to one of both the fifth node and the sixth node, both the second node and the sixth node, and both the fifth node and the third node;
      a second switch which has two ends, each of which is connected to both the sixth node and the fourth node; and
      a third switch which has two ends, each of which is connected to both the first node and the fifth node,
   the first step-up circuit comprising the first reactor, and the first and second switches, and being connected to the first power source,
   the second step-up circuit comprising the second reactor, and the first and third switches, and being connected to the second power source, and
   the voltage control unit being configured to control the voltage to be applied to the load to be an arbitrary voltage equal to or more than a summed voltage of a voltage of the first power source and a voltage of the second power source based on a duty of an ON and OFF switching operation of the switch.

2. The power device according to claim 1, wherein:
   the first switch is a bidirectional switch;
   each of the two ends of the first switch is connected to both the fifth node and the sixth node;
   the plurality of switches comprise
      a fourth switch which has two ends, each of which is connected to both the fifth node and the fourth node, and
      a fifth switch which has two ends, each of which is connected to both the first node and the sixth node;
   the voltage control unit comprises the first step-up circuit and the second step-up circuit;
   the first step-up circuit comprises the first, second and fourth switches; and
   the second step-up circuit comprises the first, third and fifth switches.

3. The power device according to claim 1, wherein:
   each of the two ends of the first switch is connected to both the second node and the sixth node;
   the plurality of switches comprise a fourth switch which has two ends, each of which is connected to both the fifth node and the third node;
   the voltage control unit comprises the first step-up circuit and the second step-up circuit; and the second step-up circuit comprises the fourth switch instead of the first switch.

4. The power device according to claim 3, wherein:
the first and fourth switches are bidirectional switches;
the plurality of switches comprise
    a fifth switch which has two ends, each of which is connected to both the first node and the sixth node; and
    a sixth switch which has two ends, each of which is connected to both the fifth node and the fourth node;
the first step-up circuit comprises the first, second and fifth switches; and
the second step-up circuit comprises the third, fourth and sixth switches.

5. The power device according to claim 3, wherein:
the voltage control unit comprises
    a seventh node provided between the second node and the second reactor, and
    an eighth node provided between the third node and the first reactor;
the plurality of switches comprise
    a fifth switch which has two ends, each of which is connected to both the third node and the eighth node,
    a sixth switch which has two ends, each of which is connected to both the eighth node and the fourth node,
    a seventh switch which has two ends, each of which is connected to both the first node and the seventh node, and
    an eighth switch which has two ends, each of which is connected to both the seventh node and the second node;
the first step-up circuit comprises the first, second, fifth and sixth switches; and
the second step-up circuit comprises the third, fourth, seventh and eighth switches.

6. The power device according to claim 2, wherein the voltage control unit is configured to control the voltage to be applied to the load to be an arbitrary voltage ranging from a voltage equal to a greater of the voltage of the first power source and the voltage of the second power source to a summed voltage of the voltage of the first power source and the voltage of the second power source based on a duty of an ON and OFF switching operation of the switch.

7. The power device according to claim 4, wherein the voltage control unit is configured to control the voltage to be applied to the load to be an arbitrary voltage ranging from a voltage equal to a greater of the voltage of the first power source and the voltage of the second power source to a summed voltage of the voltage of the first power source and the voltage of the second power source based on a duty of an ON and OFF switching operation of the switch.

8. The power device according to claim 5, wherein the voltage control unit is configured to control the voltage to be applied to the load to be an arbitrary voltage ranging from a voltage equal to a greater of the voltage of the first power source and the voltage of the second power source to a summed voltage of the voltage of the first power source and the voltage of the second power source based on a duty of an ON and OFF switching operation of the switch.

9. The power device according to claim 1, wherein the first reactor and the second reactor are magnetically coupled.

10. The power device according to claim 2, wherein the first reactor and the second reactor are magnetically coupled.

11. The power device according to claim 3, wherein the first reactor and the second reactor are magnetically coupled.

12. The power device according to claim 4, wherein the first reactor and the second reactor are magnetically coupled.

13. The power device according to claim 5, wherein the first reactor and the second reactor are magnetically coupled.

14. The power device according to claim 6, wherein the first reactor and the second reactor are magnetically coupled.

15. The power device according to claim 7, wherein the first reactor and the second reactor are magnetically coupled.

16. The power device according to claim 8, wherein the first reactor and the second reactor are magnetically coupled.

\* \* \* \* \*